(12) United States Patent
Kerdelo

(10) Patent No.: US 12,473,584 B2
(45) Date of Patent: Nov. 18, 2025

(54) METHOD FOR DETECTING THE PRESENCE, IDENTIFICATION AND QUANTIFICATION IN A BLOOD SAMPLE OF ANTICOAGULANTS WHICH ARE BLOOD COAGULATION ENZYMES INHIBITORS, AND MEANS FOR THE IMPLEMENTATION THEREOF

(71) Applicant: DIAGNOSTICA STAGO, Asnieres sur Seine (FR)

(72) Inventor: Sébastien Kerdelo, Paris (FR)

(73) Assignee: DIAGNOSTICA STAGO, Asnieres-sur-Seine (FR)

(*) Notice: Subject to any disclaimer, the term of this patent is extended or adjusted under 35 U.S.C. 154(b) by 1045 days.

(21) Appl. No.: 17/311,195

(22) PCT Filed: Dec. 6, 2019

(86) PCT No.: PCT/EP2019/084069
§ 371 (c)(1),
(2) Date: Jun. 4, 2021

(87) PCT Pub. No.: WO2020/115315
PCT Pub. Date: Jun. 11, 2020

(65) Prior Publication Data
US 2022/0002779 A1 Jan. 6, 2022

(30) Foreign Application Priority Data
Dec. 7, 2018 (FR) ..................... 1872562

(51) Int. Cl.
*C12Q 1/56* (2006.01)
*G16B 40/20* (2019.01)

(52) U.S. Cl.
CPC ............ *C12Q 1/56* (2013.01); *G16B 40/20* (2019.02); *G01N 2333/745* (2013.01); *G01N 2333/96444* (2013.01)

(58) Field of Classification Search
CPC .... C12Q 1/56; G16B 40/20; G01N 2333/745; G01N 2333/96444; G01N 33/86
See application file for complete search history.

(56) References Cited

U.S. PATENT DOCUMENTS

| | | |
|---|---|---|
| 2012/0171697 A1 | 7/2012 | Kappel et al. |
| 2015/0308970 A1 | 10/2015 | Massefski, Jr. et al. |
| 2016/0032355 A1* | 2/2016 | Zaman ............... G01N 33/86 435/13 |
| 2016/0187338 A1 | 6/2016 | Monroe et al. |

FOREIGN PATENT DOCUMENTS

| | | |
|---|---|---|
| EP | 1 367 135 | 12/2003 |
| JP | 2012141310 A | 7/2012 |
| JP | 2016500443 A | 1/2016 |
| WO | 2014/134223 | 9/2014 |

OTHER PUBLICATIONS

Arumugam, Jayavel, et al. "Random forests are able to identify differences in clotting dynamics from kinetic models of thrombin generation." PloS one 11.5 (2016): e0153776. (Year: 2016).*
Douxfils, Jonathan, et al. "Assessment of the impact of rivaroxaban on coagulation assays: laboratory recommendations for the monitoring of rivaroxaban and review of the literature." Thrombosis research 130.6 (2012): 956-966. (Year: 2012).*
Barrett et al. Clinical laboratory measurement of FXa inhibitors, 2010 (Year: 2010).*
Harris, Leanne F., and Anthony J. Killard. "Microfluidics in coagulation monitoring devices: a mini review." Analytical Methods 10.30 (2018): 3714-3719 (Year: 2018).*
Diagnostica Satgo, Sta R Max techincal specification, 2016 (Year: 2016).*
Stachrom® Heparin Colorimetric Assay of Heparins (UFH and LMWH) by anti-Xa Method, 2015 (Year: 2015).*
Liquid Anti-Xa Colorimetric Assay of Heparins (UFH and LMWH), 2014 (Year: 2014).*
International Search Report for PCT/EP2019/084069 dated Mar. 20, 2020, 5 pages.
Written Opinion of the ISA For PCT/EP2019/084069 dated Mar. 20, 2020, 5 pages.
French Search Report for 1872562 dated Nov. 13, 2019, 8 pages.
Chang et al., "LIBSVM package", copyright 2000-2001, <https://www.csie.ntu.edu.tw/~cjlin/libsvm/>, 4 total pages.
Scikit-Learn, Scikit-Learn Library, <https://scikit-learn.org/>, 2 total pages.
Cutté, "Hematologie De l'automate de NF a l'analyse cellulaire: aboutissement de l'automatisation de l'hematologie?", IRBM News, Oct. 1, 2008, vol. 29, No. 3-4, XP026006968, pp. 24-34.

* cited by examiner

*Primary Examiner* — Olivia M. Wise
*Assistant Examiner* — Dawn Bickham
(74) *Attorney, Agent, or Firm* — NIXON & VANDERHYE

(57) ABSTRACT

Disclosed is an in vitro method for detecting, in a biological sample, the presence of a blood coagulation enzyme inhibitor selected, independently, from factor Xa and factor IIa, the method including the step of making one or more competitive kinetics measurement(s) by carrying out a competitive enzymatic assay and implementing one or more types of classification or regression decision models obtained by training automated supervised learning models. The method may include the identification in the biological sample of an inhibitor in question, or even its characterization, or even its quantification. Also disclosed is a data processing system or device including implementation for at least part of the method, a computer program or storage medium which can be read by a computer or appropriate data, and a suitable kit.

14 Claims, 22 Drawing Sheets

METHOD FOR DETECTING THE PRESENCE, IDENTIFICATION AND QUANTIFICATION IN A BLOOD SAMPLE OF ANTICOAGULANTS WHICH ARE BLOOD COAGULATION ENZYMES INHIBITORS, AND MEANS FOR THE IMPLEMENTATION THEREOF

CROSS-REFERENCE TO RELATED APPLICATIONS

This application is the U.S. national phase of International Application No. PCT/EP2019/084069 filed Dec. 6, 2019 which designated the U.S. and claims priority to FR 1872562 filed Dec. 7, 2018, the entire contents of each of which are hereby incorporated by reference.

TECHNICAL FIELD OF THE INVENTION

The present application relates to the field of haemostasis and in particular to that of the coagulation of blood, and provides methods and means for "blind" detection, and subsequently and if relevant, for the identification and qualitative then quantitative characterization (assay) of anticoagulants, which are inhibitors of blood coagulation enzymes to be found in an analysed sample.

The invention employs artificial intelligence tools, in particular automated supervised learning models, for the purposes of post-processing kinetic measurements carried out on blood samples.

Thus, and more particularly, the invention relates to an in vitro method for detecting the presence of an inhibitor of a blood coagulation enzyme, this latter being selected from factor Xa and factor IIa and then, in the case the presence of an inhibitor can be assessed, for identifying said inhibitor, this identification including its category, its nature, and even its effective characterization, and then, after this identification, a quantitative assay thereof. The invention is primarily directed to the in vitro detection of the presence of the inhibitors in question in biological samples taken from human subjects.

The invention also relates to means which are useful and adapted for this purpose: an appropriate data processing system or device, computer program, a storage medium or data carrier, and kits enabling all of the steps of the methods described herein to be carried out irrespective of whether they are experimental or in silico.

PRIOR ART

Coagulation is a complex physiological phenomenon which occurs as a cascade and involves several plasma proteins. This process, once triggered, results in the formation of a clot (a platelet plug) which, in a non-pathological physiological state, slow down decelerate or quell haemorrhages. In contrast, problems with coagulation which lead to higher risks of bleeding are known as haemophilia. Natural blood coagulation is regulated by the presence of various coagulation factors which act together to provide a normal balance between the natural tendency for coagulation and that of bleeding.

In certain cases, in particular in pathological situations, the coagulation process must be corrected or modified with the aid of the administration of an anticoagulant agent for treating or preventing certain problems or pathologies. The degree of the anticoagulant effect achieved when using these agents in the form of drugs depends on a large number of factors which are often not very well known. However, in the event of overdosing, accidental bleeding from natural orifices may occur. Such treatments thus involve regularly monitoring the degree of anticoagulation, generally by carrying out a blood test.

Non-physiological anticoagulants, for example synthetic anticoagulants, i.e. medicinal anticoagulants, are thus commonly prescribed for the prevention and/or for the treatment of diagnosed problems.

Available medicinal anticoagulant agents inhibiting coagulation enzymes belong to two large families of anticoagulants: 1/heparins, and 2/direct oral anticoagulants (DOAC), the agents of the two families corresponding to inhibitors of coagulation factor Xa and/or factor IIa.

Heparins are irreversible indirect inhibitors of factors Xa and IIa. They can be divided into two classes: unfractionated heparins (UFH) and low molecular weight heparins (LMWH). UFHs have a (anti-Xa capacity/anti-IIa capacity) ratio which is close to 1, while LMWHs have a (anti-Xa capacity/anti-IIa capacity) ratio which close to 2 or 3.

Direct oral anticoagulants (DOACs) are reversible direct inhibitors which are specific for factor Xa or factor IIa. The principal DOACs which are specific for factor Xa are rivaroxaban, apixaban and edoxaban. The principal DOAC which is specific for factor IIa is dabigatran. Tables 18 and 20 provide more complete details of other known synthetic inhibitors of factors Xa and IIa.

In order to determine the haemostatic status of subjects in clinical situations requiring it and in order to monitor the haemostatic status of patients having anticoagulant treatment, various tests have been envisaged to detect and/or assay the coagulation parameters.

As an example, clinical tests are known which can be used to determine the presence of a hypocoagulation state, like in the case of an increase in prothrombin levels or the Quick's time. However, these medical biological tests require laboratory equipment which is not always available in all places.

Tests are also known which can be used to detect the presence of a precise, usually unique, anticoagulant, the presence of which is suspected. As an example, the STA®—Liquid Anti-Xa kit marketed by the Applicant is intended for use with instruments from the STA-R® range for a quantitative determination of plasma levels of unfractionated heparin (UFH) or of low molecular weight heparins (LMWH) by measuring their anti-Xa activity in a competitive test using a synthetic chromogenic substrate. Depending on the experience, availability of equipment and reactivity of the operator, this test, which can be carried out in about ten minutes, is highly relevant, in particular when it is known what to look for. However, this type of test always requires a calibration test to be carried out.

The Stago STA®—Multi-Hep Calibrator kit, which can be used for the assay of both UFHs and LMWHs, is also known; it uses a common methodology and hybrid calibration. However, that kit cannot be used to detect DOACs.

There are still situations, in particular clinical situations, in which the drug regime of the patient under consideration is not known with certainty or cannot be determined (for example if the patient is unconscious), which complicates the detection process. For instance, it may be necessary or preferable to know the anticoagulant regime of a patient by identifying the anticoagulant or anticoagulants administered to them and their concentration in the patient, and in fact possibly immediately after admission of the patient into care, possibly under emergency conditions, for example in the context of a drug treatment, biological or clinical tests, or a surgical intervention. In general, the detection of the presence in a blood sample of one of the known anticoagulant drugs or in fact their identification may be highly useful in an emergency situation (in the context of haemorrhaging, setting up antidoting, etc). Available tests for assaying anticoagulant agents are suited for the assay of anticoagulants, the identity of which is known and communicated at the right time during the examination of the patient and for it could have been checked that they have been prescribed or administered to the examined patient. In contrast, "blind" assay tests, which could, in a first step, identify the presence of anticoagulant(s) in a biological sample, and then determine their category and/or their identity and finally, if appropriate, their concentration in a test which is effective for collecting biological or clinical information, are not available, although they would clearly be useful in order to respond to certain situations in the clinical care of patients.

Finally, while there are currently several commercial solutions for assaying the various anticoagulants mentioned above, all of those solutions necessarily involve the use of a dedicated kit having its own calibrations and controls as well as its own experimental methodology.

In fact, using the example of the measurement of the presence of an anticoagulant which inhibits factor Xa, the use of current methods imposes a minimum of four assays (for example an assay of heparins using hybrid methodology and three anti-Xa DOAC assays). Identification without prior information regarding the anticoagulant molecule is currently impossible.

Thus, in particular, the invention proposes solving some or all of the problems identified in the preceding paragraphs, in particular the problem of "blind" detection of the presence or not of an anticoagulant inhibiting a blood coagulation enzyme in a blood sample. In particular, for the first time, the proposed solution provides a test which is particularly suitable to a clinical care situation, in particular in an emergency context, in a situation where there is uncertainty regarding the treatment regime for the patient or in a situation where the patient is unconscious. While a test of this type must be convenient and save time for the user in the context of clinical care, it naturally must also be reliable given that the situation might be life-threatening. Such a test should allow the reliable identification of an agent contained in a blood sample the presence of which is not known or might be suspected. It will be noted that currently, no test of this type is in existence.

In accordance with a particular aspect, the invention concerns the detection of exogenous anticoagulant agents, also termed "synthetic" anticoagulants herein, in particular the detection of anticoagulant drugs, and preferably also permitting detection using a single test, allowing a conclusion to be reached without having to repeat a multitude of separate tests.

DETAILED DESCRIPTION

For this reason and in order to solve these problems, an in vitro method for detecting, in a biological sample, in particular a blood sample, the presence of an inhibitor of a blood coagulation enzyme selected, independently, from factor Xa (FXa) and factor IIa (FIIa), the method comprising the following steps:
a. making one or more competitive kinetics measurement(s) by carrying out a competitive enzymatic assay on a blood sample which has been obtained from a subject, said assay being suitable for carrying out competitive kinetic measurements, either having regard to an inhibitor of factor Xa, or to an inhibitor of factor IIa (independently of each other), then
b. inputting the kinetic measurement(s) obtained in step a. to a classification decision model A obtained by training an automated supervised learning model, for example a model selected from one of the following categories: support-vector machines, neural networks, decision trees, ensemble methods, and k-nearest neighbour models, in particular wherein the parameters have been calculated by training, then
  i. if the decision model A excludes the presence of an inhibitor of the blood coagulation enzyme whose presence is sought in the analysed sample, concluding to the absence of said inhibitor, and optionally assigning by the model A the corresponding information as an output, for example in a variable, or
  ii. if the decision model A confirms the presence of an inhibitor of the blood coagulation enzyme whose presence is sought in the analysed sample, concluding to the presence of said inhibitor, and optionally assigning by the model A the corresponding information as an output, for example in a variable.

The blood sample which is tested is, for example, a sample of blood or a sample of plasma. It may or may not be diluted, depending on what is needed.

The invention solves the so-called "blind detection" problem. The term "blind detection" indicates that, in accordance with the invention, it is not known in advance if an inhibitor of a target enzyme is present in the sample, nor, a fortiori, which inhibitor could be present, and the method described herein is thus suitable for and, depending on the models provided in this context, can serve for, the detection of any coagulation inhibitor acting on factors Xa and/or IIa.

More particularly, the invention envisages the detection of an inhibitor which is termed medicinal herein (also termed "synthetic" in Tables 17 to 20) of factor Xa (FXa) or of factor IIa (FIIa), in contrast to an inhibitor said to be "natural" or physiological (the distinction being illustrated in the form of lists in Tables 17 to 20), the inhibitor having a selective anticoagulant function—because of the targeted enzyme. In a particular embodiment of the invention, an inhibitor in question of a coagulation enzyme is thus a non-physiological inhibitor. Such an inhibitor is in particular a medicinal inhibitor. In accordance with a particular aspect, a medicinal inhibitor may be found in a sample from a patient in a concentration which is substantially higher than a "natural" physiological concentration. In accordance with particular embodiments, said inhibitors belong to the family of the heparins or that of the DOACs.

Examples of medicinal (synthetic) inhibitors of factor Xa designated by their active substance or INN are therefore: rivaroxaban, apixaban, edoxaban, betrixaban, UFHs, for example UFH calcium, UFH sodium, LMWHs, a pentasaccharide, danaparoid sodium. The proof of concept reported upon in the present application more particularly envisages: heparins, which are unfractionated heparins (UFH) such as UFH calcium or UFH sodium, low molecular weight heparins (LMWH), such as those constituting the active principles of Fragmine®, Lovenox®, Innohep®, or DOACs, namely rivaroxaban, apixaban, edoxaban, but it should be understood that the method described herein may be implemented for any type of inhibitor of factor Xa and or IIa, if a suitable substrate is provided for the enzyme, and if suitable models have been generated or could be generated in agreement with the guiding principles described and illustrated herein. Examples of medicinal (synthetic) inhibitors of factor IIa designated by their active substance or INN are therefore: dabigatran, melagatran, argatroban, bivalirudin, UFHs, LMWHs. Based on the literature regarding artificial intelligence algorithms and their implementation at their disposition, and following the content of the experimental section of the present description, the person skilled in the art could adapt the protocols described herein to substitute, incorporate or add other models that enable a decision to be made.

The term "selected blood coagulation enzyme" therefore envisages factor Xa and factor IIa, the inhibitors of which are investigated independently of each other, respectively, in the same test. In a particular embodiment, the method described herein proposes detecting the presence (and in subsequent steps, if appropriate, detecting the identity and preferably carrying out a quantitative assay, for example to provide the concentration), of either an inhibitor of factor Xa, or of an inhibitor of factor IIa, excluding concomitant detection of the two.

The term "making one or more competitive kinetics measurement(s)" in step a., indicates that, in accordance with a particular embodiment, the measurements may be repeated several times on the basis of the same blood sample taken from a subject (preferably a human being, in particular a patient), in order to offer better reliability Several kinetic measurements could therefore be provided in all of the steps which necessitate it, or a single kinetic measurement incorporating all of the others could be provided. In order to carry out an enzymatic assay in a manner such as to obtain competitive kinetics in the context of the invention, the following conditions for carrying out the biochemical reactions must be combined: the blood sample that might contain the target coagulation enzyme inhibitor is brought into the presence of a selected substrate for the target enzyme, preferably a specific substrate for the target enzyme, and an incubation step is carried out before adding target enzyme to the reaction mixture under conditions that enable competition between the inhibition reaction of the enzyme and the enzymatic reaction of said enzyme with its substrate. The substrate employed is normally marked in a manner such as to allow liberation of the marker when the enzyme interacts with this substrate to transform it into the product of the enzymatic reaction and to subsequently allow the measurement of said marker which has been liberated and record its variation over time in the form of the liberation kinetics of the marker which is impacted when the inhibitor is present in the sample, this impact also being modulated by the concentration of the inhibitor. Kinetic schemes for the competitive assay reactions are illustrated in the examples. The substrates indicated for the enzymatic reaction with the target enzyme are known to the person skilled in the art; examples of those which are suitable for carrying out the invention which may be mentioned are: the substrate MAPA-Gly-Arg-pNA, which is specific for factor Xa which, once transformed by the FXa, induces the liberation of paranitroalanine (pNA) which can be detected by colorimetry with a measurement at 405 nm, or the substrate MAPA-Gly-Arg-AMC or any known variant thereof, which induces the liberation of aminomethyl coumarin (AMC), which can be detected by fluorometry, or the substrate EtM-SPro-Arg-pNA, which is specific for factor IIa, or any variant known to the person skilled in the art.

The measurement of competition kinetics in accordance with step a., is a measurement which is carried out in vitro, in accordance with the usual practice in the field of haemostasis testing, and in accordance with well-known techniques, examples of which are provided below. This experimental step is carried out in accordance with conventional practices which are well known to the person skilled in the art.

However, it will be understood that there is an unbreakable link between the reliability of the results throughout the classification chains proposed in the present invention, the data sets which are used for training the models and the kinetic data obtained from the blood sample from the subject under consideration, and therefore said data sets and said kinetic data for the test carried out on the sample from the subject must have been obtained under near-identical if not identical experimental conditions. Thus, it can be said that the decision models used are linked/associated with the reagents and instruments used in the context of collection of test data from a subject.

This having been stated, it does not mean that the invention has to be carried out on a particular model of instrument or measuring device, or with a particular model of reagent. It is sufficient to simply compare the results of tests or experiments carried out under similar experimental conditions so that the result is not falsified; the algorithmic methods described herein replace inter-instrumental calibration and can be used to dispense with the need for calibration for each test or batch of tests carried out.

The term "classification decision model A obtained by training an automated supervised learning model", for example a model selected from one of the following categories: "support-vector machines, neural networks, decision trees, ensemble methods, and k-nearest neighbour models", refers to the multiple possibilities for implementing an automated supervised learning model, such as those documented in the literature in particular. On the basis of their general knowledge, the person skilled in the art could modify the type of model used to adapt the observed performances to their needs and envisaged objectives. See [Géron, 2017] or Bonaccorso, G. (2017), for example, but this is not exhaustive.

By definition, the parameters of an automated supervised learning model have been calculated by training, in a manner which is conventional in the field. See [Géron, 2017] or Bonaccorso, G. (2017), for example, but this is not exhaustive.

In accordance with a particular embodiment, the classification decision model A is a support-vector machine, in particular obtained by training a support-vector machine. A more particular embodiment applied to studying an inhibitor of factor Xa is as described in the experimental section.

It follows from the essence of the invention that the method described herein takes into account the result of training of an automated learning model on data sets which have already been collected and established. Typically, such a classification decision model may consist of a matrix corresponding to an empirically determined mathematical function which, applied to an input data set (the constitution of which is unknown before carrying out the method in accordance with the invention), can render a solution. In respect of model A, the solution may, for example, be either "yes" or "no", meaning the presence or absence of an inhibitor in question (which could be encoded by an integer, such as "1" or "0").

In fact, step b. reported above is a step which is necessarily carried out by a computer because of the complexity of the mathematical function which is determined empirically by learning.

In accordance with another particular embodiment, the classification decision model A is a neural network, in particular a multilayer perceptron, in particular obtained by training a neural network, in particular a multilayer perceptron. A more particular embodiment of such a model A applied to studying an inhibitor of factor Xa is as described in the experimental section.

Examples of implementation, in particular of models for the implementation of a support-vector machine or a neural network, such as a multilayer perceptron, are known to the person skilled in the art, if needs be with reference to the literature in the field (See [Géron, 2017] or Bonaccorso, G. (2017), for example, but this is not exhaustive). More precisely, the LIBSVM package (csie.ntu.edu) implemented in the scikit-learn library (scikit-learn.org) may be used. Examples of parameters that the person skilled in art will wish to fix, independently or not with respect to each other, are the node (linear, polynomial, gaussian, sigmoidal, etc), the coefficients of the node and the naked parameter associated with the SVM model. The person skilled in the art may in particular refer to Géron, 2017 or Bonaccorso, G. (2017), for the implementation of such models, including regarding the modalities for fixing the aforementioned parameters including, if necessary, the guidance explicitly or implicitly contained in the present description.

In the case of the confirmed presence of an inhibitor, a further embodiment of the present invention then includes a step for identification of the inhibitor of said detected enzyme.

The invention therefore further concerns an in vitro method for identifying, in a biological sample, in particular a blood sample, an inhibitor of a blood coagulation enzyme selected, independently, from factor Xa (FXa) and factor IIa (FIIa), the method comprising the following steps:
1. carrying out the steps of the detection method described above or any particular embodiment of this method as described and in the present description, then
2. inputting the kinetics obtained in the step of point a. above (in the context of detection) and the result obtained at the end of step b. ii. above (in the context of detection), to a classification decision model B obtained by training an automated supervised learning model, for example a model selected from one of the following categories: support-vector machines, neural networks, decision trees, ensemble methods, and k-nearest neighbour models, in particular wherein the parameters have been calculated by training, and assigning by the model B of the category of the inhibitor to one of the following categories: irreversible indirect inhibitor (heparins), or reversible direct inhibitor (DOAC), in particular when the data sets used to train the model B comprise data relating to these two categories of inhibitors, and outputting, for example by allocating to a variable, the category of the inhibitor determined by the model B.

By analogy, the term "classification decision model B", indicates the same as above with regard to "model A".

In accordance with a particular embodiment, the classification decision model B is a k-nearest neighbour model, in particular obtained by training a k-nearest neighbour model. A more particular embodiment applied to studying an inhibitor of factor Xa is as described in the experimental section.

The term "in particular when the data sets used to train the model B comprise data relating to these two categories of inhibitors, i.e., irreversible indirect inhibitor (heparins), and reversible direct inhibitor (DOAC)" should be understood to mean that the invention requires that the data sets used for learning must be in correlation with the type of information which is unknown and to be obtained. Guidance for the person skilled in the art will naturally come out of the examples provided in the experimental section.

In fact, the step for implementing model B is a step which is necessarily carried out by a computer because of the complexity of the mathematical function which has been determined empirically by learning.

In accordance with another particular embodiment, the classification decision model B is a neural network, in particular a multilayer perceptron, in particular obtained by training a neural network, in particular a multilayer perceptron. A more particular embodiment of such a model B applied to studying an inhibitor of factor Xa is as described in the experimental section.

Examples of implementation, in particular of models for the implementation of a k-nearest neighbour model or a neural network such as a multilayer perceptron, are known to the person skilled in the art, if needs be with reference to the literature in the field (See [Géron, 2017] or Bonaccorso, G. (2017), for example, but this is not exhaustive). More precisely, the scikit-learn library (scikit-learn.org) may be used, for example. The parameters that the person skilled in the art will wish to fix are, for example, and independently or not of each other, the number of neighbours as well as the distance metric. The person skilled in the art may in particular refer to Géron, 2017 or Bonaccorso, G. (2017), for the implementation of such models, including regarding the modalities for fixing the aforementioned parameters including, if necessary, the guidance explicitly or implicitly contained in the present description.

The implementation of model B renders a response relating to a "category of inhibitor" selected from two: reversible direct inhibitor (alternatively known as "DOAC" in the present text), irreversible indirect inhibitor (alternatively known as "heparins" in the present text) (see the explanations of these concepts in FIG. 1). In fact, since heparins are all irreversible indirect inhibitors, and DOACs (direct oral anticoagulants) are all reversible direct inhibitors, when, in accordance with a particular embodiment corresponding to the proof of concept described in the experimental section, the data sets provided for learning involve active principles belonging to these two families only, the method in accordance with the invention will be able to distinguish between these two particular families, and indicate them as "heparins", and "DOAC".

In accordance with another aspect, the in vitro method for identification described in the preceding paragraphs (in contrast to the "detection" method described above) may also comprise an additional step for characterization of the inhibitor the presence of which has been detected in step b. ii above (in the context of detection), as follows: inputting the kinetic measurement(s) obtained in step a. above (in the context of detection), equivalent to step 1. above, and the determined output datum, for example the variable assigned in step 2. above implementing model B concerning the category of inhibitor the presence of which has been detected, to a classification decision model C obtained by training an automated supervised learning model, for example a model selected from one of the following categories: support-vector machines, neural networks, decision trees, ensemble methods, and k-nearest neighbour models, in particular wherein the parameters have been calculated by training, and outputting the characterization, by the model C, of the inhibitor in question, this latter being identified from among:
  a. in the case in which the category of the inhibitor in question is that of the heparins: UFH or LMWH (for inhibitors of factor Xa and/or IIa), or b. in the case in which the category of the inhibitor in question is that of the DOACs: rivaroxaban, apixaban, edoxaban (for an inhibitor of factor Xa) or dabigatran (for an inhibitor of factor IIa), and outputting, for example by allocating to a variable, the characterization of the inhibitor determined by the model C.

The term "classification decision model C", indicates the same as above with regard to "model A" or to "model B", by analogy.

In accordance with a particular embodiment, the classification decision model C is a neural network, in particular a multilayer perceptron, in particular obtained by training a neural network in particular a multilayer perceptron. A more particular embodiment applied to studying an inhibitor of factor Xa is as described in the experimental section.

In fact, the step for implementation of model C is a step which is necessarily carried out by a computer because of the complexity of the mathematical function which has been determined empirically by learning.

Examples of implementation, in particular of models for the implementation of a neural network, in particular a multilayer perceptron, are known to the person skilled in the art, if needs be with reference to the literature in the field (See [Géron, 2017] or Bonaccorso, G. (2017), for example, but this is not exhaustive). More precisely, the scikit-learn library (scikit-learn.org) may be used, for example. The parameters that the person skilled in the art will wish to fix are, for example, and independently or not of each other, the number of layers of neurons, the number of neurons per layer and the activation functions for the various neurons. However, the user has a certain amount of freedom in respect of implementation concerning the learning algorithm or the regularization parameters. The person skilled in the art may in particular refer to Géron, 2017 or Bonaccorso, G. (2017), for the implementation of such models, including regarding the modalities for fixing the aforementioned parameters including, if necessary, the guidance explicitly or implicitly contained in the present description.

In accordance with another aspect, the in vitro method for identification described in the preceding paragraphs, after implementing model C, may also comprise an additional step of quantitative assay of the characterized inhibitor, in which the kinetic measurements obtained in step a. above (in the context of detection), equivalent to step 1. above and the characterization datum obtained following the implementation of model C identifying the inhibitor present in the analysed blood sample are input into a regression model D, in particular an automated supervised learning model, for example a model selected from one of the following categories: support-vector machines, neural networks, decision trees, ensemble methods, and k-nearest neighbour models, said regression model having been trained on a data set obtained under measurement conditions identical to those of step a. above (in the context of detection), equivalent to step 1. above, and enabling the concentration of the inhibitor identified in the analysed sample to be determined at the output and optionally outputting, for example by allocating to a variable, the concentration determined by the model D.

"Enabling the concentration of the inhibitor identified . . . to be determined at the output" may also be written as "determining the concentration of the identified inhibitor at the output" or "returning the concentration of the identified inhibitor to the output".

The term "regression model D", or "automated learning model of the regression model type" indicates the same as above with regard to "model A", to "model B" or to "model C", by analogy.

In accordance with a particular embodiment, the model D is a neural network, in particular a multilayer perceptron, in particular obtained by training a neural network, in particular a multilayer perceptron. A more particular embodiment applied to studying an inhibitor of factor Xa is as described in the experimental section.

In fact, the step for implementation of model D is a step which is necessarily carried out by a computer because of the complexity of the mathematical function which has been determined empirically by learning.

Examples of implementation, in particular models for the implementation of a neural network, in particular a multilayer perceptron, are known to the person skilled in the art, if needs be with reference to the literature in the field (See, for example, in a non-exhaustive manner, [Géron, 2017]). More precisely, the scikit-learn library (scikit-learn.org) may be used, for example. The parameters that the person skilled in the art will wish to fix are, for example, and independently or not of each other, the number of layers of neurons, the number of neurons per layer and the activation functions for the various neurons. However, the user has a certain amount of freedom in respect of implementation concerning the learning algorithm or the regularization parameters. The person skilled in the art may in particular refer to Géron, 2017 or Bonaccorso, G. (2017) for the implementation of such models, including regarding the modalities for fixing the aforementioned parameters including, if necessary, the guidance explicitly or implicitly contained in the present description.

It will be obvious that the references "A", "B", "C" and "D" for the models discussed in the present description have been indicated in order to facilitate reading, but that these letters may be omitted without modifying the meaning indicated by them. In particular:

a model which is referred to by the letter "A" serves to exclude or confirm the presence of an inhibitor of the blood coagulation enzyme whose presence is sought in the analysed sample, in accordance with any one of the definitions described in the present description for that inhibitor;

a model which is referred to by the letter "B", if implemented, serves to determine a "category of inhibitor" selected from two: reversible direct inhibitor (alternatively known as "DOAC" in the present text), irreversible indirect inhibitor (alternatively known as "heparins" in the present text);

a model which is referred to by the letter "C", if implemented, serves to define the characterization commenced with the model "B": among the heparins, the inhibitor in question may be classified as UFH or LMWH (whether the inhibitor in question is an inhibitor of factor Xa and/or IIa), and among the DOAC, the inhibitor in question may be classified between: rivaroxaban, apixaban, edoxaban (for an inhibitor of factor Xa) or dabigatran (for an inhibitor of factor IIa);

a model which is referred to by the letter "D", if implemented, serves to determine the concentration of the identified inhibitor at the output. This is also the case for a model termed "D2" in the present description, detailed below: this model also serves to determine the concentration of an inhibitor at the output.

At this stage, it should be noted that the method or methods described herein, irrespective of whether the chain of steps detailed above is implemented in full or in part, and as demonstrated by the proof of concept which is the subject of the examples, bring(s) a solution to the problems mentioned above by carrying out a competitive enzymatic test combined with a universal algorithmic processing methodology. The method or methods of the invention described herein are made sensitive to the presence, if appropriate within flexible concentrations, of the anticoagulant agents anti-Xa or anti-IIa, the competitive enzymatic test being coupled to artificial intelligence which, in accordance with various particular embodiments, is implemented by a cascade of automated learning models (carried out in their entirety or in part). The advantages of this are:

- the provision of a universal methodology: a single test may be sensitive to the presence, in a variety of concentrations, of several types of anticoagulants in a sample (anti-Xa and/or anti-IIa anticoagulants), in particular, the anticoagulants more particularly described in accordance with any embodiment forming the subject matter of the present description;
- for detecting this presence: a single test is carried out, as opposed to a plurality (five for the assay of UFH, LMWH, rivaroxaban, apixaban, edoxaban or four in the hybrid methodology discussed above—one kit only for the heparins);
- doing away with calibration: ease of use for the user;
- identification of the desired exogenous anticoagulant molecule from a specific number: this is currently impossible, and so the clinical advantage for the patient is obvious.

In accordance with a particular embodiment of the invention, the method or methods described in the present text are applied to the study of an inhibitor of factor Xa (FXa) selected from: UFH, LMWH, rivaroxaban, apixaban, edoxaban.

In accordance with another particular embodiment of the invention, the method or methods described in the present text are applied to the search for an inhibitor of factor IIa (FIIa) selected from: UFH, LMWH, dabigatran.

In accordance with a more precise embodiment, the method of the invention is applied precisely and specifically to the search for an inhibitor of factor Xa.

It will readily be understood, in particular by referring to the experimental section concerning the importance, in the particular case of the examples, of a methodology termed "optimized methodology for DOACs" that in some cases, it may be appropriate to adapt the decision cycles in order to allow a new experimental measurement step to be introduced which, for example, can be used for the subsequent chain of decisions which is permitted by the present invention to enable a more reliable validation or for adaptation to more precise objectives or different objectives (in particular as regards the range of concentration of the inhibitor(s) which are to be capable of being detected).

In fact, it has been confirmed that the use of said STA®— Liquid Anti-Xa kit described above for studying DOACs, under dilution conditions and for a period of measurement period which is adapted to the study of heparins (the kit having initially been designed for this purpose) could not be used to obtain measurements over the full range of envisaged values for the inhibitor concentrations: thus, an adjustment has been proposed as regards the dilution and the measurement period in order to optimise, modulate, the method described herein in order to meet the particular objective of being able to target specific concentrations. This adjustment has been implemented in the form of an "experimental follow-up" (making a new competitive kinetics measurement by carrying out a competitive enzymatic assay), incorporated into a method which has otherwise already been initiated. The advantage of an experimental follow-up may depend on the inhibiting activity of the anti-Xa anticoagulant (heparins, DOACs) as targeted by the investigation, as well as the range of concentrations which are to be measured, in particular with precision.

However, the invention encompasses situations in which the conditions employed, for example either in the "universal methodology" or in the "methodology optimized for DOACs" of the examples, are used from the start.

The guidance provided herein enable the user to determine, from any kit employed for carrying out kinetic measurements, in particular those which are known in the art, the dilution conditions, if necessary, and the measurement period, to be applied in a homogeneous manner both for the measurements influencing the learning data and those for the data which are effectively measured blind.

In general, these adjustments as described in the examples demonstrate that the person skilled in the art is capable of adjusting the manner according to which the "models" described herein or the modalities for classification(s), decision(s) and the compared data, can be concatenated in order to incorporate an experimental follow-up, in accordance with the guidance implicitly and explicitly detailed in the present application.

In fact, as implied in the experimental section providing the proof of concept, the method of the invention also functions when the experimental data initially obtained in the "detection" step a. described above are used in place of those obtained from an experimental follow-up: the range of values for the concentrations of inhibitors which may be detected is then simply different. Herein, this is the optimisation that the person skilled in the art can apply on the basis of general knowledge, and optionally from the guidance provided herein. Furthermore, the adjustments described herein, if necessary along with the test methods indicated in the experimental section, may be made by the person skilled in the art in order to adapt the invention described to different known detection or assay kits without the essence of present invention to be challenged.

In accordance with a particular embodiment, the present invention thus also concerns an in vitro method for identifying an inhibitor of factor Xa the presence of which has been detected in step b. ii above (in the context of detection), comprising the following additional characterization step:

I. if the category of inhibitor has been assigned to the heparins category in step 2. in which the model B has been implemented, then:
i. inputting said determined output datum, for example the variable assigned in step 2. above implementing model B concerning the category of inhibitor the presence of which has been detected, and the competitive kinetic measurement(s) in respect of an inhibitor of factor Xa obtained in step a. above (in the context of detection) equivalent to step 1. above, to a classification decision model C obtained by training an automated supervised learning model, for example a model selected from one of the following categories: support-vector machines, neural networks (in particular a multilayer perceptron), decision trees, ensemble methods, and k-nearest neighbour models, in particular wherein the parameters have been calculated by training, and
ii. outputting the characterization, by the model C, of the inhibitor in question, this latter being identified from among: UFH or LMWH, and outputting, for example by allocating to a variable, the characterization of the inhibitor determined by the model C, or alternatively, II. if the category of inhibitor has been assigned to the category of DOACs in step 2. in which the model B has been implemented, then:

i. making one or more new competitive kinetics measurements (experimental follow-up) by carrying out a competitive enzymatic assay on a blood sample obtained from one (and the same) subject, said assay being suitable for carrying out competitive kinetic measurements with respect to an inhibitor of factor Xa, with a dilution factor for the sample and/or a measurement period adapted to a competition situation involving the presence of DOAC inhibiting the factor Xa, in particular a dilution factor and/or a measurement period which is different from that (those) employed for the measurement of the kinetic measurement(s) obtained in step a. above (in the context of detection) equivalent to step 1. above, then ii. inputting said determined output datum, for example the variable assigned in step 2. above implementing model B concerning the category of inhibitor the presence of which has been detected, and the kinetic measurement(s) obtained in the preceding step i., to a classification decision model C obtained by training an automated supervised learning model, for example a model selected from one of the following categories: support-vector machines, neural networks (in particular a multilayer perceptron), decision trees, ensemble methods, and k-nearest neighbour models, in particular wherein the parameters have been calculated by training, and iii. outputting the characterization, by the model C, of the inhibitor in question, this latter being identified from among: rivaroxaban, apixaban, or edoxaban, and outputting, for example by allocating to a variable, the characterization of the inhibitor determined by the model C.

The term "classification decision model C", however, indicates the same as that above relating to "model A" or to "model B", by analogy.

In accordance with a particular embodiment, the classification decision model C is a neural network, in particular a multilayer perceptron, in particular obtained by training a neural network in particular a multilayer perceptron. A more particular embodiment applied to studying an inhibitor of factor Xa is as described in the experimental section.

In fact, the step for the implementation of model C is a step which is necessarily carried out by a computer because of the complexity of the mathematical function which has been determined empirically by learning.

It should be understood that in the context of carrying out step ii. of the preceding paragraph, the envisaged classification decision model C was trained on appropriate training data having regard to the context in which it is employed. In particular, these data are adapted to the effective implementation of a classification taking into account the circumstances of the measurement involving an experimental follow-up (having regard to the parameters enabling a competitive kinetics measurement to be carried out in the context of step i., in particular as regards the dilution factor for the sample and/or the measurement period employed—in other words and logically, the "context" for carrying out the measurements coincides with/corresponds to that concerning the learning data used, the measurement parameters employed (or measuring kits employed) and the measuring zone envisaged for the tested target sample).

Examples of implementation, in particular models for the implementation of a neural network, in particular a multilayer perceptron, are known to the person skilled in the art, if needs be with reference to the literature in the field (See, for example, in a non-exhaustive manner, [Géron, 2017]). More precisely, the scikit-learn library (scikit-learn.org) may be used, for example. The parameters that the person skilled in the art will wish to fix are, for example, and independently or not of each other, the number of layers of neurons, the number of neurons per layer and the activation functions for the various neurons. However, the user has a certain amount of freedom in respect of implementation as regards the algorithms and the regularization parameters. The person skilled in the art may in particular refer to Géron, 2017 or Bonaccorso, G. (2017) for the implementation of such models, including regarding the modalities for fixing the aforementioned parameters including, if necessary, the guidance explicitly or implicitly contained in the present description.

In the context of making one or more new competitive kinetics measurements (experimental follow-up) by carrying out a competitive enzymatic assay appropriate to this particular embodiment, it should be noted that, advantageously:

this new measurement is carried out on a blood sample obtained from the same subject as the measurement initially carried out for "detection" (but clearly, that employed for the initial measurement could not be reused), said assay for the experimental follow-up is adapted to carrying out a competitive kinetic measurement as regards an inhibitor of factor Xa, naturally with a dilution factor for the sample and/or a measurement period which is (are) adapted to a competition situation involving the presence of DOAC inhibiting the factor Xa, so that the measurement makes sense (by employing the verification methods illustrated in the experimental section, the person skilled in the art may, for example, verify this adaptation), and preferably, the dilution factor of the analysed sample in the experimental follow-up and/or the measurement period, is(are) different from that (those) employed for the measurement of the kinetic measurement(s) obtained in step a. above (in the context of detection).

An assay is considered to be adapted to "carrying out a competitive kinetics measurement in respect of an inhibitor of factor Xa, naturally with a dilution factor and/or a measurement period which is (are) adapted to a competition situation indicating the presence of DOAC inhibiting factor Xa" as soon as it is possible to obtain a kinetic trace in accordance with conventional practices in the field. Examples of traces are shown in FIGS. 5 to 9. The person skilled in the art is capable of adapting the experimental conditions of an assay test in order to obtain this type of trace which is considered to be fit for the purpose.

As indicated below, the following parameters may be taken into account:

The substrate employed must be specific for factor Xa but have little affinity for it so as not to interfere with the reaction between the enzyme and its inhibitor.

As an example, the substrate employed must have a Michaelis constant KM which is considered to be high, in particular between approximately 10 µM and 1000 µM; and/or Because the affinity between the enzyme and the substrate is deliberately selected so as to be low, the catalytic constant kcat of the enzyme for the substrate must be sufficiently high, for example more than approximately 10 s-1, or more than 10 s-1; and/or the initial concentration of substrate [S]0 must be sufficient to allow the generation of the marker throughout the period d of the measurement, which constitutes a conventional adaptation for the person skilled in the art (see also the formula below in the experimental section). In accordance with one embodiment, the initial concentration of substrate [S]0 is less than KM*10; and/or The duration of the measurement is selected so as to be sufficiently long to enable the anticoagulant, if present, to exert its inhibiting action on the enzyme and so that this is observable via the measurement; as an example, a duration which is comprised between 10 and 1000 seconds.

The elements provided in the preceding paragraph relating to the situation in which the substrate employed is specific for factor Xa are of identical application to the situation in which the substrate employed is specific for factor IIa. In fact, these elements apply generally to any embodiment of the kinetics envisaged in the present description.

Although it is indicated that the dilution factor and/or the measurement period for the sample analysed in the experimental follow-up is (are) different from that (those) employed to measure the kinetic measurement(s) obtained in step a. above (in the context of detection) equivalent to step 1. above, solely by way of illustration, in the two cases, the ranges of values which can be envisaged for these two parameters may be:

For the dilution factor, the sample is diluted, if necessary, to a range between 1/2 and 1/50 (the volumes generally employed for the kinetic measurements per se are as indicated below in the present description, although this aspect is not in any way limiting, since the measuring volumes may vary as a function of the devices provided for such measurements), and/or The measurement period is comprised between 10 and 1000 seconds.

These parameters are relatively universal parameters, but are not limiting because the person skilled in the art might need to adapt them as a function of the equipment used for the assay.

The dilution may be carried out in any buffer which is conventionally used for this purpose, as is known to the person skilled in the art or indicated in the manufacturer's instructions.

In fact, the present application covers the situations in which the sample is diluted, if necessary and with respect to the departure sample previously recovered from the individual whose sample is to be analyzed, in a ratio of 1/2, 1/3, 1/4, 1/5, 1/6, 1/7, 1/8, 1/9, 1/10, 1/11, 1/12; 1/13, 1/14, 1/15, 1/16, 1/17, 1/18, 1/19, 1/20, 1/21, 1/22; 1/23, 1/24, 1/25, 1/26, 1/27, 1/28, 1/29, 1/30, 1/31, 1/32; 1/33, 1/34, 1/35, 1/36, 1/37, 1/38, 1/39, 1/40, 1/41, 1/42; 1/43, 1/44, 1/45, 1/46, 1/47, 1/48, 1/49, 1/50, or any interval between any one of these values.

In fact, the present application covers the situations in which the volume employed for the kinetic measurements per se is 1, 2, 3, 4, 5, 6, 7, 8, 9, 10, 20, 30, 40, 50, 60, 70, 80, 90, 100, 150, 175, 200, 225, 250, 275, 300, 325, 350, 375, 400 µL, or any intermediate value comprised in a range of values defined as an interval between any one of the values mentioned immediately above.

In accordance with another implementational variation of the invention, the method or one of the methods described herein may be carried out on dedicated point of care devices, for example systems for carrying out unitary tests with miniaturisation devices such as devices utilising microfluidics, for example. In this case, and in conventional manner, the method or one of the methods described herein could be carried out with reaction volumes which are adapted to the device used or to the implementational context, said volumes possibly being in the range 1 to 20 µL but not limited thereto, depending on the miniaturised device employed. If necessary and in a manner which is conventional to the person skilled in the art, the incubation period could also be adapted as a function of the characteristics of said device used or in the context of the implementation employed.

For the measurement period, and by way of illustration, it may be 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 seconds, or any intermediate value comprised in a range of values defined as an interval between any one of the values mentioned immediately above.

The person skilled in the art will understand that according to such a manner of carrying out the invention, with dedicated point of care devices described above, said measurement period could be adapted in a manner which is conventional for the person skilled in the art.

An experimental follow-up, as envisaged as a function of the objectives being pursued, may enable optimisation of identification and/or assay of an inhibitor of factor Xa present in a more particular range of concentrations or at least a different range in the blind analysed sample. The experimental section provides principles which the person skilled in the art will readily be able to reproduce in order to verify that an experimental follow-up is of importance or that kinetic measurements can effectively be obtained.

In accordance with another aspect, and in a manner which is analogous to the above description, a regression model D could be applied following the classification decision model C implemented on the basis of an experimental follow-up.

However, and in accordance with another embodiment, the in vitro method for identification described herein, if appropriate applied to the identification of an inhibitor of factor Xa, and comprising an additional step for quantitative assay of the characterized inhibitor employing a regression model D, may take advantage of making one or more new competitive kinetics measurements (experimental follow-up) by carrying out a competitive enzymatic assay on a blood sample obtained from one (and the same) subject, not upstream of a classification decision model C as described above, but upstream of the implementation of said regression model D alone. In this case, the steps described above are modified to only incorporate carrying out a new measurement (experimental follow-up)—in accordance with the same modalities as described above—before implementing said regression model D, by providing said model D with the kinetic measurements newly obtained from the experimental follow-up and the result of the implementation of classification model C which has already been executed, in an analogous manner to the processes described herein. In the context of such an embodiment, learning and validation of model C on the one hand and learning and validation of model D on the other hand will respectively have been carried out on data sets involving kinetic measurement conditions which enable a comparison with the data obtained from patients when carrying out the method of the invention with a sample. This means that logically, in the context of such an embodiment, model C will have been trained on the basis of kinetic measurements made under the same conditions as the "initial" measurements described herein, and model D will have been trained on the basis of kinetic measurements made under the same conditions as the "experimental follow-up" measurements described herein.

It will be clear that this need to compare data obtained under comparable conditions (and in accordance with a particular embodiment, identical conditions) or comparing data with regard to models which have been obtained and/or validated on the basis of measurements carried out under comparable conditions (and in accordance with a particular embodiment, identical) will be taken into account by any person skilled in the art employing classification or regression methods such as those used in the present invention. The remarks in the present paragraph are thus of general application to all of the embodiments of the present description in their various combinations.

In accordance with another aspect, however, the inventors have also implemented a particular embodiment which takes advantage of recalculating the concentration of DOAC selected from rivaroxaban, apixaban and edoxaban, by implementing a second regression model, termed regression model D2 herein using, as the input, kinetics which were previously measured by the universal methodology as described above (rather than kinetics measured by said optimized methodology (for DOACs), this latter having generally been used during a first calculation for the concentration of DOAC selected from rivaroxaban, apixaban and edoxaban, said calculation employing a first regression model D). This particular embodiment is written into a particular succession of preliminary steps represented in the scheme of FIG. 16, including step 7.1 "Recalculation of the concentration using the kinetics measured by the universal methodology".

The results associated with such an embodiment are illustrated in the experimental section below in Sections 3 and 4, under the heading "assay of rivaroxaban/apixaban/edoxaban, universal measurement", respectively in sections 3.8/4.8 (FIG. 20, rivaroxaban), 3.10/4.10 (FIG. 22, apixaban), 3.12/4.12 (FIG. 24, edoxaban), The use of the expression "universal methodology" in this context reflects the fact that the kinetics employed to carry out a recalculation of the concentration of DOAC with another regression model which is different from the regression model D generally used before, are kinetics measured using a universal methodology as described herein (in fact, kinetics of this type will generally already have been measured upstream during successive steps of implementation of the method described herein). In this context, it would be possible to substitute the expression "universal methodology" by "improved methodology based on the universal methodology" if the context is not sufficient to clarify the difference between the explanations of "universal methodology" and "methodology optimized for DOACs" employed above and in the present description. The expression "improved methodology based on the universal methodology" more particularly makes reference to the whole of the chain of models which are implemented in succession in order to arrive at a "recalculation" step such as the step denoted 7.1 in FIG. 16.

As illustrated in the experimental section, the advantage of carrying out this recalculation, which takes place at a precise moment downstream of the chain of decision models described herein, is to obtain a more precise result for the measured concentrations for low concentrations of DOAC selected from rivaroxaban, apixaban and edoxaban. For this reason, this particular embodiment is advantageously accessed if the concentration of DOAC selected from rivaroxaban, apixaban and edoxaban, measured with the first regression model, is less than, or less than or equal to, 200 ng/mL.

Thus, in accordance with this particular embodiment, the method of the invention comprising an additional step of quantitative assay of the inhibitor which is characterized (also termed the step for recalculation of the concentration of characterized inhibitor) using a regression model D2 implemented at the end of implementing the above regression model D describes if the concentration of inhibitor identified in the analysed sample, determined by the model D, is less than or equal to 200 ng/mL, then inputting the kinetic measurement(s) obtained in step a. above (in the context of detection) to a regression model D2, in particular an automated supervised learning model, for example a model selected from one of the following categories: support-vector machines, neural networks, decision trees, ensemble methods, and k-nearest neighbour models, said model having been trained on a data set obtained under measurement conditions identical to those of step a. above (in the context of detection), said regression model D2 enabling the calculation of (or rather, recalculation with respect to the calculation already carried out by implementing a regression model D), at the output, the concentration of inhibitor identified in the analysed sample and optionally outputting, for example by allocating to a variable, the concentration determined by the model D2.

"Enabling calculation/recalculation at the output of the concentration of the identified inhibitor" may also be written as "enabling the determination, at the output, of the concentration of the identified inhibitor" or "determining the concentration of the identified inhibitor at the output" or "returning the concentration of the identified inhibitor to the output". This output datum could take the place of the datum already calculated and/or returned by using the regression model D, or be added in order to illustrate a difference, for example.

In accordance with one aspect of this embodiment, if the concentration of DOAC selected from rivaroxaban, apixaban and edoxaban, measured with the premier regression model D, is greater than, or greater than or equal to 200 ng/mL, then a regression model D2 is not implemented, the final result of the chain of decision models or regression models concluded with implementing the regression model D2.

The person skilled in the art will appreciate that the threshold value of 200 ng/mL was determined under the test experimental conditions in order to optimise the results which could be obtained with the chain of decision models or regression models described herein.

A particular embodiment involving a regression model D2 is, however, only an additional characteristic, which is advantageous, but its implementation is not indispensable for obtaining meaningful results (see the experimental section which describes implementations without this additional supplemental function): it is an additional characteristic at a particular point of a chain of models which is described in general elsewhere herein in accordance with its various possible implementations.

The modified characteristics in the context of an experimental follow-up with respect to those of a measurement of the kinetics carried out initially for the production of "detection" illustrated herein by reference to the kinetic measurement(s) obtained in step a. described above are also recalled above in the present description and illustrated in the experimental section by means of experiments and guidance for the attention of the person skilled in the art who will therefore be able to discern the characteristics.

The term "regression model D2", or "automated learning model of the regression model type", it is indicated the same as above with regard to "model A", to "model B" or to "model C" or to "model D", by analogy.

In accordance with a particular embodiment, model D2 is a neural network, in particular a multilayer perceptron, in particular obtained by training a neural network in particular a multilayer perceptron. A more particular embodiment applied to studying an inhibitor of factor Xa is as described in the experimental section.

In fact, the step for implementing model D2 is a step which is necessarily carried out by a computer because of the complexity of the mathematical function which has been determined empirically by learning. A model of type D2 is trained on the data obtained by using a methodology of the "universal methodology" type as described herein.

Examples of implementation, in particular of examples, of models for the implementation of a neural network, in particular a multilayer perceptron, are known to the person skilled in the art, if needs be with reference to the literature in the field (See, for example, in a non-exhaustive manner, [Géron, 2017]). More precisely, the scikit-learn library (scikit-learn.org) may be used, for example. The parameters that the person skilled in the art will wish to fix are, for example, and independently or not of each other, the number of layers of neurons, the number of neurons per layer and the activation functions for the various neurons. However, the user has a certain amount of freedom in respect of implementation concerning the learning algorithm or the regularization parameters. The person skilled in the art may in particular refer to Géron, 2017 or Bonaccorso, G. (2017), for the implementation of such models, including regarding the modalities for fixing the aforementioned parameters including, if appropriate, the guidance explicitly or implicitly contained in the present description.

It will be clear that the references "A", "B", "C", "D" and "D2" for the models discussed in the present description have been indicated in order to facilitate reading, but that these letters may be omitted without modifying the meaning indicated by them. Implementing a model of type D2 as described herein includes in one step the recalculation of a concentration when a concentration of inhibitor of less than 200 ng/mL has already been detected, as described herein.

In accordance with one embodiment, the in vitro measurement of competition kinetics by competitive enzymatic assay on a blood sample obtained from a subject comprises (whether it is in the context of an initial kinetics measurement or in the context of an experimental follow-up) the following steps:
  a. providing a blood sample, diluted or not diluted, then
  b. adding to the blood sample a substrate which is specific to either factor Xa or factor IIa depending on the target enzyme and the inhibitor in question, in particular a substrate bearing a detectable marker, for example that can be vizualized (for example a chromogenic, fluorescent or chemofluorescent marker) and in particular a chromogenic or fluorogenic substrate,
  c. incubating, with increase of the temperature of the mixture obtained at b. to a temperature between (limits included) 35° C. and 39° C., in particular 37° C.,
  d. adding, to the reaction mixture obtained from c., the target coagulation enzyme selected, depending on the substrate added in step b., from factor Xa and factor IIa, in a manner to initiate competition between an inhibition reaction and the enzymatic reaction resulting therefrom,
  e. measurement using an instrument, over time, of the quantity of product resulting from the transformation of the substrate due to the action of the analysed enzyme thereon (factor Xa or factor IIa), if appropriate via the measurement of a marker associated with the substrate liberated during said enzymatic reaction, and recording the kinetics obtained.

In a particular embodiment, the instrument is a STA-R instrument from Stago. This example is not limiting, however. Any instrument housing a spectrophotometer may be used. Other examples include the instruments known and marketed by Diagnostica Stago with the trade names Compact Max, STA-R or STA-R Max.

In a particular embodiment, the competitive enzymatic assay is specific for factor Xa, and:
  a. the blood sample used is a sample of plasma diluted to 1/2 in Owren Koller buffer,
  b. in step b. the substrate is the reagent MAPA-Gly-Arg-pNA,
  c. in step c. the incubation period is 240 seconds, at 37° C.,
  d. the factor Xa added to the mixture in step d. is bovine factor Xa (or alternatively in accordance with another embodiment, human or recombinant factor Xa, or any alternative known to the person skilled in the art),
  e. the measurement of the liberation of paranitroaniline (pNA) in step e. is carried out by colorimetry at 405 nm every two seconds for 156 seconds, on an appropriate instrument of the STA-R type marketed by Diagnostica Stago (see variations cited above in a non-limiting manner).

In another particular embodiment, the competitive enzymatic assay is specific for factor Xa, and:
  a. the blood sample used is a sample of plasma diluted to 1/8th in Owren Koller buffer,
  b. in step b. the substrate is the reagent MAPA-Gly-Arg-pNA,
  c. in step c. the incubation period is 240 seconds, at 37° C.,
  d. the factor Xa added to the mixture in step d. is bovine factor Xa (or alternatively in accordance with another embodiment, human or recombinant factor Xa, or any alternative known to the person skilled in the art),
  e. the measurement of the liberation of paranitroaniline (pNA) in step e. is carried out by colorimetry at 405 nm every two seconds for 86 seconds, on an appropriate instrument of the STA-R type marketed by Diagnostica Stago (see variations cited above in a non-limiting manner).

In a particular embodiment, the competitive enzymatic assay is specific for factor IIa, and:
  a. the blood sample used is a sample of plasma diluted to 1/12 in TRIS EDTA buffer (in particular pH 8.4),
  b. in step b. the substrate is the reagent EtM-SPro-Arg-pNA,
  c. in step c. the incubation period is 240 seconds, in particular at 37° C.,
  d. the factor IIa added to the mixture in step d. is bovine factor IIa (or alternatively in accordance with another embodiment, human or recombinant factor IIa, or any alternative known to the person skilled in the art),
  e. the measurement of the liberation of paranitroaniline (pNA) in step e. is carried out by colorimetry at 405 nm every two seconds for 156 seconds, on an appropriate instrument of the STA-R type marketed by Diagnostica Stago (see variations cited above in a non-limiting manner).

In accordance with a variant embodiment which is applicable to all of the embodiments described generically or specifically in the present application, the competitive enzymatic assay is carried out on a miniaturised device, for example a device using microfluidics, in a reaction volume of between 1 and 20 µL. The method of the invention, in all variations described herein, may in fact advantageously be implemented via a miniaturised device, in light of the problems it can be used to solve.

In one embodiment, applicable to any one of the other embodiments described herein, if the substrate is a fluorometric substrate, then it is the measurement of the liberation of the fluorophore, for example AMC, which is carried out by fluorometry.

In a particular embodiment of the invention, the analysed blood sample is a sample of plasma.

In another particular embodiment of the invention, the analysed blood sample is a sample of whole blood.

In a particular embodiment of the invention, the methods described herein can be used for the quantitative assay of an inhibitor of factor Xa over the following ranges, defined with respect to the final molar concentration [E] in the test with factor Xa:
  a concentration of UFH comprised between approximately $[E]*10.0/3.0$ and approximately $[E]*200.0/3.0$. The different volumes of sample, buffer and reagents are selected and adjusted in order to accurately assay this inhibitor of factor Xa in the range [0.1, 2.0] IU/mL;
  a concentration of LMWH comprised between approximately $[E]*20.0$ and approximately $[E]*400.0$. The different volumes of sample, buffer and reagents are selected and adjusted in order to accurately assay this inhibitor of factor Xa in the range [0.1, 2.0] IU anti-Xa/mL;
  a concentration of rivaroxaban comprised between approximately $[E]/6.0$ and approximately $[E]*3.0$. The different volumes of sample, buffer and reagents are selected and adjusted in order to accurately assay this inhibitor of factor Xa in the range [20, 600] ng/mL;
  a concentration of apixaban comprised between approximately $[E]/6.0$ and approximately $[E]*3.0$.

The different volumes of sample, buffer and reagents are selected and adjusted in order to accurately assay this inhibitor of factor Xa in the range [20, 600] ng/mL.
  a concentration of edoxaban comprised between approximately $[E]/8.0$ and approximately $[E]*3.0$.

The different volumes of sample, buffer and reagents are selected and adjusted in order to accurately assay this inhibitor of factor Xa in the range [20, 600] ng/mL.

It should be noted that, based on the guidance provided herein, the person skilled in the art can determine without difficulty the concentrations of inhibitors which it is possible to assay by carrying out the test method defined in the examples. In addition, compared with the indications given above, the person skilled in the art will be able to determine without difficulty whether dilution of the sample may result in obtaining an assay with a target concentration within ranges of about the same values, to the nearest dilution factor.

The choice of appropriate volumes for the sample, buffer and reagents constitute a conventional practice in the field of enzymatic assays and of the invention.

In a particular example of the invention, obtained under the experimental conditions defined in the examples, the methods described herein enable the quantitative assay of an inhibitor of factor Xa over the range:
  from 0.0 to 2.0 IU/mL for UFHs;
  from 0.0 to 2.0 IU anti-Xa/mL for LMWHs;
  from 0.0 to 180.0 ng/mL for rivaroxaban;
  from 0.0 to 190.0 ng/mL for apixaban;
  from 0.0 to 230.0 ng/mL for edoxaban.

In accordance with another particular example, obtained under the experimental conditions defined in the examples, involving an experimental follow-up as described herein, the quantitative assay of an inhibitor of the factor Xa is enabled over the range:
  from 0.0 to 2.0 IU/mL for UFHs;
  from 0.0 to 2.0 IU anti-Xa/mL for LMWHs;
  from 0.0 to 720.0 ng/mL for rivaroxaban;
  from 0.0 to 760.0 ng/mL for apixaban;
  from 0.0 to 920.0 ng/mL for edoxaban.

For conversion of the aforementioned values into moles, the following conversion rule is used: quantity of inhibitor I in nM=(quantity of I in ng/mL)/(molecular weight of I in kg/mol)*(sample volume)/(total volume).

In a particular embodiment of the invention, the kinetic measurement(s) of the test sample are recorded for a period comprised between 10 and 10000, or between 10 and 9000, or between 10 and 8000, or between 10 and 7000, or between 10 and 6000, or between 10 and 5000, or between 10 and 4000, or between 10 and 3000, or between 10 and 2000, or between 10 and 1000, or between 10 and 900, or between 10 and 800, or between 10 and 700, or between 10 and 600, or between 10 and 500, or between 10 and 400, or between 10 and 300, or between 10 and 200, or between 20 and 200, or between 30 and 200, or between 40 and 200, or between 50 and 200, or between 60 and 200, or between 70 and 200, or between 80 and 150 seconds. Particular examples are given in the experimental section, which may be applied to any implementation described in a different section herein. The explanations provided herein imply that the person skilled in the art is capable of adjusting the measurement period by verifying that he/she can obtain a kinetic measurement suitable for his/her needs (if necessary by following the test guidance provided in the experimental section).

Classification decision models of type A, B, C or regression models D, including a regression model D2, are given in the experimental section, as examples: the hyperparameters which were obtained following optimisation on the validation data are indicated. However, clearly, the absolute values which may be applied to these hyperparameters may depend on the data sets used. Thus, they cannot be fixed. However, the person skilled in the art can readily define, train and evaluate an automated learning model by using the indications supplied herein as guidance and the available references (for example, and in a non-limiting manner, Géron, A. (2017) or Bonaccorso, G. (2017), cited herein).

For example:
  a. a classification decision model A may result from training a support-vector machine, or an artificial neural network, in particular a multilayer perceptron, with a data set comprising the kinetics obtained under conditions identical to those implemented when carrying out step a. for the detection described above, in a semi-supervised manner, whatever is appropriate, with the resulting hyperparameters which are as indicated in the experimental section, and/or b. a classification decision model B may result from training a k-nearest neighbour model, or an artificial neural network, in particular a multilayer perceptron, with a data set comprising the kinetics obtained under conditions identical to those implemented when carrying out step a. for the detection described above, whatever is appropriate, with the resulting hyperparameters which are, for example, a value k equal to 5, and the metric being the Euclidean distance, and/or c. a classification decision model C may result from training an artificial neural network, in particular a multilayer perceptron, with a data set comprising the kinetics obtained under conditions identical to those implemented when carrying out step a. for the detection described above, or obtained under conditions identical to those implemented during the implementation of an experimental follow-up, whatever is appropriate, with, for example, the resulting hyperparameters which are as indicated in the experimental section, and/or d. a regression model D, or D2, may result from training an artificial neural network, in particular a multilayer perceptron, with a data set comprising the kinetics obtained under conditions identical to those implemented when carrying out step a. for the detection described above, or obtained under conditions identical to those implemented during the implementation of an experimental follow-up (in the case of a regression model D), whatever is appropriate, with, for example, the resulting hyperparameters which are as indicated in the experimental section.

In fact, a learning algorithm in accordance with the invention advantageously implements one or more decision model(s) which, when tested on test data (which can be used to evaluate the overall and actual performance of the trained and optimized models) can be used to obtain a precision and accuracy of the returned result which is greater than or equal to 70%, or 75%, or 80%, or 85%, or 90%, or 95%, applied to the result of the series of various model(s) used and/or to each model used. A reference is made to the experimental section which indicates an exemplary particular method for evaluating this performance.

The precision is evaluated by comparing the result predicted by said trained model with actual values. Illustrative examples are provided in Tables 1 to 6 of the present description (experimental section). In accordance with another aspect, a regression model, when it is used, can be used to obtain, when tested on test data (which can be used to evaluate the overall and actual performance of the trained and optimized models), a result at the output which is characterized by a linear regression comprised between 0.9 and 1.1, and a coefficient of determination R2 greater than or equal to 0.70, or 0.80, or 0.90, or 0.95 (in accordance with the criteria of CLSI EP9-A2). Reference is made to the experimental section which indicates, as an example, a particular method for evaluating this performance. The performance indicated herein having been obtained, it is considered that the result obtained by the method in accordance with the invention is at least qualitatively equivalent to a result obtained via an approach which is said to be conventional (i.e. an assay method conventionally used up to now, in particular in clinical situations).

In accordance with one embodiment, the training and validation data used for the supervised automated learning of at least one of the models described herein, with regards to the kind of kinetic measurements supplied to the models, are of the type which can be employed for experiments enabling pre-calibration or calibration curves to be determined for kinetic curves, as already conventionally carried out in the field, in particular when launching kits which can be used to commercialize kinetics onto the market. The amount of data and the choice of patients from which they have been recovered can advantageously ensure that the data supplied to the models will enable effective learning. The experimental section provides quantitative examples of the type of data which can be supplied, with a test result that is meaningful in terms of reliability. Thus, or in general, the person skilled in the art is able to determine the departure samples that are necessary.

In accordance with one embodiment, inputting to a model experimentally obtained kinetics consists in providing pairs of values constituted by each value measured for each discrete measurement point generated over the measurement period.

The invention also concerns a data processing system or a device comprising means for carrying out at least step b. of the "detection" method described herein, including the implementation of a model A of any one of the methods described herein, and if appropriate also the step of using the model B of any one of the methods described herein, and optionally also comprising means for inputting and/or outputting the variables generated during these steps, and optionally also comprising means for carrying out steps involving the classification decision models or regression models C, D, and if appropriate D2, described herein, in all their variations, in particular means allowing the use of a matrix resulting from the learning process, enabling the parameters of these models to be fixed, in order to return a result of classification or of regression taking into account the variables provided to the model(s).

In accordance with one embodiment, such a data processing system or such a device includes an instrument for making kinetic measurements as described herein, in particular a measuring instrument necessary for carrying out a step a. for making one or more competition kinetic measurements by carrying out a competitive assay on a blood sample which has been previously obtained from a subject, as described herein, or calls upon such a measuring instrument, in particular remotely. In fact, a measuring instrument could also execute said measurement step a. in particular under the control of a data processing system or a device, in an automated or semi-automated manner.

It should be noted that a measurement said to be "manual", or at least semi-automated in the case a semi-automated instrument is employed, is not excluded as regards the implementation of a method in accordance with the invention, a measurement of this type however necessitating, in order to be worked, agents which are conventionally used in the field of making one or more competitive kinetics measurements through a competitive assay on a blood sample which has been previously obtained from a subject (see the contents of a kit described herein, as an example), in addition to a measuring instrument.

The invention also relates to such a data processing system or such a device, further comprising a processor adapted to carry out the steps indicated above and in the present description.

In particular, and in a non-limiting manner, the invention may be implemented via a computer station (optionally, a dedicated computer station) connected to a network or via a wire connection, or within an integrated system (dedicated).

In fact, it may be envisioned that the steps from step b. of the "detection" method described herein, and subsequent steps if they employ models of type A, B, C, D or D2 as described herein, require a computer for them to be carried out. Step a. of making one or more competitive kinetics measurements may be operated separately, in a manual, semi-automated or automated manner, or the means it requires may be integrated, in particular into a data processing system or a device as described herein, to operate in a controlled manner, from said data processing system or said device, the carrying out of the kinetic measurement(s).

The invention also pertains to a computer program comprising instructions which, when the program is executed by a computer, causes it to carry out at least step b. of the "detection" method described herein, and if appropriate also the step using the model B of any one of the methods described herein, and optionally instructions for inputting and/or outputting the variables generated during these steps, and optionally instructions causing it to carry out steps involving the classification decision models or regression models C, D, and if appropriate D2, described herein, adapted to any embodiment as described herein.

In accordance with a particular embodiment, such a computer program comprises instructions which cause a data processing system or a device, in particular a device including an instrument for making kinetic measurements as defined and described in the present application, or using such a measuring instrument, in particular remotely, to execute the steps of at least step b. of the "detection" method described herein, and if appropriate also the step using the model B of any one of the methods described herein, and optionally leading to the execution of steps involving the classification decision models or regression models C, D, and if appropriate D2, described herein.

In accordance with a particular embodiment, a computer program furthermore comprises instructions which, when the program is executed by a computer, cause it to also carry out, in a manner which is controlled by the instructions of the program, a step a. for making one or more competitive kinetics measurements by carrying out a competitive assay on a blood sample which has been obtained from a subject, as described herein.

Alternatively, an in vitro method for detecting, in a biological sample, the presence of an inhibitor of a blood coagulation enzyme, in accordance with the invention according to any one of the embodiments disclosed herein, may have its step a. for making one or more competitive kinetics measurements carried out separately from a control system centralising the control of the means necessary for the subsequent steps. In contrast, in accordance with another embodiment, means for carrying out said step a. in a centralized manner, at least partially taking into account the specificity of the measurement carried out, may also be centralized within a single control means in the form of a program executed by a computer as described herein.

The invention also relates to a storage medium which can be read by a computer, comprising instructions which, when they are executed by a computer, cause it to carry out at least step b. of the "detection" method described herein, and if appropriate also the step employing the model B of any one of the methods described herein, and optionally also allow inputting and/or outputting of the variables generated during these steps, and optionally causes it to carry out steps involving the classification decision models or regression models C, D, and if appropriate D2, described herein.

In accordance with a particular embodiment, a storage medium which can be read by a computer furthermore comprises instructions which, when they are executed by a computer, also cause it to carry out a step a. for making one or more competitive kinetics measurements by carrying out a competitive assay on a blood sample which has been previously obtained from a subject, as described herein.

The invention also pertains to a data carrier which can be read by a computer on which the computer program described herein is recorded, or a signal from a data carrier carrying the computer program described herein.

Finally, the invention relates to a kit, in particular suitable for carrying out a method as described herein in any embodiment, comprising:

a. a specific substrate for FXa or FIIa, for example the substrate MAPA-Gly-Arg-pNA for the factor Xa, for example the substrate EtM-SPro-Arg-pNA for the factor IIa, and b. optionally, FXa and/or FIIa, for example bovine factor Xa, for example human factor Xa, for example bovine factor IIa, for example human factor IIa, and c. optionally, one or more appropriate buffers, for example Owren Koller buffer, for example TRIS EDTA buffer, and d. optionally, instructions for making one or more competitive kinetic measurements by carrying out a competitive enzymatic assay employing the substrate, and e. a system and/or device and/or computer program and/or data carrier which can be read by a computer described herein, f. and optionally, instructions enabling the method in accordance with the invention to be carried out, if appropriate linked to the instructions from point d. above, relating to the characteristics of the competitive enzymatic assay to be carried out, g. and optionally, instructions relating to the use of a signal from a data carrier described herein, for carrying out a method in accordance with any one of the embodiments described herein.

Other characteristics and advantages of the invention will become apparent from the examples below as well as the figures which illustrate the execution of particular embodiments of the invention.

measured) on the test data set provided a straight line with the equation y=1.14x−6.73 and a coefficient of determination R2=0.9945. B. Triple run analysis: the results of a comparison of the assays of the concentrations of apixaban measured by using the approach described herein ([apixaban] predicted) with the concentrations of apixaban measured using the standard approach ([apixaban] measured) on the test data set provided a straight line with the equation y=1.13x−5.46 and a coefficient of determination R2=0.9958.

Figure 15:
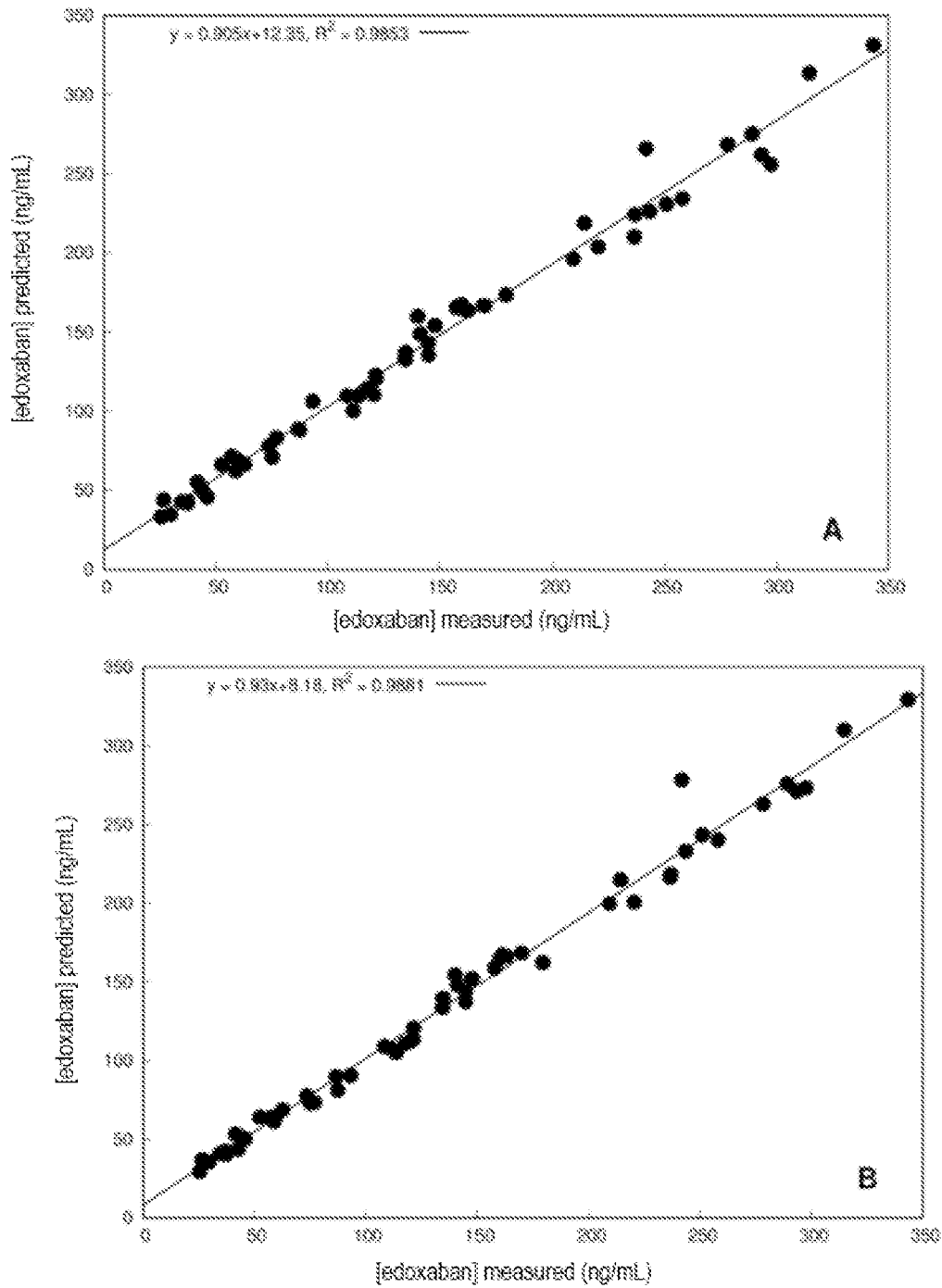

FIG. 15. Assay of edoxaban. A. Single run analysis: the results of a comparison of the assays of the concentrations of edoxaban measured by using the approach described herein ([edoxaban] predicted) with the concentrations of edoxaban measured using the standard approach ([edoxaban] measured) on the test data set provided a straight line with the equation y=0.905x+12.35 and a coefficient of determination R2=0.9853. B. Triple run analysis: the results of a comparison of the assays of the concentrations of edoxaban measured by using the approach described herein ([edoxaban] predicted) with the concentrations of edoxaban measured using the standard approach ([edoxaban] measured) on the test data set provided a straight line with the equation y=0.93x+8.18 and a coefficient of determination R2=0.9881.

Figure 16:
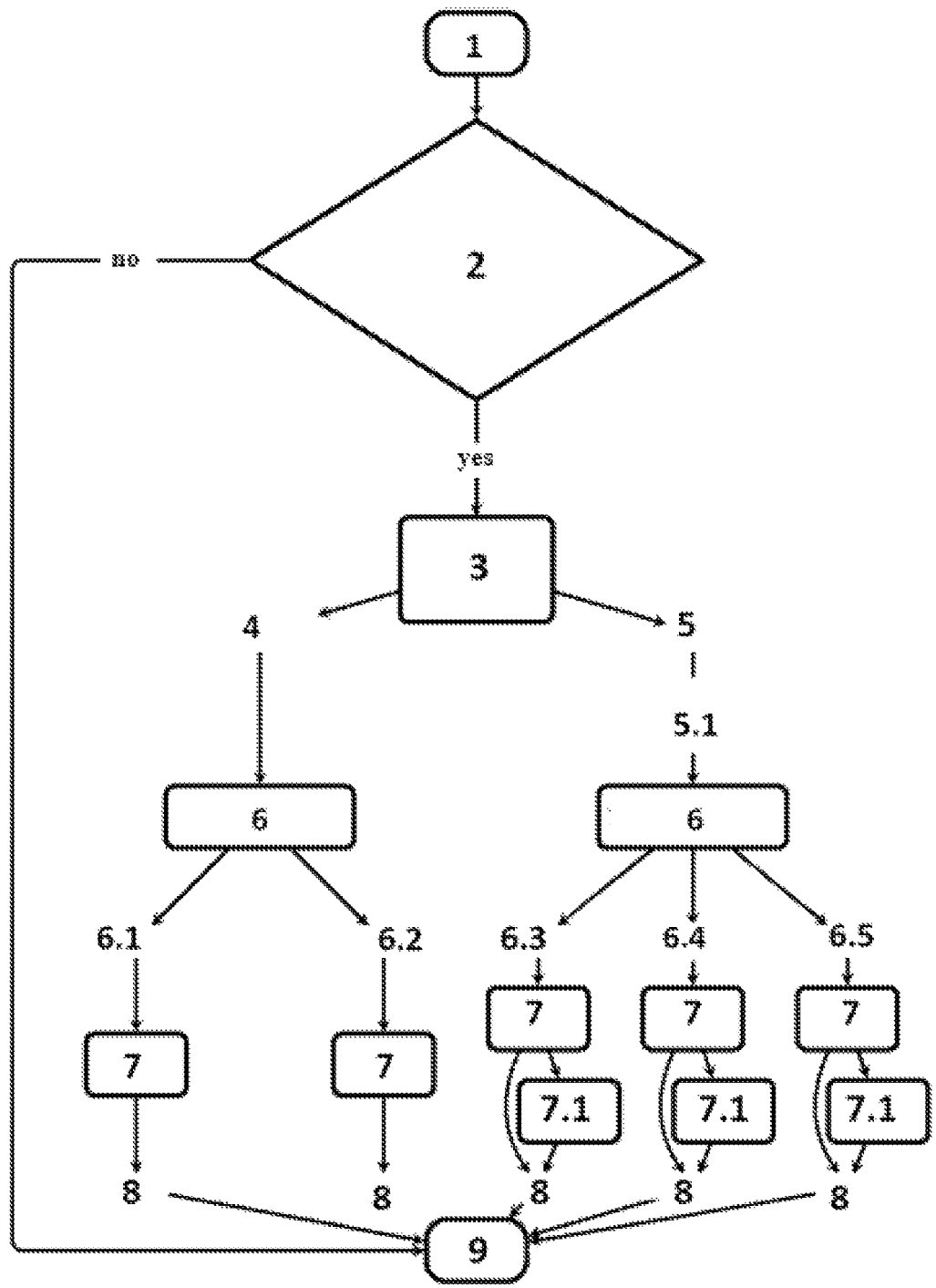

FIG. 16. Cascade of automated learning models for detection, identification and quantification of synthetic inhibitors of factor Xa. Key to diagram: 1. Start, 2. Presence of an inhibitor of factor Xa?, 3. Category of the anti-Xa, 4. Heparin, 5. DOAC, 5.1. Experimental follow-up, 6. Identification, 6.1. UFH, 6.2. LMWH, 6.3. Rivaroxaban, 6.4. Apixaban, 6.5. Edoxaban, 7. Quantification, 7.1. Recalculation of the concentration using the kinetics measured by the universal methodology, 8. Concentration, 9. End.

Figure 17A:
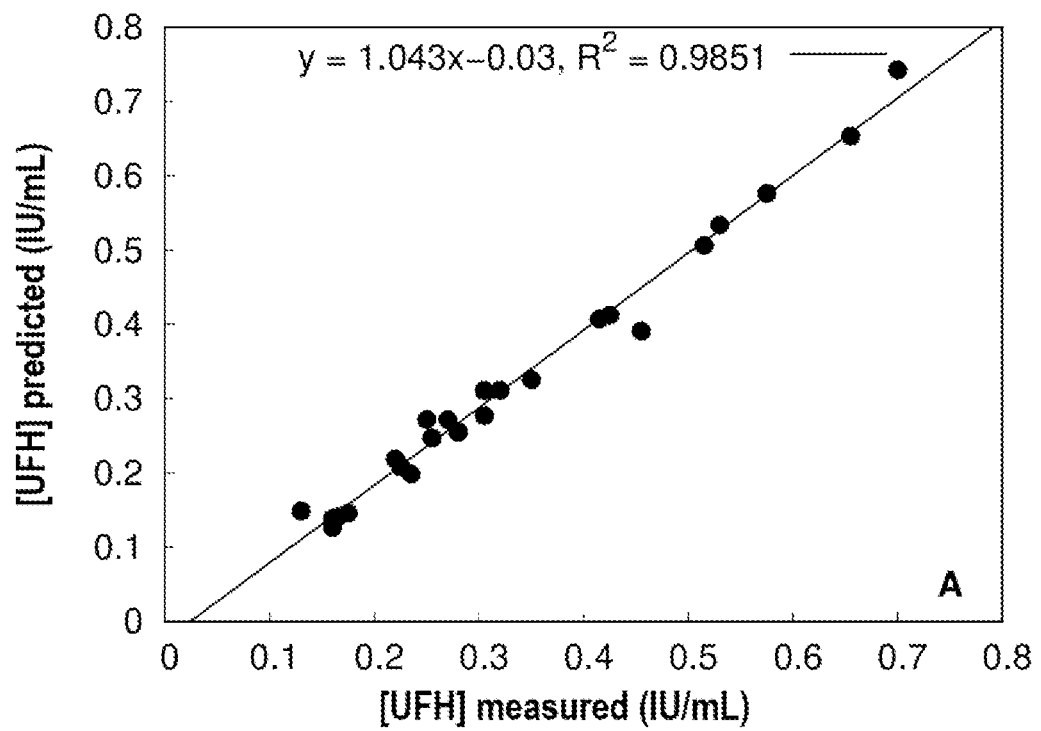
Figure 17B:
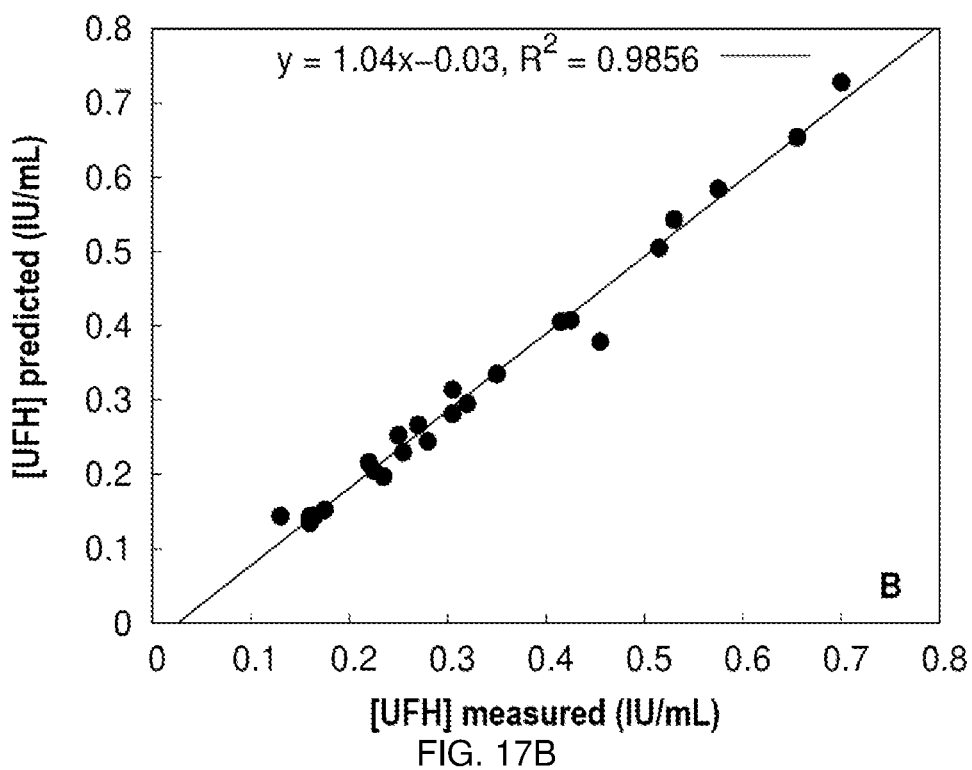

FIG. 17. Assay of UFHs. A. Single run analysis: the results of a comparison of the assays of the concentrations of UFH measured using the approach described in this document ([UFH] predicted) with the concentrations of UFH measured using the standard approach ([UFH] measured) on the test data set provided a straight line with the equation y=1.043x−0.03 and a coefficient of determination $R^2$=0.9851. B. Triple run analysis: the results of a comparison of the assays of the concentrations of UFH measured using the approach described in this document ([UFH] predicted) with the concentrations of UFH measured using the standard approach ([UFH] measured) on the test data set provided a straight line with the equation y=1.04x−0.03 and a coefficient of determination $R^2$=0.9856.

Figure 18A:
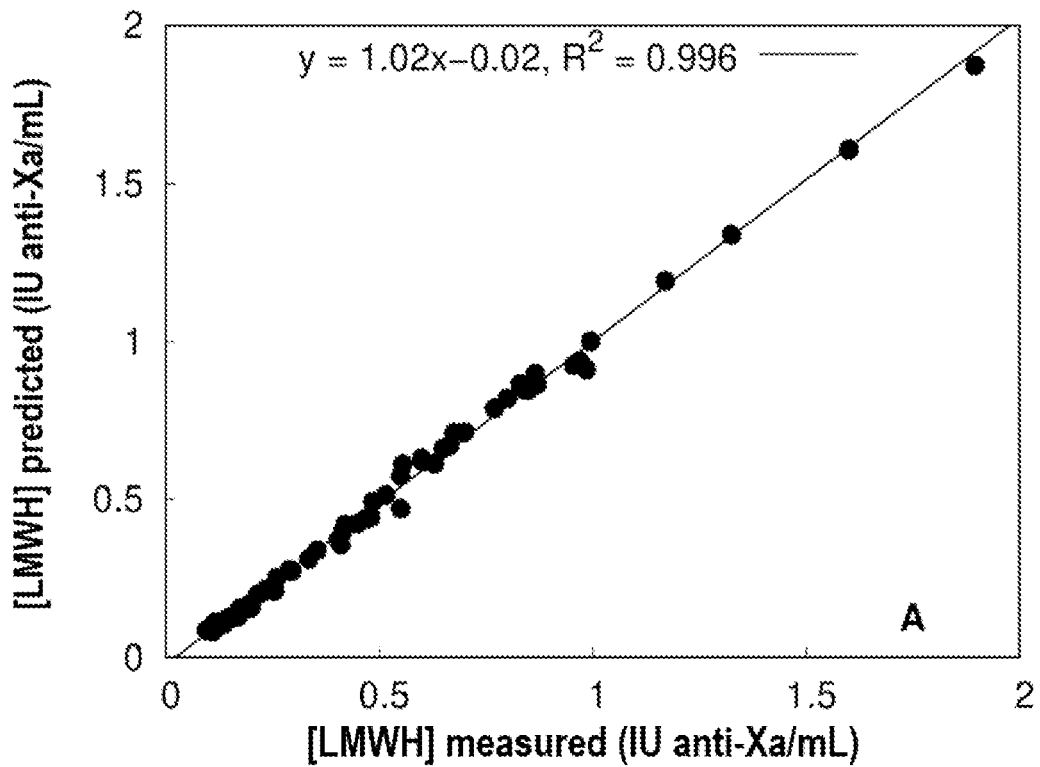
Figure 18B:
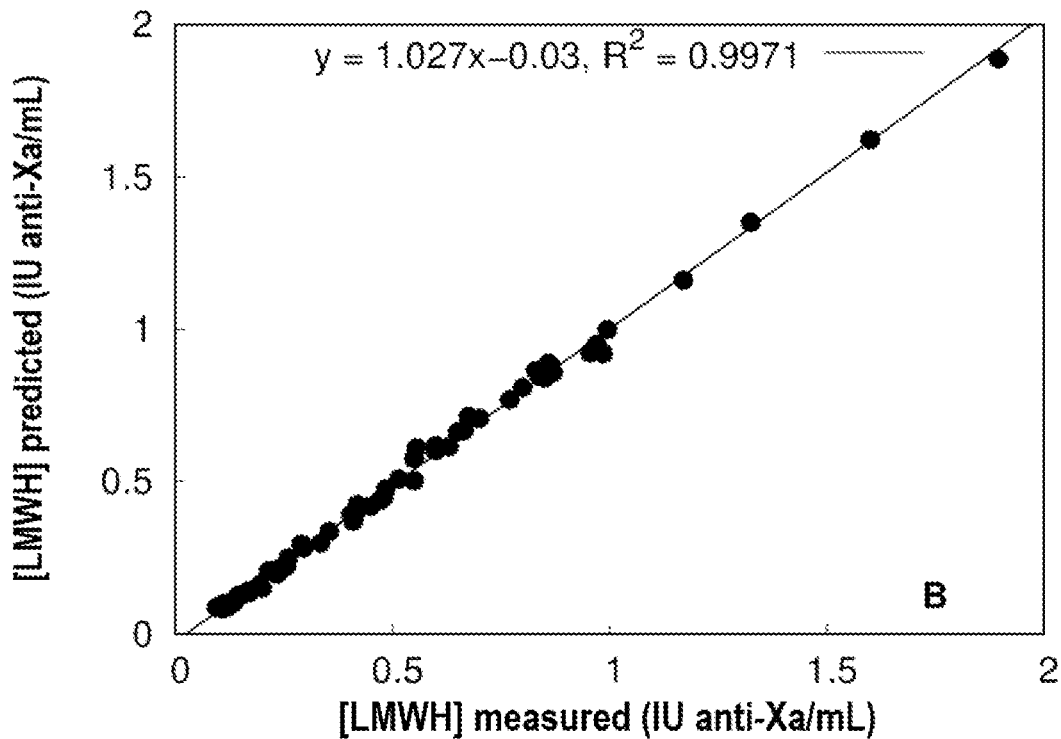

FIG. 18. Assay of HDPMs. A. Single run analysis: the results of a comparison of the assays of LMWH concentrations measured using the approach described in this document ([LMWH] predicted) with LMWH concentrations measured using the standard approach ([LMWH] measured) on the test data set provided a straight line with the equation y=1.02x−0.02 and a coefficient of determination $R^2$=0.996. B. Triple run analysis: the results of a comparison of the assays of the concentrations of LMWH measured using the approach described in this document ([LMWH] predicted) with the concentrations of LMWH measured using the standard approach ([LMWH] measured) on the test data set provided a straight line with the equation y=1.027x−0.03 and a coefficient of determination $R^2$=0.9971.

Figure 19A:
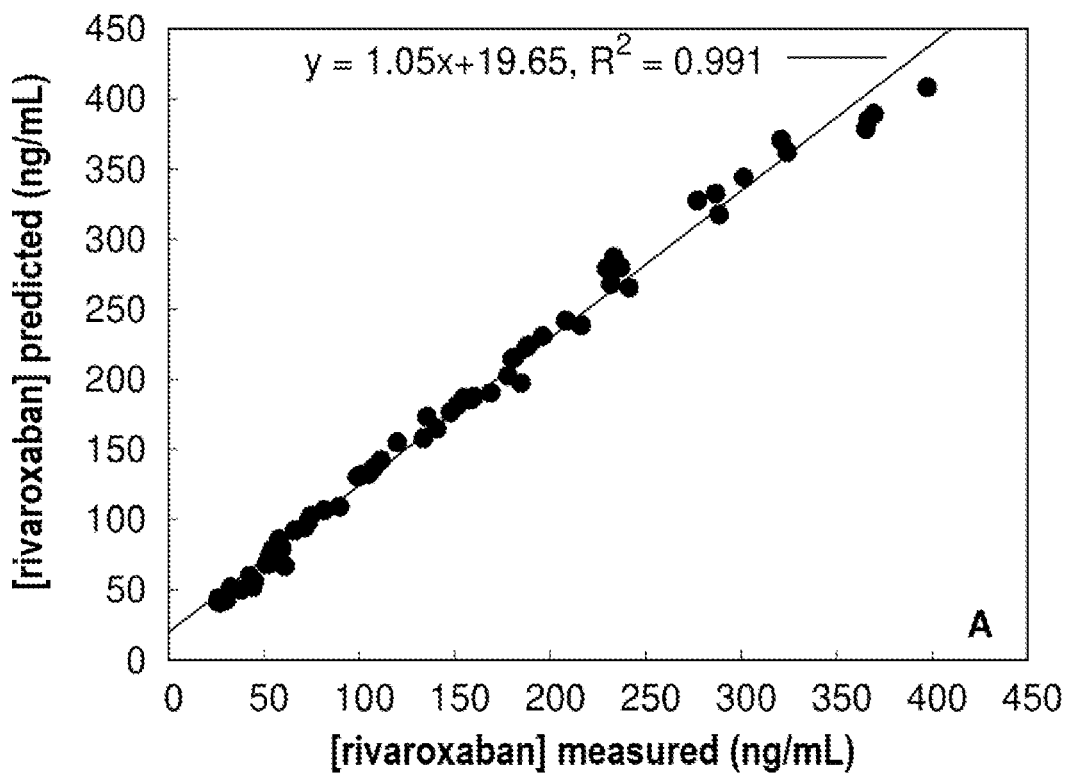
Figure 19B:
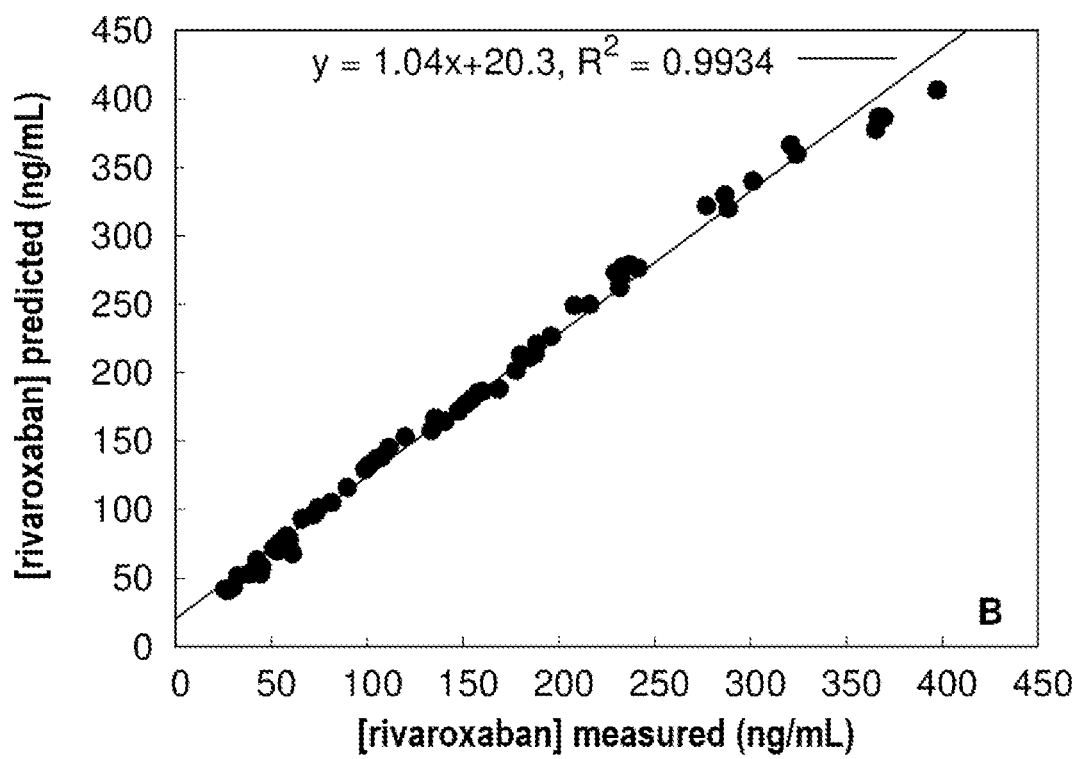

FIG. 19. Assay of rivaroxaban (optimized DOAC methodology). A. Single run analysis: the results of a comparison of the assays of the concentrations of rivaroxaban measured using the approach described in this document ([rivaroxaban] predicted) with the concentrations of rivaroxaban measured using the standard approach ([rivaroxaban] measured) on the test data set provided a straight line with the equation y=1.05x+19.65 and a coefficient of determination $R^2$=0.991. B. Triple run analysis: the results of a comparison of the assays of the concentrations of rivaroxaban measured using the approach described in this document ([rivaroxaban] predicted) with the concentrations of rivaroxaban measured using the standard approach ([rivaroxaban] measured) on the test data set provided a straight line with the equation y=1.04x+20.3 and a coefficient of determination R2=0.9934.

Figure 20A:
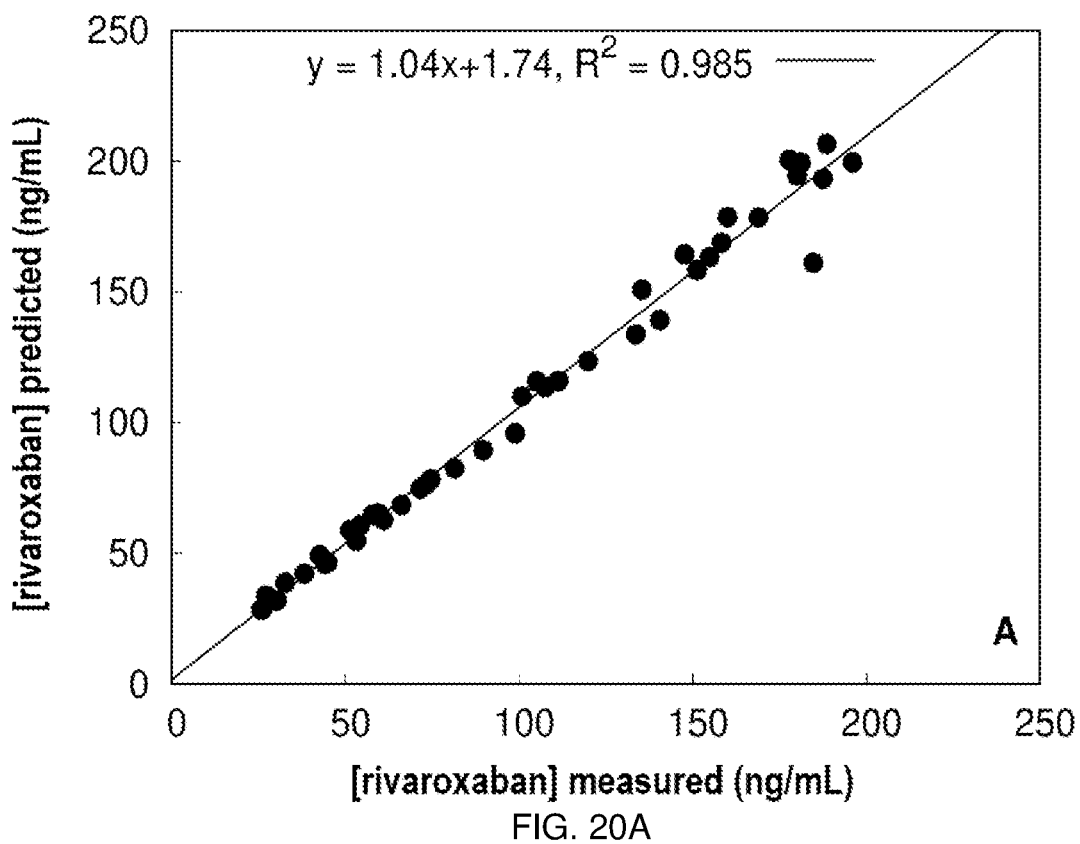
Figure 20B:
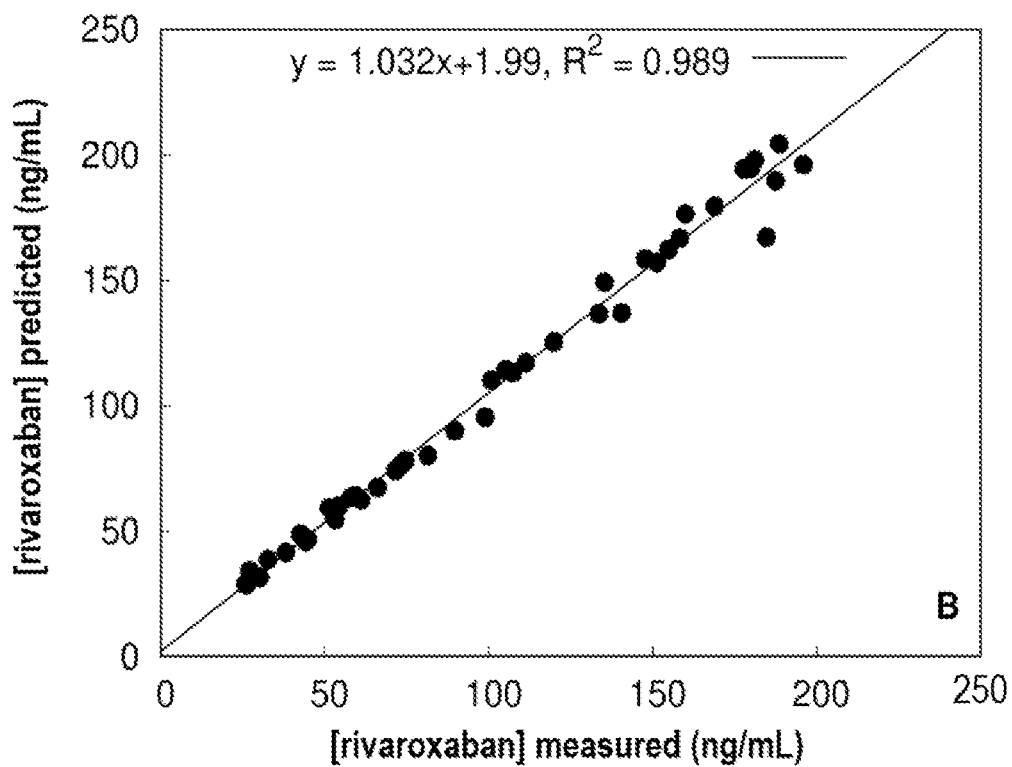

FIG. 20. Assay of rivaroxaban (universal methodology, or "improved methodology based on the universal methodology"). A. Single run analysis: the results of a comparison of the assays of the concentrations of rivaroxaban measured using the approach described in this document ([rivaroxaban] predicted) with the concentrations of rivaroxaban measured using the standard approach ([rivaroxaban] measured) on the test data set provided a straight line with the equation y=1.04x+1.74 and a coefficient of determination $R^2$=0.985. B. Triple run analysis: the results of a comparison of the assays of the concentrations of rivaroxaban measured using the approach described in this document ([rivaroxaban] predicted) with the concentrations of rivaroxaban measured using the standard approach ([rivaroxaban] measured) on the test data set provided a straight line with the equation y=1.032x+1.99 and a coefficient of determination $R^2$=0.989.

Figure 21A:
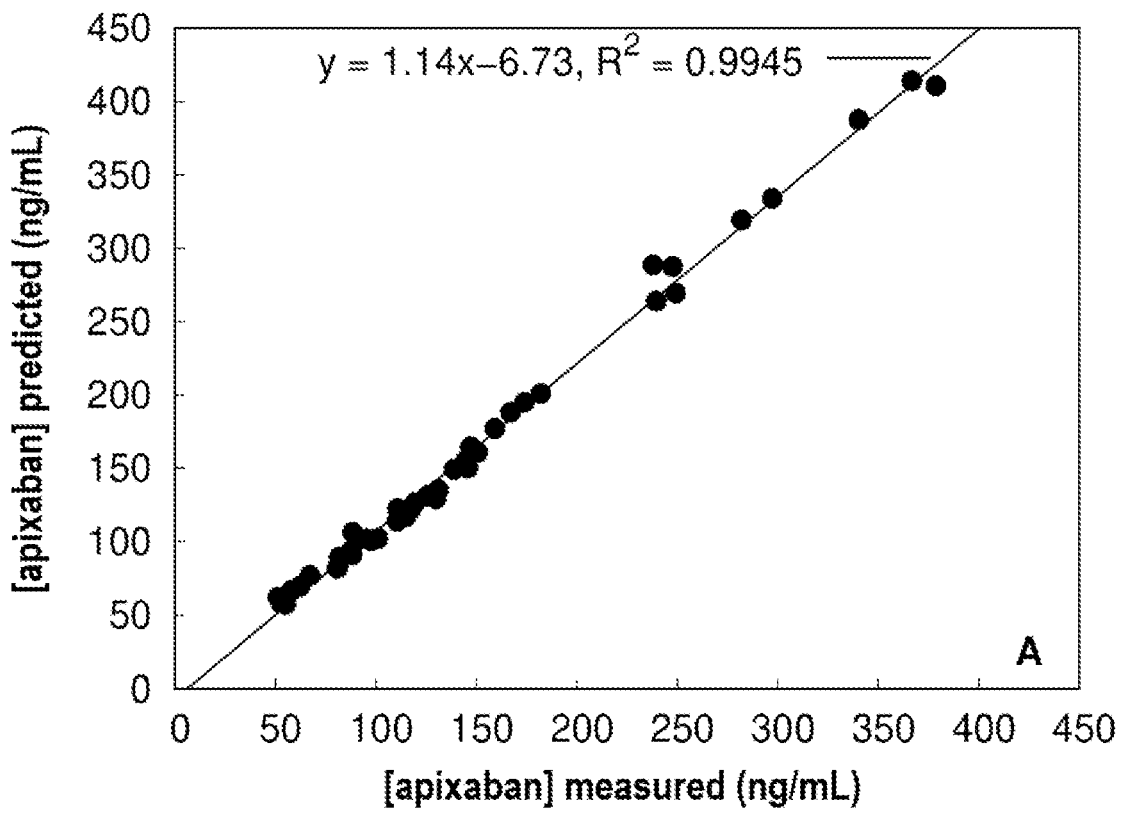
Figure 21B:
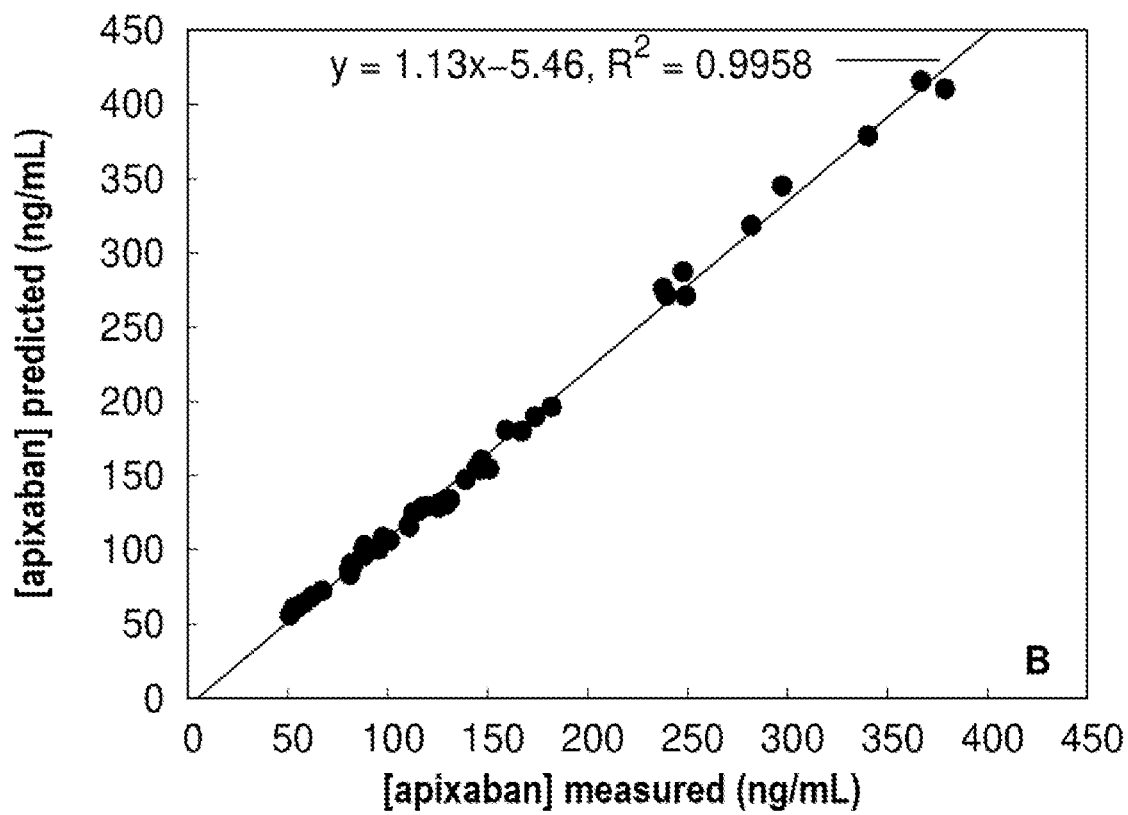

FIG. 21. Assay of apixaban (optimized DOAC methodology). A. Single run analysis: the results of a comparison of the assays of the concentrations of apixaban measured using the approach described in this document ([apixaban] predicted) with the concentrations of apixaban measured using the standard approach ([apixaban] measured) on the test data set provided a straight line with the equation y=1.14x−6.73 and a coefficient of determination $R^2$=0.9945. B. Triple run analysis: the results of a comparison of the assays of the concentrations of apixaban measured using the approach described in this document ([apixaban] predicted) with the concentrations of apixaban measured using the standard approach ([apixaban] measured) on the test data set provided a straight line with the equation y=1.13x−5.46 and a coefficient of determination $R^2$=0.9958.

Figure 22A:
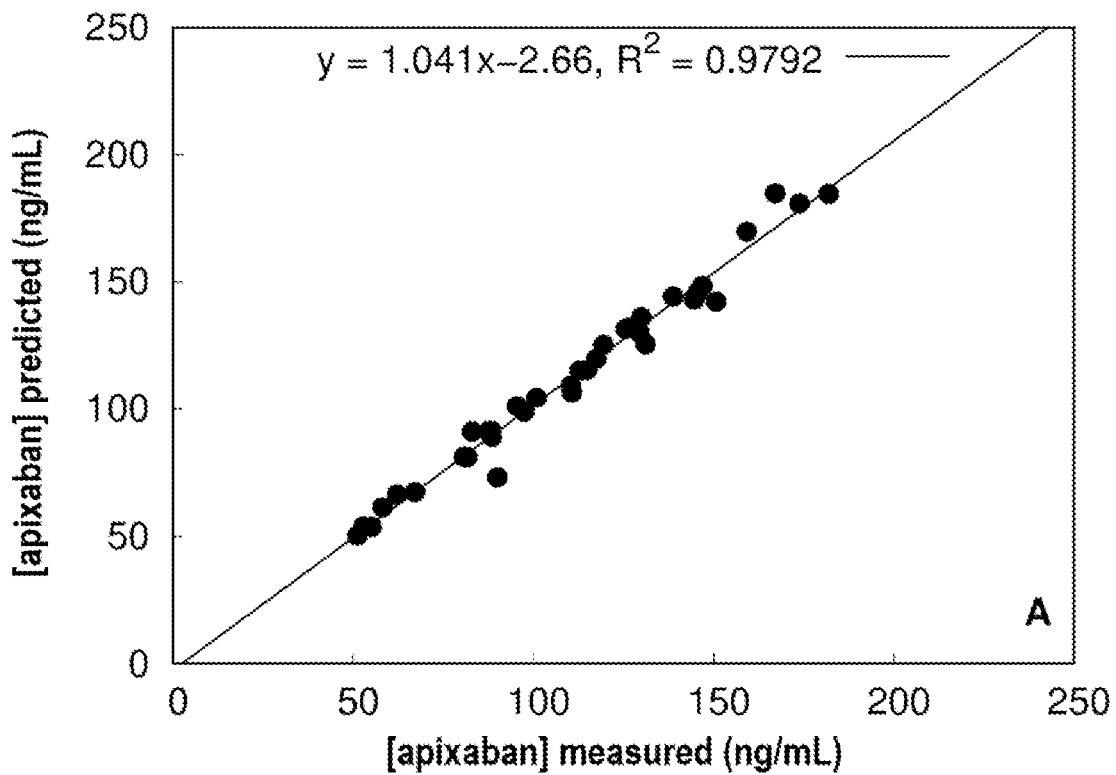
Figure 22B:
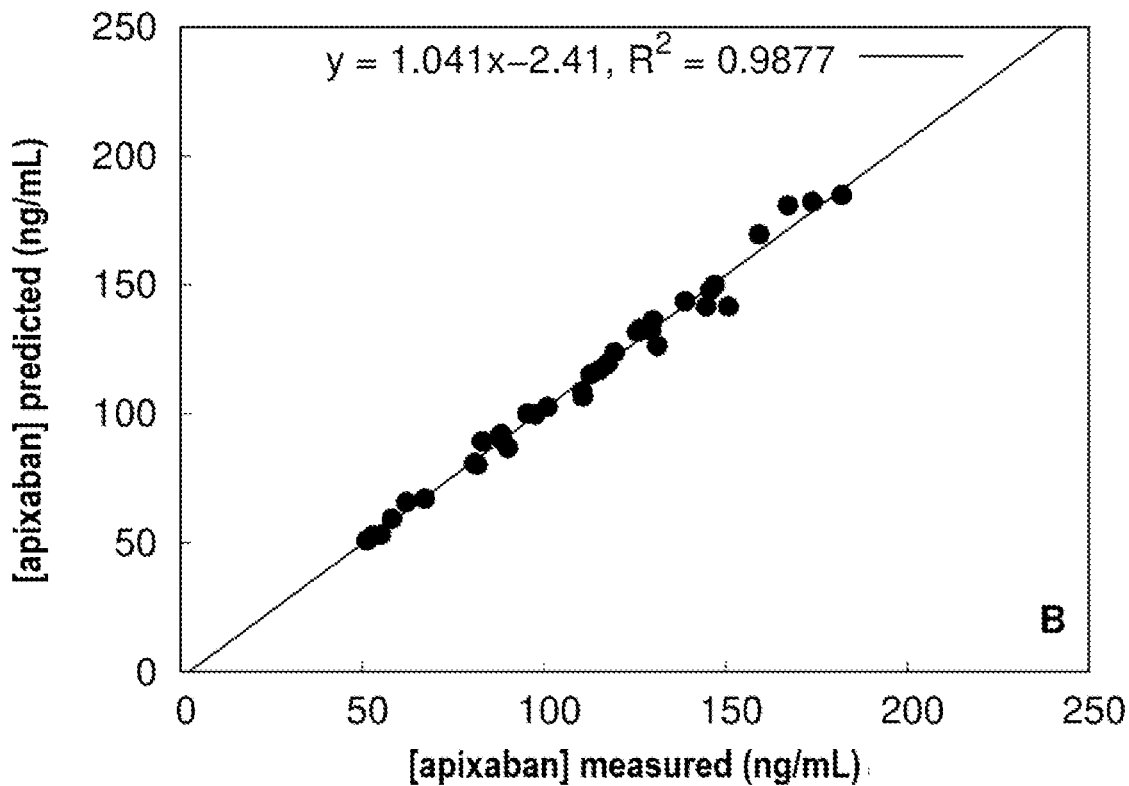

FIG. 22. Assay of apixaban (universal methodology, or "improved methodology based on the universal methodology"). A. Single run analysis: the results of a comparison of the assays of the concentrations of apixaban measured using the approach described in this document ([apixaban] predicted) with the concentrations of apixaban measured using the standard approach ([apixaban] measured) on the test data set provided a straight line with the equation y=1.041x−2.66 and a coefficient of determination $R^2$=0.9792. B. Triple run analysis: the results of a comparison of the assays of the concentrations of apixaban measured using the approach described in this document ([apixaban] predicted) with the concentrations of apixaban measured using the standard approach ([apixaban] measured) on the test data set provided a straight line with the equation y=1.041x−2.41 and a coefficient of determination $R^2$=0.9877.

Figure 23A:
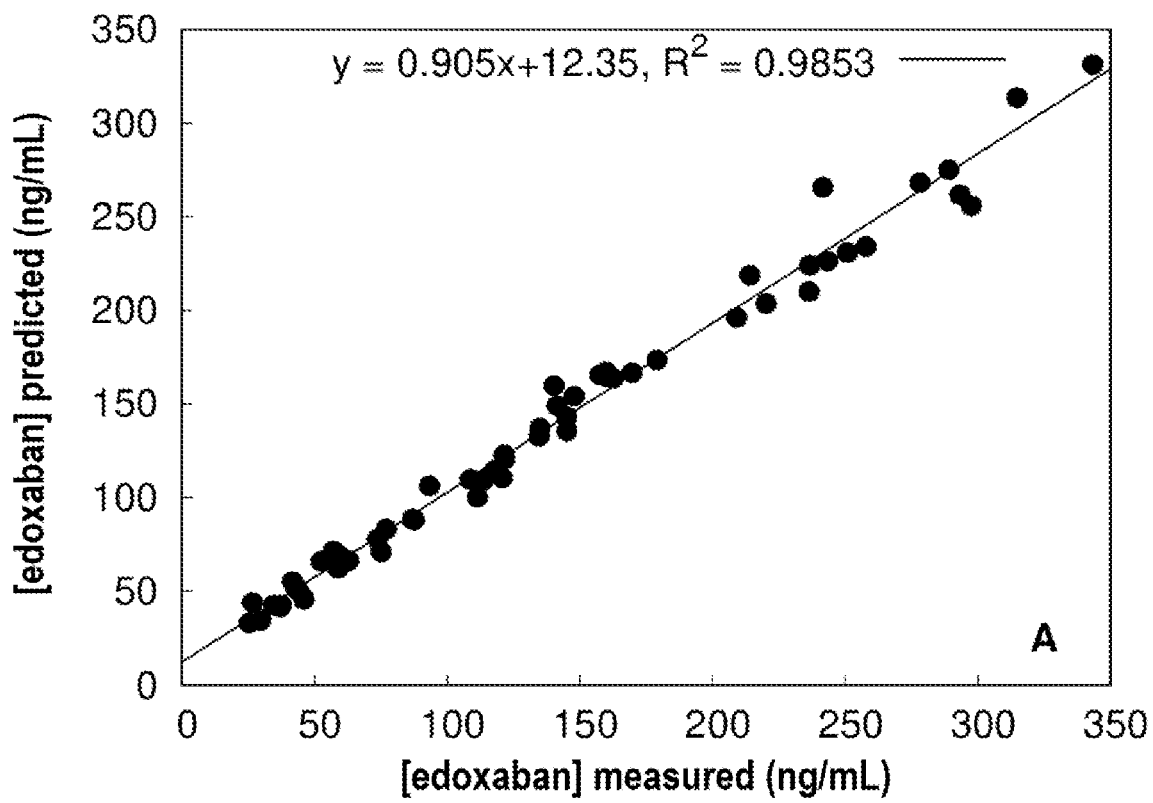
Figure 23B:
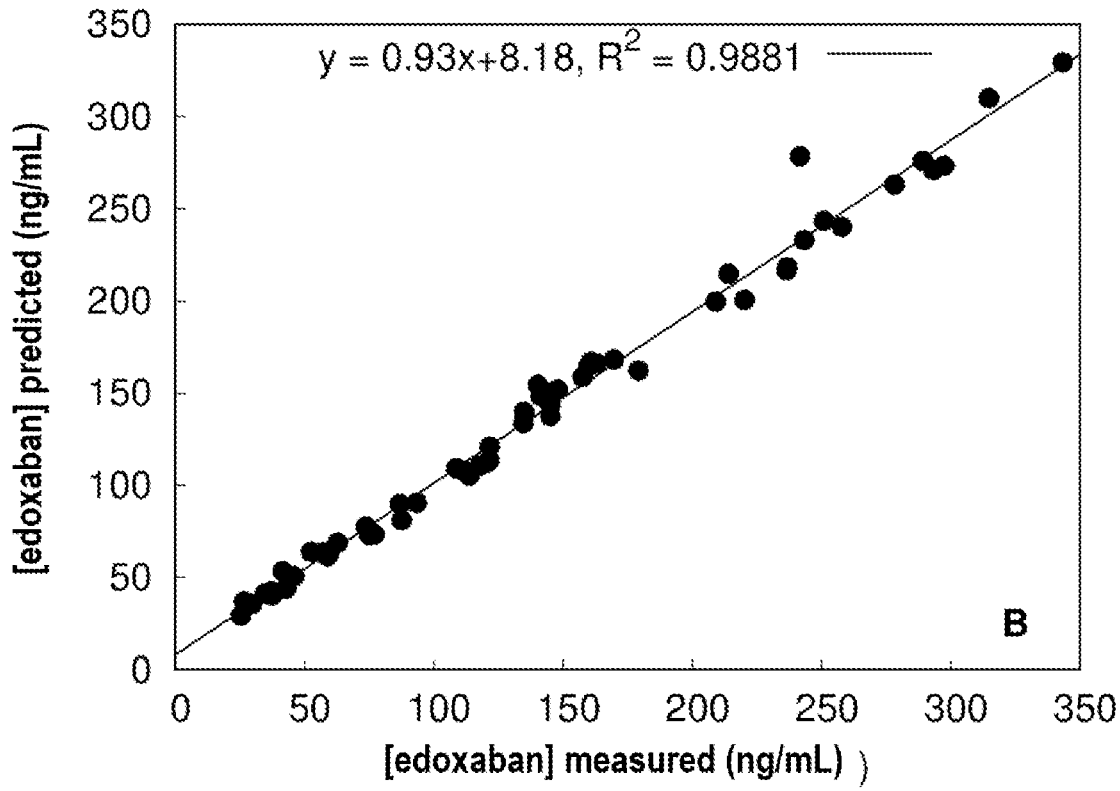

FIG. 23. Assay of edoxaban (optimized DOAC methodology). A. Single run analysis: the results of a comparison of the assays of the concentrations of edoxaban measured using the approach described in this document ([edoxaban] predicted) with the concentrations of edoxaban measured using the standard approach ([edoxaban] measured) on the test data set provided a straight line with the equation y=0.905x+12.35 and a coefficient of determination $R^2$=0.9853. B. Triple run analysis: the results of a comparison of the assays of the concentrations of edoxaban measured using the approach described in this document ([edoxaban] predicted)

with the concentrations of edoxaban measured using the standard approach ([edoxaban] measured) on the test data set provided a straight line with the equation y=0.93x+8.18 and a coefficient of determination $R^2$=0.9881.

Figure 24A:
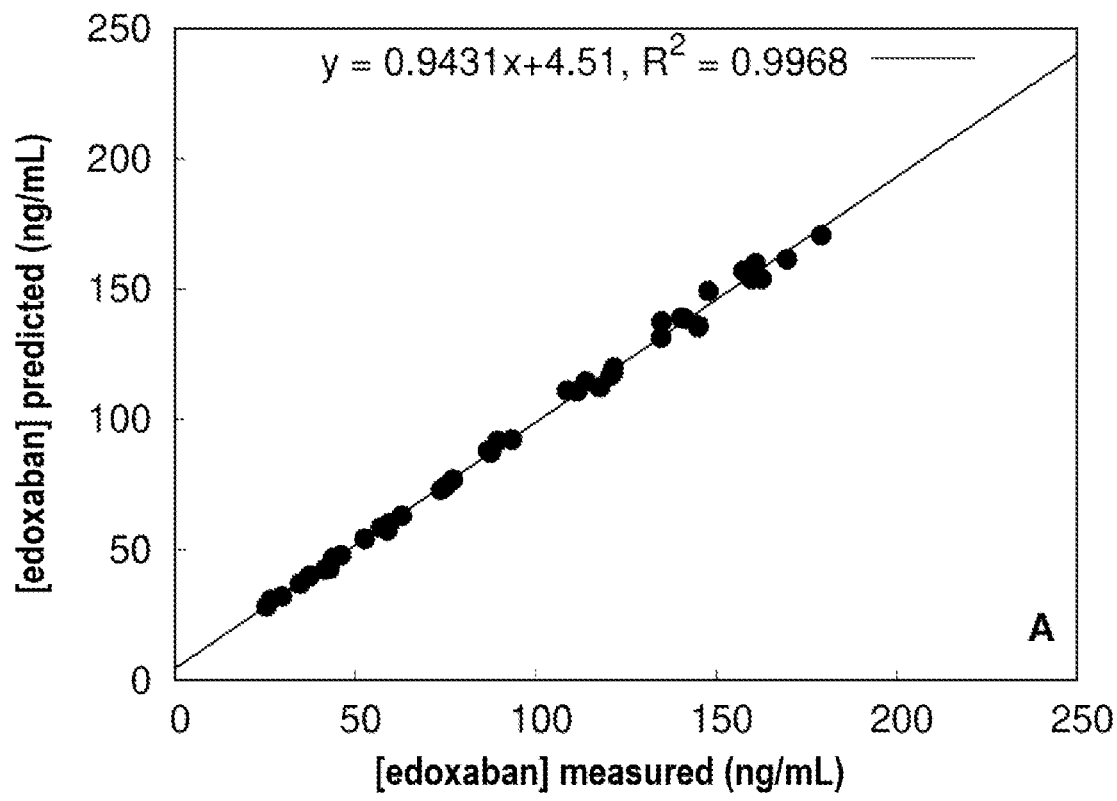
Figure 24B:
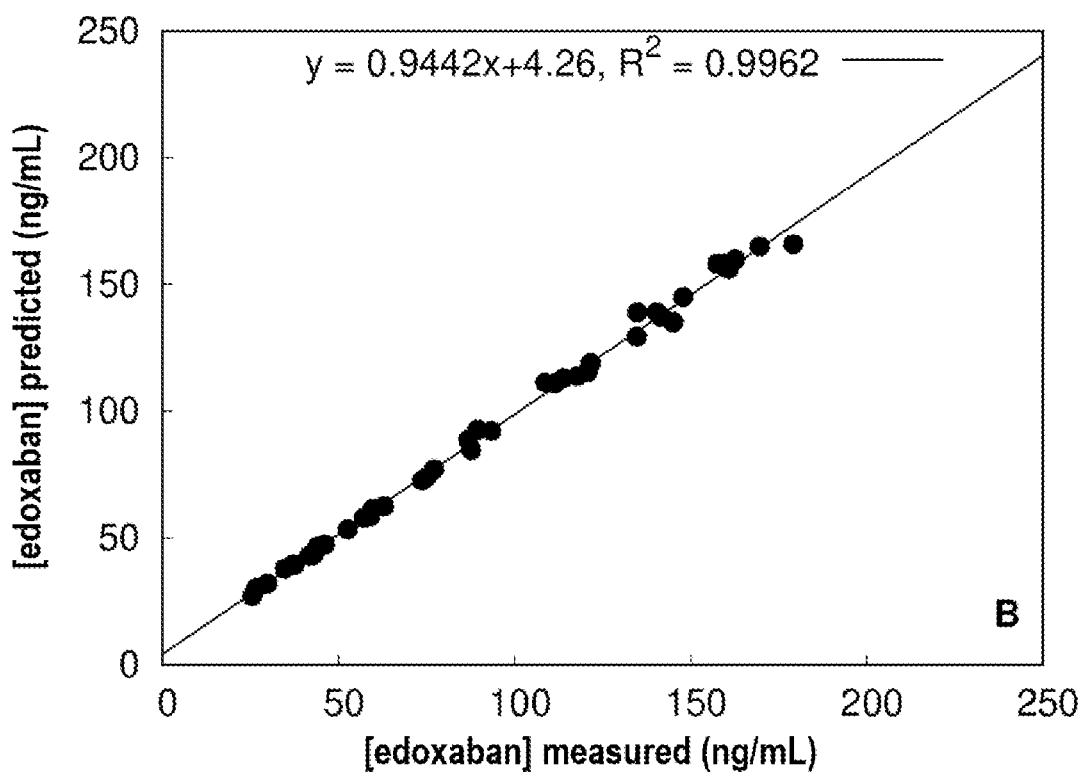

FIG. 24. Assay of edoxaban (universal methodology, or "improved methodology based on the universal methodology"). A. Single run analysis: the results of a comparison of the assays of the concentrations of edoxaban measured using the approach described in this document ([edoxaban] predicted) with the concentrations of edoxaban measured using the standard approach ([edoxaban] measured) on the test data set provided a straight line with the equation y=0.9431x+4.51 and a coefficient of determination $R^2$=0.9968. B. Triple run analysis: the results of a comparison of the assays of the concentrations of edoxaban measured using the approach described in this document ([edoxaban] predicted) with the concentrations of edoxaban measured using the standard approach ([edoxaban] measured) on the test data set provided a straight line with the equation y=0.9442x+4.26 and a coefficient of determination $R^2$=0.9962.

GENERALITIES—EXPERIMENTAL METHODOLOGY—PRINCIPLE OF THE METHOD

1. Disclosure of the Principle on which the Invention is Based

The present invention proposes a method for detecting, identifying and quantifying, in a blood sample, inhibitors of blood coagulation enzymes. For this, a blood coagulation enzyme, a substrate specific for this enzyme as well as a blood sample are brought together in the same consumable, which advantageously may be a conventional consumable such as that conventionally employed for enzymatic assays in the field. The enzyme then cleaves the substrate into a product, which then leads to the liberation of a marker (the marker may, for example, be chromogenic, fluorescent, etc.); the appearance of this marker induces an observable change in the physical properties of the blood sample: the measurement then consists in recording the change in the physical properties of the sample over time using an instrument (the instrument may be a spectrophotometer if the marker is chromogenic; it may be a fluorimeter if the marker is fluorescent, etc), i.e., it records the kinetics. If an inhibitor of the enzyme is present in the blood sample, this will reduce the activity of the enzyme on its substrate and as a consequence have an impact on the kinetics that are measured. A post-treatment algorithm interprets these kinetics and renders the expected biological result: detection, identification and quantification of the inhibitor.

1.1 Experimental Methodology

The inhibitors of blood coagulation enzymes, whether natural or synthetic, belong to two distinct families: the direct inhibitors and the indirect inhibitors. A direct inhibitor binds directly to the enzyme in order to exert its inhibiting action. An indirect inhibitor binds initially to a second molecule in order to form a complex which is then capable of exerting an inhibiting action on the enzyme. In addition, these inhibitors also act in accordance with two different reaction mechanisms: reversible kinetic schemes and irreversible kinetic schemes. A reversible inhibitor binds to the enzyme to form a dissociable complex, in contrast to an irreversible inhibitor which binds to the enzyme to form an indissociable complex. The inhibitors of blood coagulation enzymes can thus be classified into four categories:

reversible direct inhibitors,
irreversible direct inhibitors,
reversible indirect inhibitors,
irreversible indirect inhibitors.

Conventionally, the enzymatic assay of these inhibitors involves two biochemical reactions:

An inhibition reaction
   if the inhibitor is reversible direct, the reaction scheme is $$E+I \rightleftharpoons E \cdot I$$

where the inhibitor I binds directly to the enzyme E to form the complex E·I which is inactive and dissociable.

if the inhibitor is irreversible direct, the reaction scheme is $$E+I \rightarrow E \cdot I$$

where the inhibitor I binds directly to the enzyme E to form the complex E·I which is inactive and indissociable.

if the inhibitor is reversible indirect, the reaction scheme is $$\begin{array}{c} E + A \cdot I \rightleftharpoons E \cdot A \cdot I \\ \upharpoonleft\downharpoonright \\ A \\ + \\ I \end{array}$$

where the inhibitor I associates with a second molecule A to form the complex A·I which is capable of bonding to the enzyme E to form the complex E·A·I which is inactive and dissociable.

if the inhibitor is irreversible indirect, the reaction scheme is $$\begin{array}{c} E + A \cdot I \rightleftharpoons E \cdot A \cdot I \\ \upharpoonleft\downharpoonright \\ A \\ + \\ I \end{array}$$

where the inhibitor I associates with a second molecule A to form the complex A·I which is capable of bonding to the enzyme E to form the complex E·A·I which is inactive and indissociable.

An enzymatic reaction $$E+S \rightleftharpoons E \cdot S \rightarrow E+P$$

where
  E designates the blood coagulation enzyme targeted by the inhibitor I suspected of being present in the sample;
  S represents a substrate specific to the enzyme, generally composed of a specific peptide sequence for the active site of the enzyme and a marker which may be chromogenic, fluorescent, electrochemical, etc;
  E·S designates the unstable enzyme-substrate complex;
  P represents the product obtained from catalysis of the substrate by the enzyme: in our case, the catalysis results in the liberation of the marker (chromogenic, fluorescent, electrochemical, etc). It should be noted that the reversible inhibition reactions follow second order kinetics for the formation of the enzyme-inhibitor complex and first order kinetics for its dissociation. Irreversible inhibition reactions follow second order kinetics for the formation of the enzyme-inhibitor complex. The kinetics of the enzymatic reaction obey the Henri-Michaelis-Menten equation [Segel, 1993].

In order to carry out the enzymatic assay of these various inhibitors, the two biochemical reactions may be successive or competing. In both cases, the assay is divided into two consecutive steps: incubation and measurement. When the two biochemical reactions are successive, the incubation step consists in bringing the blood sample suspected of containing an inhibitor I (and if necessary the molecule A) into contact with excess enzyme E. The inhibitor I (or the complex A-I) then reversibly or irreversibly inhibits the enzyme E; the incubation period must be sufficiently long to allow the inhibition reaction to reach its biochemical equilibrium. Thus, the residual concentration of enzyme E is inversely proportional to the initial concentration of inhibitor I and thus gives its inhibiting activity. The measurement step then consists of adding a specific substrate S for the enzyme E to the reaction mixture; the enzyme E, which is then present in a residual quantity, transforms the substrate S into a product P which induces the liberation of a marker over time, enabling kinetic measurements to be made, typically a straight line. When the two biochemical reactions are in competition, the incubation step consists in bringing the blood sample which is suspected of containing an inhibitor I (and if necessary the molecule A) into contact with the substrate S: the aim of this step is simply to raise the temperature of the reaction mixture to 37° C. The measurement step then consists in adding the enzyme E to the reaction mixture in order to initiate the inhibition reaction and the enzymatic reaction in parallel: these are said to be competing reactions because the inhibitor I and the substrate S compete for the enzyme E. Thus, the enzyme E cleaves the substrate S into product P while at the same time being inhibited directly or indirectly by the inhibitor I. The transformation of the substrate S into product P induces the liberation of a marker over time, which can be used to record the kinetics: since the reaction of the transformation of substrate into product is influenced by the action of the inhibitor on the enzyme, the recorded kinetics are also influenced. For this reason, the concentration of inhibitor and its mode of action on the enzyme modifies the kinetics recorded during the measurement step when the enzymatic assay places the two biochemical reactions in competition.

Figure 1:
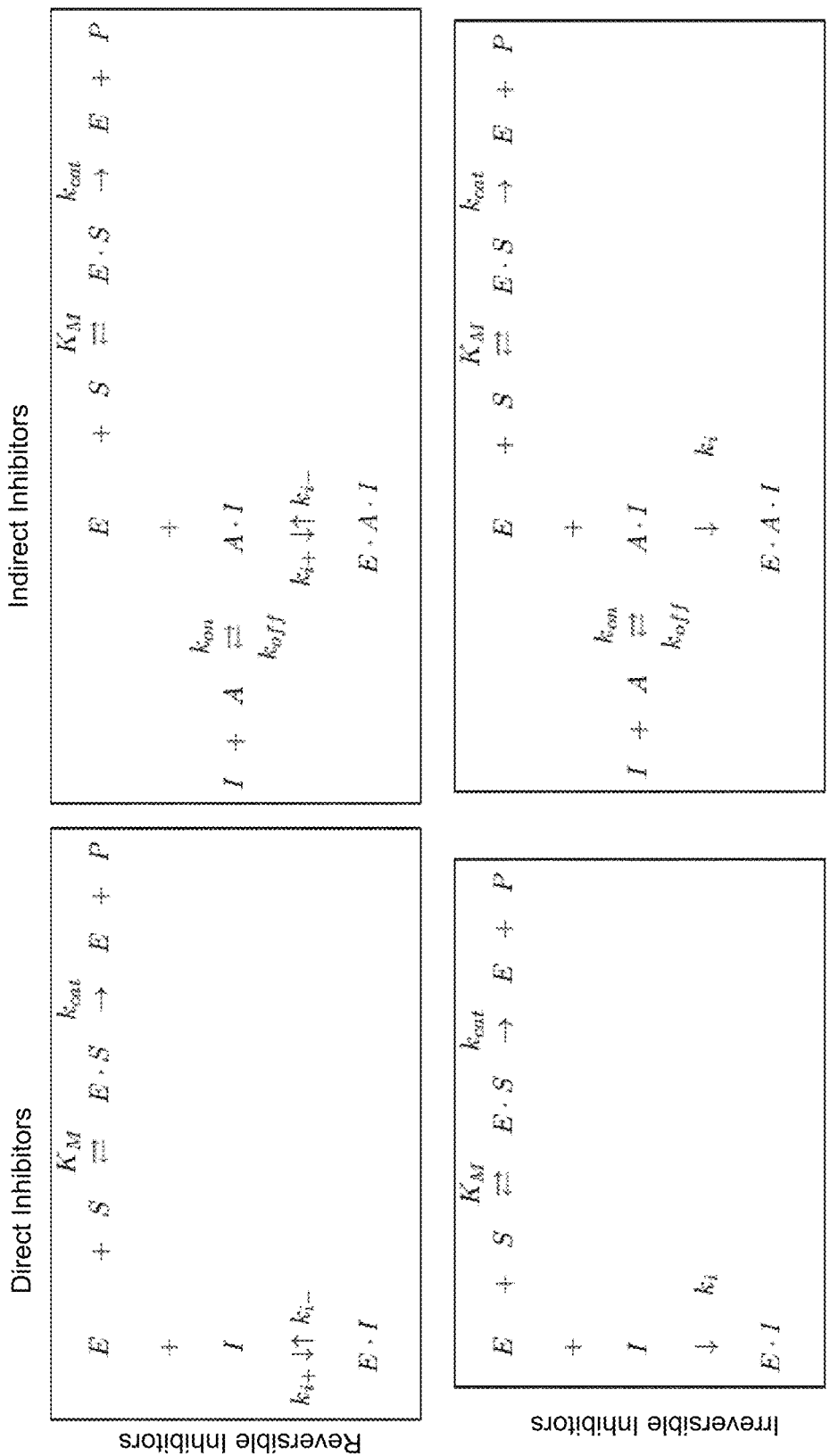
FIG. 1. Principle of competitive in vitro assay of inhibitors of blood coagulation enzymes: kinetic schemes.
Figure 2:
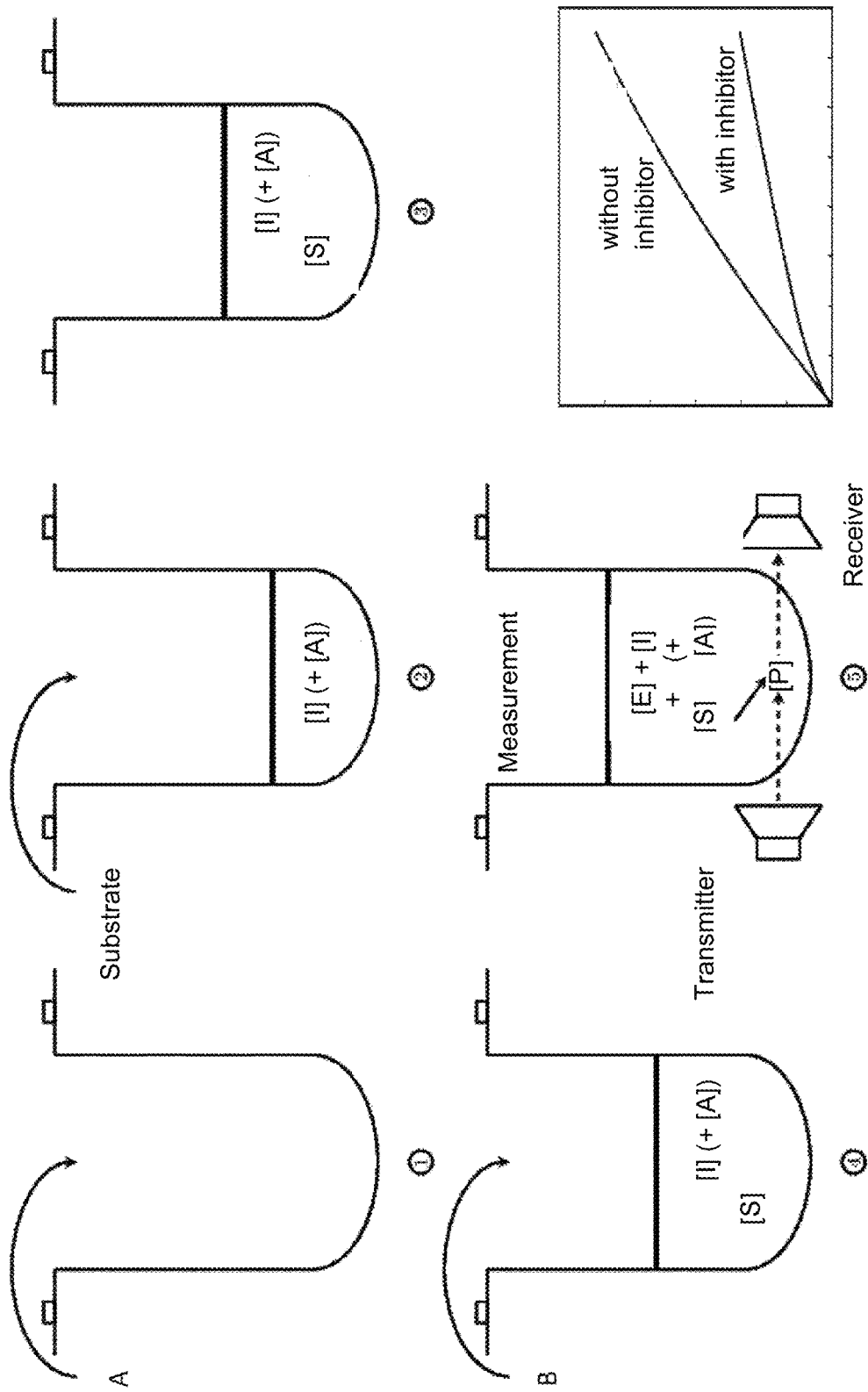
FIG. 2. Principle of measurement. (1) A blood sample (diluted or not) suspected of containing an inhibitor I (and if necessary) the molecule A) of an enzyme E for coagulation is placed inside a consumable. (2) A substrate S specific to the enzyme E is added to the reaction mixture. (3) An incubation step (generally several tens of seconds) brings the reaction mixture to temperature (typically 37° C.). (4) The enzyme E is added to the reaction mixture thereby initiating competition between the inhibition reaction and the enzymatic reaction. (5) The measurement per se is then carried out (generally over a period of several tens of seconds); the enzyme E transforms the substrate S into product P while at the same time being inhibited by the inhibitor I (and if necessary the molecule A) if it (they) is (are) present in the sample. The cleavage of substrate S into product P induces the liberation of a marker which can be measured using an instrument. (6) The measurement results in recording kinetic measurements which are impacted by the presence, the mode of action and the concentration of the inhibitor I (and if necessary of the molecule A). Key: (A) Sample suspected of containing an inhibitor, (B) Enzyme.

The invention described herein uses the competitive approach: FIG. 1 summarizes the kinetic schemes associated with in vitro assay of various inhibitors of blood coagulation enzymes. The in vitro assay for measurement the detection, identification and quantification of inhibitors of blood coagulation enzymes is therefore carried out in accordance with the following principle, illustrated in FIG. 2:

- a blood sample (diluted or not) suspected of containing an inhibitor I (and if necessary the molecule A) of an enzyme E for coagulation is placed inside a consumable;
- a substrate S specific to the enzyme E is added to the reaction mixture;
- an incubation step (generally several tens of seconds) raises the reaction mixture to temperature (typically 37° C.);
- the enzyme E is added to the reaction mixture, thereby initiating competition between the inhibition reaction and the enzymatic reaction;
- the measurement per se is then carried out (generally over a period of several tens of seconds): the enzyme E transforms the substrate S into product P, while at the same time being inhibited by the inhibitor I (and if necessary the molecule A) if it (they) is (are) present in the sample. The cleavage of substrate S into product P induces the liberation of a marker which can be measured using an instrument;
- the measurement results in recording a kinetic measurement which is influenced by the presence, the mode of action and the concentration of the inhibitor I (and if necessary of the molecule A).

Because of the field of application of the method described herein, which more particularly envisages the detection and if appropriate the identification or even the quantification of anticoagulant inhibitors of factor Xa and/or of factor IIa which are either irreversible indirect inhibitors (also designated in the present description as the category of the heparins, as described herein) or reversible direct inhibitors (also designated in the present description as the category of the DOAC, as described herein), the enzyme E added to the reaction mixture initiating the competition is, respectively factor Xa or factor IIa.

Conventionally, this enzyme has to be added just before the start of the measurement resulting in recording the kinetics.

Since the method described herein can for the first time permit "blind" detection of an inhibitor of factor Xa and/or of factor IIa suspected of being contained in the analysed sample, the question arises of knowing the range or ranges of values for the concentration of inhibitor (of factor Xa and/or of factor IIa) suspected of being contained in the analysed sample, for which the method described herein will be effective.

The determination of the concentrations of inhibitor (of factor Xa and/or of factor IIa) that the kinetic measurement method specifically employs to detect, and if appropriate identify or even quantify may be carried out in accordance with the procedure described in the "Examples" section applied for the purposes of demonstrating studying an inhibitor of factor Xa. The person skilled in the art will understand that these ranges of concentration where detection is possible can vary depending on the types of enzyme and the substrate employed, conventionally in the field of tests for detecting the presence of enzyme, in particular in blood samples. This being the case, the methodology disclosed below in the "Examples" section will enable the person skilled in the art to determine without difficulty whether the range of inhibitor concentrations which can be studied is suitable for the purpose. Furthermore, the methodology disclosed also shows that it is possible, for example for a given enzyme-substrate pair, in particular known in the prior art, to modulate the range of sensitivity of detection, identification or even quantification as a function of the envisaged range. This may be carried out, as shown experimentally below on the basis of exemplary embodiments, by modulating the initial dilution of the sample to be analysed. In this way, in particular, the particular embodiment referred to as the "optimized methodology for DOACs" was designed and developed by way of a variation envisaging more precisely defined requirements. The person skilled in the art could therefore adapt the dilution of the starting sample so as to obtain the envisaged range of sensitivity for inhibitors which are in blind studies. Illustrative examples are included in the present application for these particular embodiments which are encompassed in the context of the novel blind detection method which is generically disclosed herein.

Finally, in particular in accordance with a chronological sequence following the aim in question, one (or more) post-treatment algorithms interpret the kinetics which, if appropriate, are influenced by the presence, the mode of action and the concentration of an inhibitor present in the sample (and if appropriate the molecule A to which reference was made above), which renders the biological result which is expected: detection and/or identification and/or quantification of the inhibitor. This is described in the next section.

1.2 Post-Processing

The preceding section described an experimental methodology enabling kinetics to be obtained which are influenced by the presence, the mode of action and the concentration of an inhibitor of a blood coagulation enzyme by means of a competitive enzymatic assay. This section presents a method for post-processing, based on artificial intelligence (AI) algorithms interpreting the kinetics to render the expected biological result: detection, identification and quantification of the inhibitor.

Artificial intelligence is an information technology discipline developed in the 1950s. Very briefly, its aim is to develop algorithms that are capable of reproducing the cognitive functions of the human brain, Among these cognitive functions, learning (a set of mechanisms bringing the acquisition of skills, knowledge or know-how) is by far the most studied field of application in the context of AI. Known as automated learning or in fact machine learning, it is the subject of innumerable scientific publications, but in addition and above all, it now has manly applications in our daily life. The present invention makes use of learning models known as supervised learning models.

In contrast to conventional algorithms, automated learning models are not explicitly programmed for the tasks they have to execute, but they are trained on them. In fact, an automated learning model establishes a digital link between an input datum and an output datum by means of an empirical mathematical function. Thus, for a given input datum, the model calculates the associated output. When the output is a whole number, the automated learning model is responsive to a classification problem (for example a patient is healthy or a patient is sick); when the output is a real number, the automated learning model is responsive to a regression problem (for example a concentration of anticoagulant). The parameters of the empirical mathematical function are calculated by training on a database composed of pairs (input datum, output datum): a learning algorithm adjusts the parameters in a manner such that for a given input datum, the model recalculates the associated output datum as accurately as possible. Examples of the most widely used learning models are neural networks, decision trees and support-vector machines [Géron, 2017]. The person skilled in the art has at his disposal, by referring to the existing literature, for example (in particular [Géron, 2017] or Bonaccorso, G. (2017)), conventional ways of optimising the hyperparameters of an automated learning model and to adapt them to the purported objective.

The conventional approach for defining, training and evaluating an automated learning model is to rely on a database which has been divided into three distinct data sets:

The training data, which will allow the parameters of the empirical mathematical function linking the pairs to be determined (input datum, output datum);

The validation data, which will serve for the optimisation of the hyperparameters of the automated learning model, in accordance with the knowledge of the person skilled in the art—see, for example, [Géron, 2017])— and to measure the capacity for generalisation of the automated learning model trained on the training data;

The test data, which will allow the overall and actual performance of the automated learning model trained on the training data and optimized on the validation data to be evaluated.

It is important to note that the development of automated learning models necessarily involves the availability of a database composed of pairs (input datum, output datum). The greater the quantity and quality of these data, the better will be the training of these models and the better will be their generalisation capacity.

Figure 3:
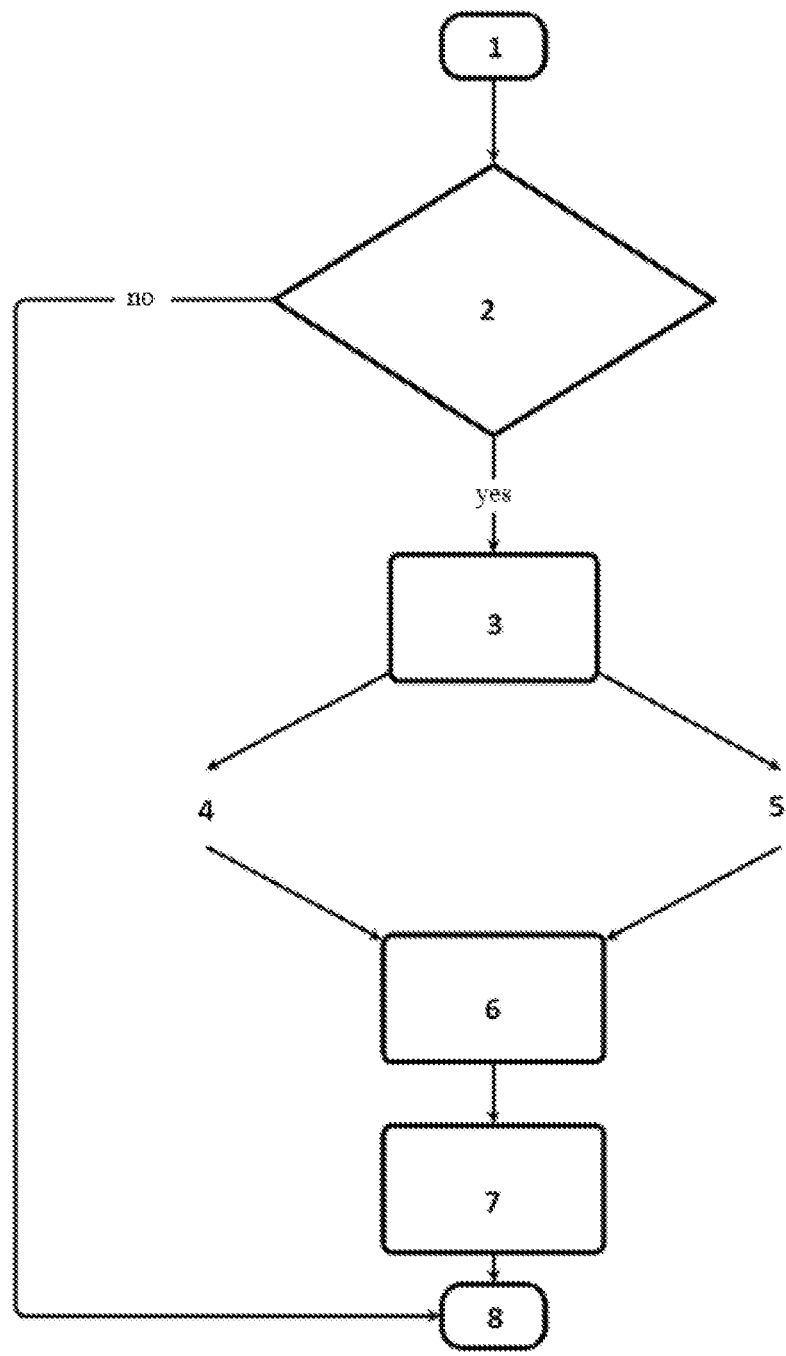
FIG. 3. Cascade of automated learning models. Key to diagram: 1. Start, 2. Presence of an inhibitor of the enzyme?, 3. Category of the inhibitor, 4. Reversible direct, 5. Irreversible indirect, 6. Identification of the inhibitor, 7. Quantification of the inhibitor, 8. End.

In a particular embodiment, which uses at the end of the chain of conclusions all possible and envisageable conclusions that can be reached, the invention proposed herein uses a cascade of automated earning models for analysing and interpreting the experimentally measured kinetics. This cascade is aimed at rendering the biological result: it is described in FIG. 3, being understood that, dep) ending on the result and the studied analysis, not all of the steps may need to be implemented.

The particular, most complete, cascade described herein is composed of four automated learning models; these four models take as the input the (same) kinetics obtained by the experimental measurement and output a result:

The first model (also known as model A) is a classification model: by virtue of the appearance of the kinetics which are inputted into it, it determines whether, yes or no, the analysed sample contains an inhibitor of the enzyme;

The second model (also known as model B) is also a classification model: knowing that the analysed sample contains an inhibitor of the enzyme and by virtue of the appearance of the kinetics which are inputted into it, it recognises the category of the inhibitor;

The third model (also known as model C) is again a classification model: knowing the category of the inhibitor of the enzyme and by virtue of the appearance of the kinetics which are inputted into it, it identifies the inhibitor present in the analysed sample;

The fourth and last possible model (also known as model D) is a regression model: knowing the inhibitor present in the analysed sample and by virtue of the appearance of the kinetics which are inputted into it, it calculates the concentration of this inhibitor.

Each of these models is an automated learning model, for example a neural network, a support-vector machine or the like, in particular as described below and detailed in the results section as regards particular embodiments, which is trained by pairs (kinetics, output datum) of data from a database divided into three distinct sets (training set, validation set and test set) which will already have been generated. The choice of automated learning model (neural networks, support-vector machines or the like) is made as a function of the performances obtained on the validation set. The experimental section shows a way of analysing the performances obtained on a validation set. The first model is trained in pairs (kinetics, presence=yes or presence=no). The second model is trained in pairs (kinetics, category of the inhibitor=reversible direct or category of the inhibitor=irreversible direct or category of the inhibitor=reversible indirect or category of the inhibitor=irreversible indirect). The third model is trained in pairs (kinetics, name of the inhibitor =inhibitor1 or name of the inhibitor=inhibitor2 or name of the inhibitor=etc). The fourth model is trained in pairs (kinetics, concentration of the inhibitor). Finally, cascading these various models provides the expected biological result, which depends on the studied result: detection, identification and quantification of an inhibitor of a blood coagulation enzyme.

1.3 Synthesis

Figure 4:
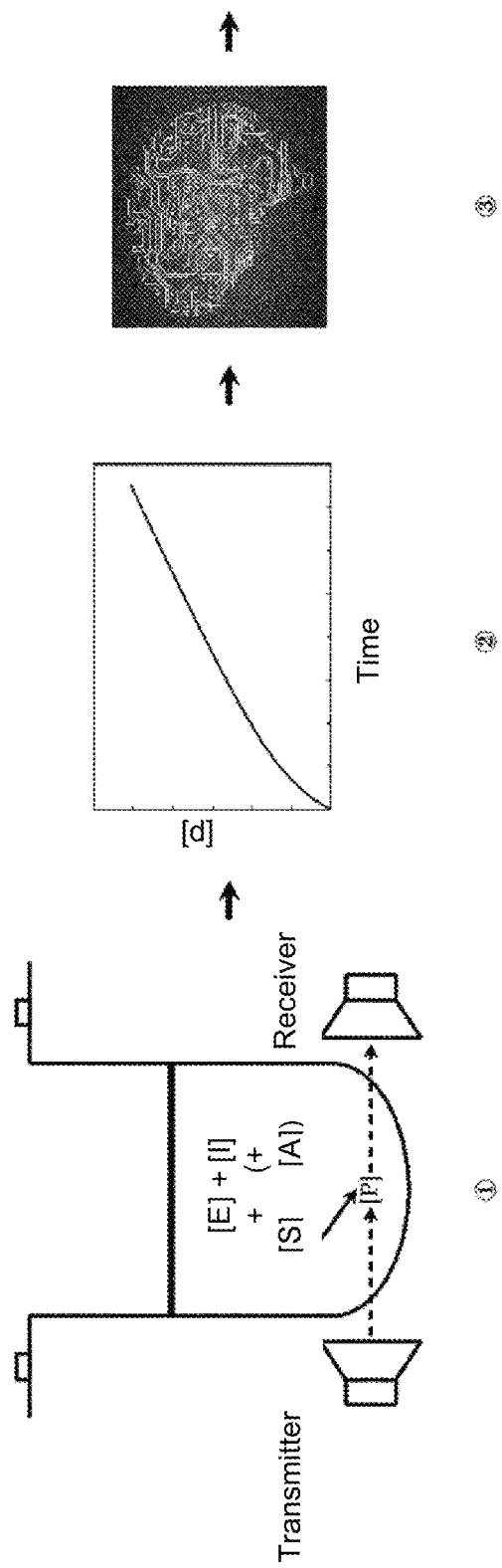
FIG. 4. Principle of the invention: Detection, identification and quantification of inhibitors of a blood coagulation enzyme. Key to diagram: 1. Measurement, 2. Recording kinetics, 3. Post-processing using automated learning models, 4. Biological result, 5. Detection, identification and quantification of an inhibitor of a blood coagulation enzyme. (1) A blood sample suspected of containing an inhibitor I of an enzyme E for coagulation is brought into contact with the enzyme E and a substrate S specific to the enzyme E in the same consumable in vitro. The cleavage of substrate S by the enzyme E into a product P causes the liberation of a marker which can be measured using a laboratory instrument. (2) The experimental measurement results in recording a curve which is proportional to the concentration of the product P over time. These kinetics are influenced by the presence, the mode of action and the concentration of inhibitor. (3) The kinetics are analysed and interpreted by a cascade of automated learning models which renders the biological result. (4) The biological result which is rendered indicates whether an inhibitor of the enzyme E is present in the measured sample, and if it is, what it is and in what concentration.

The objective of the present application is the detection of the presence, identification, or even quantification in vitro of inhibitors of blood coagulation enzymes, as described herein. In general, the inhibitors of blood coagulation enzymes, whether they are natural or synthetic, can be classified into four categories: reversible direct inhibitors, irreversible direct inhibitors, reversible indirect inhibitors and irreversible indirect inhibitors. Each category has its own unique biochemical reaction mechanism. Thus, in order to be able to carry out the assay, a blood sample suspected of containing an inhibitor I of an enzyme E for coagulation of blood is brought into contact in the same consumable with the enzyme E and a substrate S specific to the enzyme E. The experimental measurement consists of the competition between an inhibition reaction (between E and I) and an enzymatic reaction (between E and S). The cleavage of substrate S by the enzyme E into product P causes the liberation of a marker which will induce an observable change in the physical properties of the sample which is recorded using a measurement instrument over time. The resulting kinetics are influenced by the presence, the biochemical reaction mechanism and the concentration of inhibitor. These kinetics are then analysed and interpreted by a cascade of automated learning models which renders the expected biological result. FIG. 4 summarizes the principle forming the basis of the present invention.

EXAMPLES

2. Example of Application: Detection, Identification and Quantification of Synthetic Inhibitors of Factor Xa 2.1 Introduction Factor Xa is a blood coagulation enzyme which, associated with factor Va on a phospholipid membrane and in the presence of calcium, forms the prothrombinase enzyme complex responsible for the activation of prothrombin into thrombin (or factor IIa). The prothrombin activated into thrombin is then capable of transforming the soluble fibrinogen into a clot of insoluble fibrin, the final step in the blood coagulation cascade known as fibrin formation. Thus, factor Xa is an enzyme which plays a key role in the blood coagulation process: promoting its activity encourages and amplifies the coagulation of blood, while restricting its activity reduces and slows down blood coagulation. Many therapies therefore target factor Xa in order to reduce its activity and thus prevent the occurrence or recurrence of thromboembolic events such as phlebitis or pulmonary embolism. These include heparins or in fact direct oral anti-Xa anticoagulants.

Heparin is an anticoagulant drug which is administered subcutaneously or intravenously. In order to inhibitor factor Xa, heparin combines with a plasma protein: antithrombin. Antithrombin is a natural inhibitor of blood coagulation enzymes such as factor IIa, factor Xa, factor IXa and to a lesser extend factor VIIa (which may or may not be associated with tissue factor), factor XIa and factor XIIa. In order to exert its inhibiting action, antithrombin binds irreversibly to the active sites of these various enzymes; associated with heparin, its activity is multiplied by a factor of 1000. Thus, inter alia, heparin is an irreversible indirect inhibitor of factor Xa. There are two main families of heparins: unfractionated heparins (UFH) and low molecular weight heparins (LMWH). There is a third family of heparins: pentasaccharides such as fondanarinux or idraparinux. for example. UFHs principally accentuate the action of antithrombin on thrombin, while LMWHs potentialize the action of antithrombin, mainly on factor Xa.

Direct oral anticoagulants (DOACs) are anticoagulant drugs which are administered orally. They can be divided into two classes: direct anti-Xa inhibitors of factor Xa, and direct anti-IIa inhibitors of thrombin. In the context of the present proof of concept, the focus is solely on the anti-Xa family for which the molecules which are available on the market are: rivaroxaban or Xarelto® marketed by Bayer/Janssen Pharmaceutical, apixaban or Eliquis® marketed by Bristol-Myers Squibb/Pfizer, and edoxaban or Lixiana®/Savaysa® marketed by Daiichi Sankyo. These three molecules inhibit factor Xa by binding directly and reversibly to the active site of the enzyme: these three molecules are therefore reversible direct inhibitors of factor Xa.

As a proof of concept, this section describes the application of the method described in section 1 to the detection, identification and quantification of synthetic inhibitors of factor Xa. The elements described herein are transposable without difficulty to the detection, identification and quantification of synthetic inhibitors of factor IIa. In this regard, it should also be noted that heparins are irreversible indirect inhibitors, both of factors Xa and IIa.

2.2 Principle 2.2.1 Experimental Methodology 2.2.1.1 Sensitivity of the Method in Accordance with the Invention to Different Concentrations of Studied inhibitors, and Adaptation Techniques, if Necessary The commercial methods which are currently available for assaying anti-Xa anticoagulants such as heparins and DOACs all function in accordance with the same principle: an enzymatic assay with a dedicated experimental methodology, a dedicated calibration and dedicated calibration substances for each molecule (UFH, LMWH, rivaroxaban, apixaban and edoxaban). The Stago STA®—Multi-Hep Calibrator kit is also known; it can be used to assay UFHs and LMWHs using a common methodology and hybrid calibration. However, this kit cannot be used for the detection of DOACs.

The approach proposed herein can be used to carry out a "universal methodology" which is sensitive to the presence of the majority of anti-Xa anticoagulants, i.e. heparins (UFH and LMWH) and DOACs (rivaroxaban, apixaban and edoxaban). To this end, a volume of plasma from the sample to be assayed is diluted in a buffer. A substrate which is specific for factor Xa is added to the reaction mixture, then the ensemble is incubated to raise it to 37° C. Finally, the addition of factor Xa initiates the reaction and the measurement is carried out over several seconds.

The invention concerns an assay which is necessarily competitive: in addition, the enzyme must be the initiating reagent and thus be added last before initiating the measurement.

Figure 5:
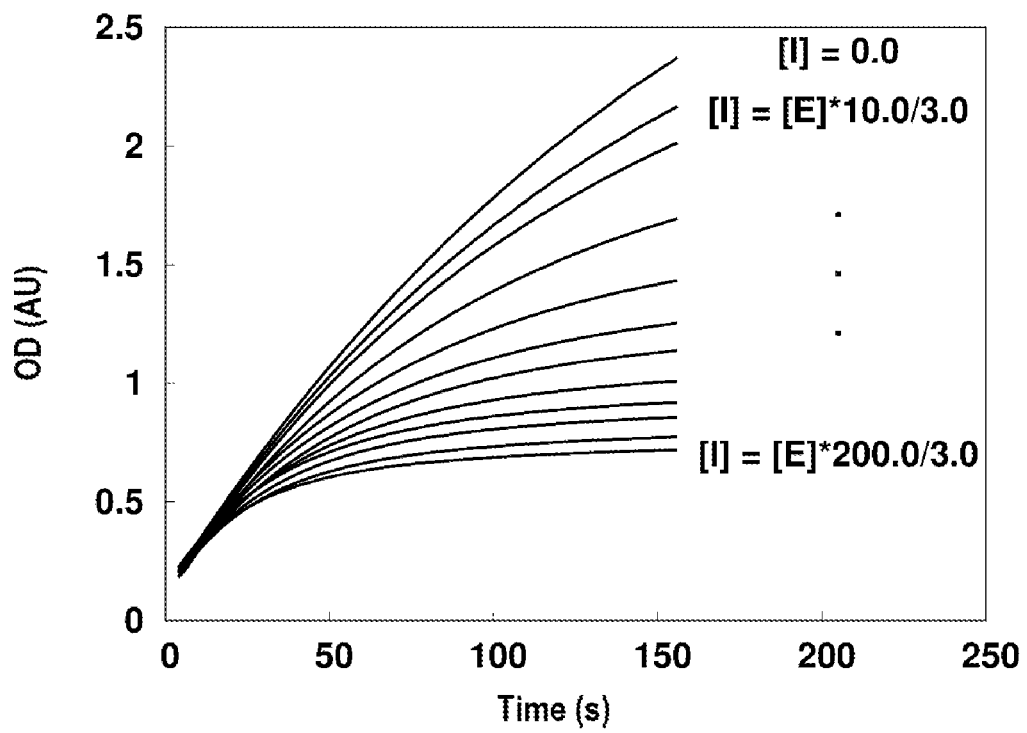
FIG. 5. Universal anti-Xa methodology: Sensitivity to UFHs. The figure illustrates the sensitivity of this method to various concentrations of UFH: it is observed that it can be used to assay concentrations of UFH comprised between approximately [E]*10.0/3.0 and [E]*200.0/3.0, ([E] being the final concentration in the enzyme test). The curves were measured using the particular universal methodology described herein ([E]=10 nM, [UFH](nM)=33, 67, 133, 200, 267, 333, 400, 467, 533, 600 and 670 i.e. [UFH](IU/mL) =0.1, 0.2, 0.0.4, 0.6, 0.8, 1.0, 1.2, 1.4, 1.6, 1.8 and 2.0).

For a final molar concentration [E] in the test using factor Xa, it has been observed and demonstrated experimentally that the methodology herein entitled "universal methodology" can be used to measure concentrations of UFH comprised between approximately [E]*10.0/3.0 and approximately [E]*200.0/3.0, as illustrated in FIG. 5. The different volumes of sample, buffer and reagents are selected and adjusted in order to completely assay the interval [0.1, 2.0] IU/mL.

Figure 6:
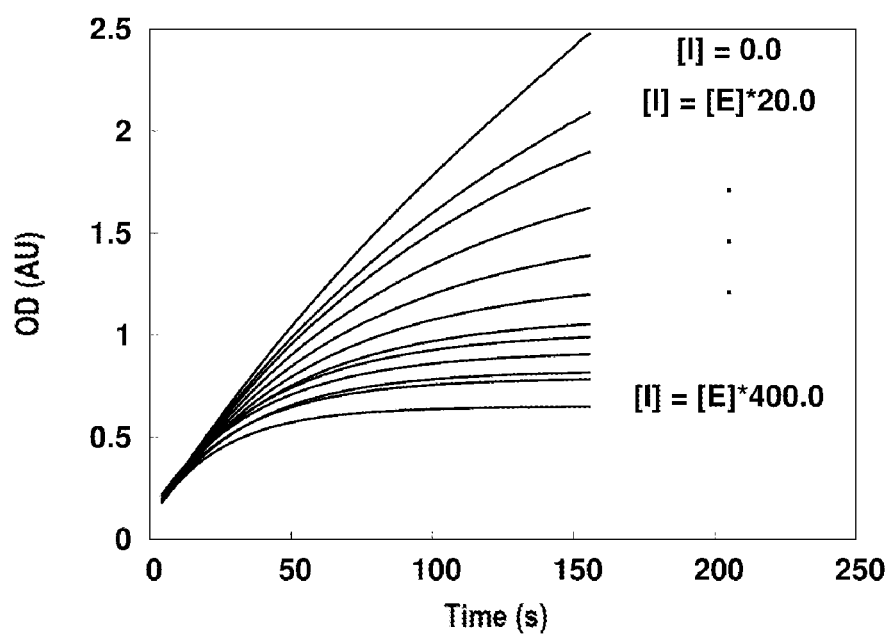
FIG. 6. Universal anti-Xa methodology: Sensitivity to LMWHs. The figure illustrates the sensitivity of this method at various concentrations of LMWH: it will be observed that it can be used to assay concentrations of LMWH comprised between approximately [E]*20.0 and [E]*400.0, ([E] being the final concentration in the enzyme test). The curves were measured using the particular universal methodology described herein ([E]=10 nM, [LMWH](nM)=200, 400, 800, 1200, 1600, 2000, 2200, 2400, 2600, 2800 and 4000 i.e. [LMWH](IU anti-Xa/mL)=0.1, 0.2, 0.0.4, 0.6, 0.8, 1.0, 1.2, 1.4, 1.6, 1.8 and 2.0).

For a final molar concentration [E] in the test using factor Xa, it has been observed and demonstrated experimentally that the methodology herein entitled "universal methodology" can be used to measure concentrations of LMWH comprised between approximately [E]*20.0 and approximately [E]*400.0, as illustrated in FIG. 6. The different volumes of sample, buffer and reagents are selected and adjusted in order to completely assay the interval [0.1, 2.0] IU anti-Xa/mL.

Figure 7:
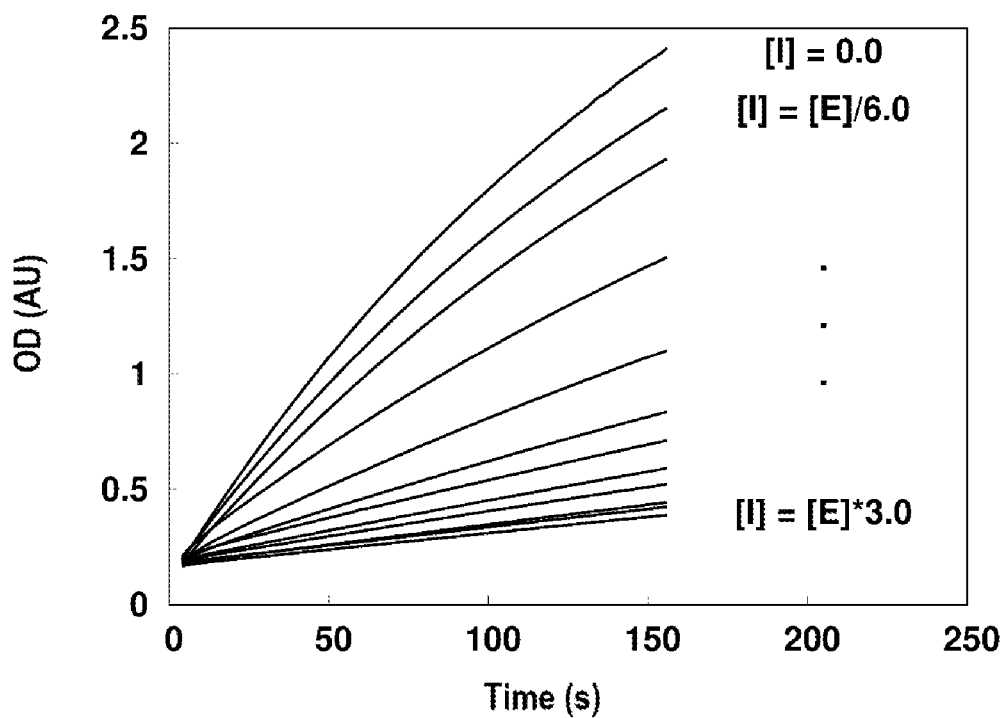
FIG. 7. Universal anti-Xa methodology: Sensitivity to rivaroxaban. The figure illustrates the sensitivity of this method at various concentrations of rivaroxaban: it will be observed that it can be used to assay concentrations of rivaroxaban comprised between approximately [E]/6.0 and [E]*3.0, ([E] being the final concentration in the enzyme test). The curves were measured using the particular universal methodology described herein ([E]=10 nM, [rivaroxaban](nM)=1.65, 3.3, 6.6, 9.9, 13.2, 16.5, 19.8, 23.1, 26.4, 29.7 and 33 i.e. [rivaroxaban](ng/mL)=10, 20, 40, 60, 80, 100, 120, 140, 160, 180 and 200).

For a final molar concentration [E] in the test using factor Xa, it has been observed and demonstrated experimentally that the methodology herein entitled "universal methodology" can be used to measure concentrations of rivaroxaban comprised between approximately [E]/6.0 and approximately [E]*3.0, as illustrated in FIG. 7. The different volumes of sample, buffer and reagents are selected and adjusted in order to completely assay the interval [20, 600] ng/mL.

Figure 8:
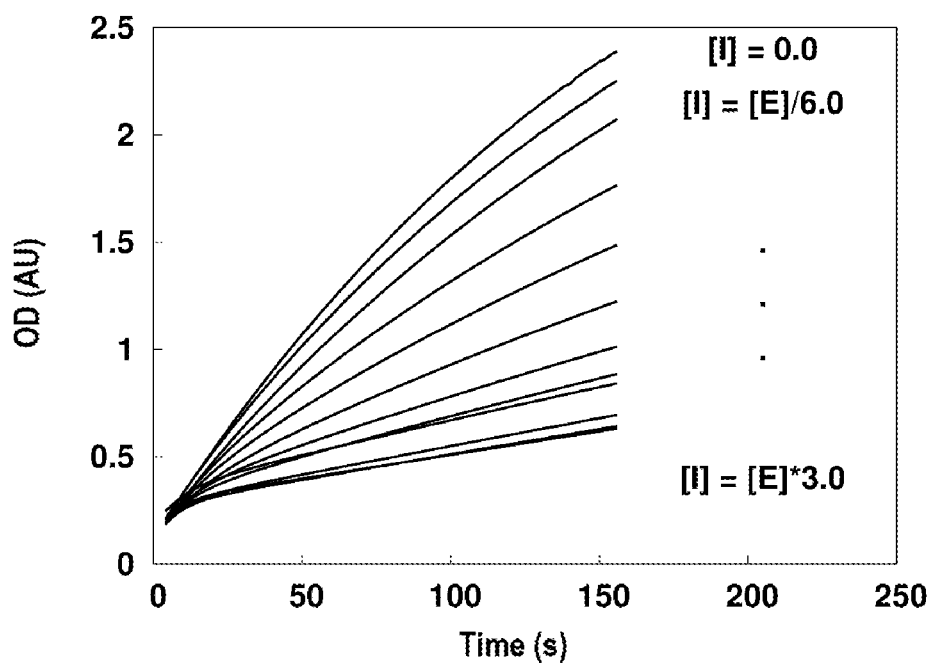
FIG. 8. Universal anti-Xa methodology: Sensitivity to apixaban. The figure illustrates the sensitivity of this method at various concentrations of apixaban: it will be observed that it can be used to assay concentrations of apixaban comprised between approximately [E]/6.0 and [E]*3.0, ([E] being the final concentration in the enzyme test). The curves were measured using the particular universal methodology described herein ([E]=10 nM, [apixaban](nM)=1.56, 3.1, 6.2, 9.3, 12.4, 15.5, 18.6, 21.7, 24.8, 27.9 and 31 i.e. [apixaban](ng/mL)=10, 20, 40, 60, 80, 100, 120, 140, 160, 180 and 200).

For a final molar concentration [E] in the test using factor Xa, it has been observed and demonstrated experimentally that the methodology herein entitled "universal methodology" can be used to measure concentrations of apixaban comprised between approximately [E]/6.0 and approximately [E]*3.0, as illustrated in FIG. 8. The different volumes of sample, buffer and reagents are selected and adjusted in order to completely assay the interval [20, 600] ng/mL.

Figure 9:
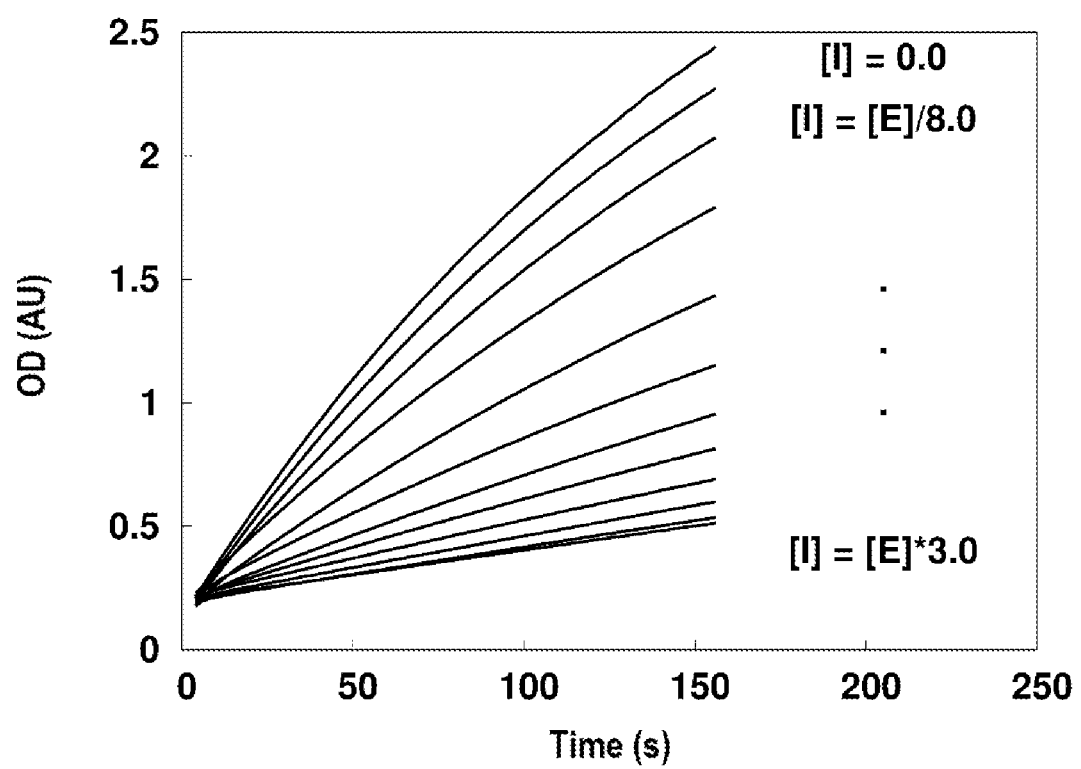
FIG. 9. Universal anti-Xa methodology: sensitivity to edoxaban. The figure illustrates the sensitivity of this method at various concentrations of edoxaban: it will be observed that it can be used to assay concentrations of edoxaban comprised between approximately [E]/8.0 and [E]*3.0, ([E] being the final concentration in the enzyme test). The curves were measured using the particular universal methodology described herein ([E]=10 nM, [edoxaban](nM)=1.3, 2.6, 5.2, 7.8, 10.4, 13.0, 15.6, 18.2, 20.8, 23.4 and 26 i.e. [edoxaban](ng/mL)=10, 20, 40, 60, 80, 100, 120, 140, 160, 180 and 200).

For a final molar concentration [E] in the test using factor Xa, it has been observed and demonstrated experimentally that the methodology herein entitled "universal methodology" can be used to measure concentrations of edoxaban comprised between approximately [E]/8.0 and approximately [E]*3.0, as illustrated in FIG. 9. The different volumes of sample, buffer and reagents are selected and adjusted in order to completely assay the interval [20, 600] ng/mL.

Because the measurement is competitive, clearly, in the context of the particular embodiment described herein, the substrate must be specific for factor Xa, but have little affinity for it so as not to interfere with the reaction between the enzyme and its inhibitor; to this end, the substrate must have a high Michaelis constant KM, between approximately 10 μM and 1000 μM. Because the affinity between the enzyme and the substrate is deliberately selected so as to be low, the catalytic constant kcat of the enzyme for the substrate must be sufficiently high, for example more than approximately 10 s-1, in order to generate the product P (i.e. the marker) and to allow a signal to be measured. A high catalytic constant can also be used to minimise the concentration of enzyme-substrate complex. Finally, the initial concentration of substrate $[S]_0$ must be sufficient to allow the generation of the marker throughout the period d of the measurement, for example to satisfy the following inequality:

$$[S]_0 > \frac{v_{max}[S]_0}{K_M + [S]_0} d$$

However, it must not be too high, so that it interferes as little as possible with the reaction between the enzyme and its inhibitor: its value may, for example be less than KM*10.

The duration of the measurement is selected so as to be sufficiently long to enable the anticoagulant, if it is present, to exert its inhibiting action on the enzyme and that this is observable via the measurement; an example is a duration which is comprised between 10 and 1000 seconds.

2.2.1.2 Particular Exemplary Embodiments

Synthetic inhibitors of factor Xa are the heparins, which are irreversible indirect inhibitors, and the anti-Xa DOACs, which are reversible direct inhibitors.

Finally, a particular exemplary embodiment in the context of the methodology entitled "universal methodology" has been implemented with the Stago STA®—Liquid Anti-Xa commercial kit. The person skilled in the art could readily adapt the proof of concept provided herein to using, for the initial assay, any kit with the same scope as that used herein, or adapting the composition of such a kit, in particular to adapt the nature of a given enzyme-substrate pair; the proof of concept provided herein is not limited per se to carrying out the method in accordance with the invention. If necessary, elements which, for greater ease of comprehension, allow an appropriate kit to be selected are listed above. These indications could be:

the substrate employed must be specific for factor Xa but have little affinity for it so as not to interfere with the reaction between the enzyme and its inhibitor.

For example, the substrate employed must have a Michaelis constant KM which is considered to be high, in particular between approximately 10 μM and 1000 μM;

Because the affinity between the enzyme and the substrate is deliberately selected so as to be low, the catalytic constant kcat of the enzyme for the substrate must be sufficiently high, for example more than approximately 10 s-1, or more than 10 s-1;

The initial concentration of substrate [S]0 must be sufficient to allow the generation of the marker throughout the period d of the measurement, without being too high, so that it interferes minimally with the reaction between the enzyme and its inhibitor: its value may, for example, be less than KM*10;

The duration of the measurement which does not per se form part of a commercial kit is preferably selected so as to be sufficiently long to enable the anticoagulant, if it is present, to exert its inhibiting action on the enzyme and that this is observable via the measurement; an example is a duration which is comprised between 10 and 1000 seconds. Particular examples are described below.

In accordance with this particular embodiment, the in vitro measurement for the detection, the identification, and the quantification of synthetic inhibitors of factor Xa was carried out in accordance with the following principle:

25 μL of a plasma sample suspected of containing a heparin or an anti-Xa DOAC was diluted in 25 μL of Owren Koller buffer (TOK), then placed in a consumable;

150 μL of "Substrate" reagent (MAPA-Gly-Arg-pNA) (reagent in the STA®—Liquid Anti-Xa commercial kit) specific for factor Xa was added to the reaction mixture;

an incubation step of 240 seconds raised the reaction mixture to 37° C.;

150 μL of the reagent "F. Xa" (bovine factor Xa) (reagent in the STA®—Liquid Anti-Xa commercial kit) was added to the reaction mixture, thereby initiating competition between the inhibition reaction and the enzymatic reaction;

the measurement per se was then carried out over 156 seconds: factor Xa transforms the substrate into product while at the same time being inhibited by the heparin or the DOAC if they are present in the sample. The cleavage of substrate into product induces the liberation of paranitroaniline (pNA) which is measured by colorimetry at 405 nm every two seconds on an instrument of the STA-R® type.

the measurement results in recording a kinetic measurement which is influenced by the presence, the mode of action and the concentration of these synthetic inhibitors of factor Xa.

In addition, in accordance with another particular embodiment, the methodology described above was optimized to allow altogether detection of the presence of a synthetic inhibitor of factor Xa, recognition of the category of the synthetic inhibitor of factor Xa, identification of the heparin as well as the assay of UFHs and LMWHs. The first methodology known as "universal" above could not in fact enable the assay of DOACs over the entire desired concentration range (this range could naturally vary as a function of the objectives). A second methodology was optimized for the identification of DOACs as well as for the assay of rivaroxaban, apixaban and edoxaban. It was carried out in accordance with the following principle:

- 6.25 μL of a plasma sample which contained anti-Xa DOAC was diluted in 43.75 μL of Owren Koller buffer (TOK), then placed in a consumable;
- 150 μL of "Substrate" reagent (MAPA-Gly-Arg-pNA, reagent in the STA®—Liquid Anti-Xa commercial kit) specific for factor Xa was added to the reaction mixture;
- an incubation step of 240 seconds raised the reaction mixture to 37° C.;
- 150 μL of the reagent "F. Xa" (bovine factor Xa, reagent in the STA®—Liquid Anti-Xa commercial kit) was added to the reaction mixture, thereby initiating competition between the inhibition reaction and the enzymatic reaction;
- the measurement per se was then carried out over 86 seconds: factor Xa transforms the substrate into product while at the same time being inhibited by the DOAC present in the sample. The cleavage of substrate into product induces the liberation of paranitroaniline (pNA) which is measured by colorimetry at 405 nm every two seconds on an instrument of the STA-R® type.
- the measurement resulted in recording a kinetic measurement which is influenced by the presence, the mode of action and the concentration of the anti-Xa DOAC.

It should be noted that the second methodology is identical to the first methodology apart from the dilution factor for the sample. The duration of the measurement also differed: the optical density was measured every two seconds up to t=86 s. In the present description, reference should be made to the characteristics of the first methodology as corresponding to a particular embodiment of a "universal methodology" and reference should be made to the features of the second methodology as corresponding to a particular embodiment of an "optimized DOAC methodology".

In fact, concerning the sensitivity of detection of the two particular examples of the methodology reported herein, depending on the modalities of implementation described herein (in particular the enzyme-substrate pair, dilution of the sample and measurement period), the verifications carried out and shown in FIGS. 5 to 9, commented on above, enabled the following to be demonstrated.

For the universal methodology, as applied above to "factor Xa", the final concentrations in the test are:
for enzyme: $[E] \approx 10$ nM
for substrate: $[S] \approx 482$ μM
if the inhibitor is
 a UFH: $0 \leq [I] \leq 670$ nM or 2 IU/mL;
 a LMWH: $0 \leq [I] \leq 4000$ nM or 2 IU anti-Xa/mL;
 rivaroxaban: $0 \leq [I] \leq 30$ nM or 180 ng/mL;
 apixaban: $0 \leq [I] \leq 30$ nM or 190 ng/mL;
 edoxaban: $0 \leq [I] \leq 30$ nM or 230 ng/mL;

In addition, the catalytic constant kcat and the Michaelis constant KM associated with the enzyme—substrate reaction were respectively approximately 400 s-1 and 500 μM.

For the optimized DOAC methodology, the final concentrations in the test were:
for enzyme: idem as above;
for substrate: idem as above;
if the inhibitor is
 rivaroxaban: $0 \leq [I] \leq 30$ nM or 720 ng/mL;
 apixaban: $0 \leq [I] \leq 30$ nM or 760 ng/mL;
 edoxaban: $0 \leq [I] \leq 30$ nM or 920 ng/mL;

The catalytic constant kcat and the Michaelis constant KM associated with the enzyme—substrate reaction have the same values as above.

In summary, the approach described herein means that the universal methodology can be used to assay UFH, LMWH, rivaroxaban, apixaban and edoxaban over the range:
from 0.0 to 2.0 IU/mL for UFHs;
from 0.0 to 2.0 IU anti-Xa/mL for LMWHs;
from 0.0 to 180.0 ng/mL for rivaroxaban;
from 0.0 to 190.0 ng/mL for apixaban;
from 0.0 to 230.0 ng/mL for edoxaban.

By using the optimized DOAC methodology as applied above to "factor Xa", it can be used to assay rivaroxaban, apixaban and edoxaban over the range (experimental results not shown herein, but obtained following identical manipulations to those which enabled the results of FIGS. 5 to 9 to be obtained, with the adjustments operated in the methodology termed the optimized DOAC methodology herein):
from 0.0 to 720.0 ng/mL for rivaroxaban;
from 0.0 to 760.0 ng/mL for apixaban;
from 0.0 to 920.0 ng/mL for edoxaban.

Thus, by means of a single method and without calibration, the approach which is proposed and described in the present application can be used to detect the presence of and to assay five anti-Xa molecules, in contrast to current commercial methods which necessitate and impose a dedicated methodology and calibration per molecule. It can also be used to identify the molecule, which is currently impossible. More particularly, an assay applied to the search for an inhibitor of factor IIa may comprise the following steps and/or modalities:
V (sample)=175 μL
Dilution to 1/12th with the reagent R2 of the STA-Stachrom Heparin kit
 Composition: TRIS EDTA pH 8.4
 Preparation: 15 mL flask, QSP 150 mL
Incubation 240 sec (in particular at a temperature as indicated in the other examples, or in the present application)
Ra=75 μL=STA-Stachrom ATIII Substrate
 Composition: CBS 61.50 chromogenic substrate, approximately 1.4 μmole of EtM-SPro-Arg-pNA, AcOH per mL of reconstituted reagent.
 Reconstitution with 6 mL of distilled water Rd=50 µL=STA-Stachrom ATIII Thrombin
  Composition: Bovine thrombin, approximately 11.3 nKat per mL after reconstitution
  Reconstitution: with 6 mL of already diluted R2 STA-Stachrom Heparin.

2.2.2 Post-Processing

Figure 10:
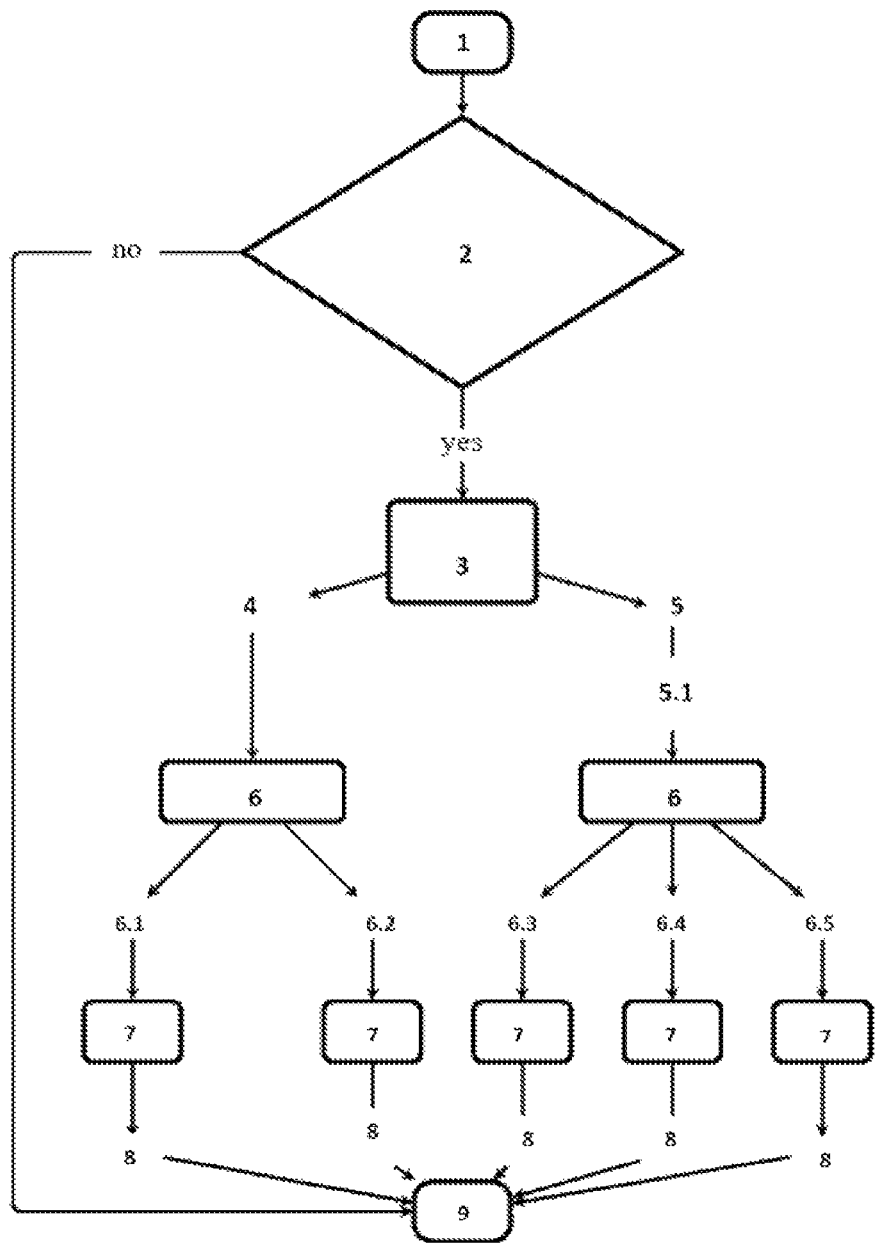
FIG. 10. Cascade of automated learning models for the detection the identification and the quantification of synthetic inhibitors of factor Xa. Key to diagram: 1. Start, 2. Presence of an inhibitor of factor Xa?, 3. Category of the anti-Xa, 4. Heparin, 5. DOAC, 5.1. Experimental follow-up, 6. Identification, 6.1. UFH, 6.2. LMWH, 6.3. Rivaroxaban, 6.4. Apixaban, 6.5. Edoxaban, 7. Quantification, 8. Concentration, 9. End.

FIG. 10 details the cascade of automated learning models, representative of the particular embodiment implemented herein, which analyses and interprets the kinetics obtained by the experimental measurement with the aim of rendering the expected biological result.

The cascade is composed of nine automated learning models; these nine models took as input the kinetics obtained by the experimental measurement and provided a result at the output:

- The first model (Model A) is a classification model: by virtue of the appearance of the kinetics which are inputted into it, it determines whether, yes or no, the analysed sample contains a synthetic inhibitor of factor Xa;
- The second model (Model B) is also a classification model: knowing that the analysed sample contains a synthetic inhibitor of factor Xa and by virtue of the appearance of the kinetics which are inputted into it, it recognises the category of the synthetic inhibitor anti-Xa: heparin or DOAC;
- If the inhibitor is a heparin, and by virtue of the appearance of the kinetics which are inputted into it, a classification model (Model C) identifies whether it is a UFH or a LMWH;
- If the inhibitor is a UFH, and by virtue of the appearance of the kinetics which are inputted into it, a regression model calculates the concentration of UFH;
- If the inhibitor is a LMWH, and by virtue of the appearance of the kinetics which are inputted into it, a regression model calculates the concentration of LMWH;
- In accordance with a particular embodiment, if the inhibitor is a DOAC, an experimental measurement follows on using the optimized DOAC methodology detailed in this description and a new set of kinetics is recorded then presented to the input of a classification model (Model C) which identifies whether the inhibitor is rivaroxaban, apixaban or edoxaban;
- If the inhibitor is rivaroxaban, and by virtue of the appearance of the kinetics which are inputted into it, a regression model calculates the concentration of rivaroxaban;
- If the inhibitor is apixaban, and by virtue of the appearance of the kinetics which are inputted into it, a regression model calculates the concentration of apixaban;
- If the inhibitor is edoxaban, and by virtue of the appearance of the kinetics which are inputted into it, a regression model calculates the concentration of edoxaban.

Finally, a regression model D can be used to carry out an assay.

The following sections respectively list, for each of these automated learning models, the learning and validation data sets which have been used to train them, as well as the associated algorithms, in a manner such as to illustrate a proof of concept which forms the basis of the present invention.

It should be noted that for each data set, the concentrations of synthetic inhibitors of factor Xa (UFH, LMWH, rivaroxaban, apixaban and edoxaban) were measured using an automated STA-R® instrument using the STA-R®-Liquid Anti-Xa commercial kit as well as the associated commercial calibrants and methodologies. Naturally, the invention defined in the present application may also be executed, if appropriate in accordance with the guidance from the manufacturers, using the contents of different kits in order to implement it. The present experimental section details the methods which can be used to ensure a proper transposition, in particular as regards the ranges of values for the inhibitors which can be detected. Finally, it will be noted that, logically, the conditions under which the kinetic measurements were carried out must be the same between the samples to be analysed by the method of the invention and those which were employed for producing the learning and validation data, for each learning model under consideration.

Detection of the Presence or the Absence of an Anti-Xa Anticoagulant

Data Sets

Learning data

- 3 sets of kinetic measurements on the STA-R® AUT05450 for a plasma supplemented with 0.0 IU/mL of UFH calcium (Calciparine®);
- 3 sets of kinetic measurements on the STA-R® AUT06366 for a plasma supplemented with 0.0 IU/mL of UFH sodium (Heparin Choay®);
- 3 sets of kinetic measurements on the STA-R® AUT06366 for a plasma supplemented with 0.0 IU anti-Xa/mL of LMWH (Fragmine®);
- 3 sets of kinetic measurements on the STA-R® AUT06366 for a plasma supplemented with 0.0 IU anti-Xa/mL of LMWH (Lovenox®);
- 3 sets of kinetic measurements on the STA-R® AUT06366 for a plasma supplemented with 0.0 IU anti-Xa/mL of LMWH (Innohep®);
- 3 sets of kinetic measurements on the STA-R® AUT05016 for a plasma supplemented with 0.0 IU/mL of UFH calcium (Calciparine®);
- 3 sets of kinetic measurements on the STA-R® AUT00603 for a plasma supplemented with 0.0 IU/mL of UFH sodium (Heparin Choay®);
- 3 sets of kinetic measurements on the STA-R® AUT05016 for a plasma supplemented with 0.0 IU anti-Xa/mL of LMWH (Fragmine®);
- 3 sets of kinetic measurements on the STA-R® AUT00603 for a plasma supplemented with 0.0 IU anti-Xa/mL of LMWH (Lovenox®);
- 3 sets of kinetic measurements on the STA-R® AUT00603 for a plasma supplemented with 0.0 IU anti-Xa/mL of LMWH (Innohep®);
- 3 sets of kinetic measurements on the STA-R® AUT06399 for a plasma supplemented with 0.0 IU/mL of UFH calcium (Calciparine®);
- 3 sets of kinetic measurements on the STA-R® AUT06399 for a plasma supplemented with 0.0 IU/mL of UFH sodium (Heparin Choay®);
- 3 sets of kinetic measurements on the STA-R® AUT06399 for a plasma supplemented with 0.0 IU anti-Xa/mL of LMWH (Fragmine®);
- 3 sets of kinetic measurements on the STA-R® AUT06399 for a plasma supplemented with 0.0 IU anti-Xa/mL of LMWH (Lovenox®);
- 3 sets of kinetic measurements on the STA-R® AUT06399 for a plasma supplemented with 0.0 IU anti-Xa/mL of LMWH (Innohep®);
- 3 sets of kinetic measurements on the STA-R® AUT06399 for a plasma supplemented with 0.0 ng/mL of rivaroxaban (Xarelto®);

- 3 sets of kinetic measurements on the STA-R® AUT06399 for a plasma supplemented with 0.0 ng/mL of apixaban (Eliquis®);
- 3 sets of kinetic measurements on the STA-R® AUT06399 for a plasma supplemented with 0.0 ng/mL of edoxaban (Lixiana®/Savaysa®);
- 3 sets of kinetic measurements on the STA-R® AUT00603 for a plasma supplemented with 0.0 ng/mL of rivaroxaban (Xarelto®);
- 3 sets of kinetic measurements on the STA-R® AUT00603 for a plasma supplemented with 0.0 ng/mL of apixaban (Eliquis®);
- 3 sets of kinetic measurements on the STA-R® AUT00603 for a plasma supplemented with 0.0 ng/mL of edoxaban (Lixiana®/Savaysa®);
- 3 sets of kinetic measurements on the STA-R® AUT06366 for a plasma supplemented with 0.0 ng/mL of rivaroxaban (Xarelto®);
- 3 sets of kinetic measurements on the STA-R® AUT06366 for a plasma supplemented with 0.0 ng/mL of apixaban (Eliquis®);
- 3 sets of kinetic measurements on the STA-R® AUT06366 for a plasma supplemented with 0.0 ng/mL of edoxaban (Lixiana®/Savaysa®);
- 3 sets of kinetic measurements on the STA-R® AUT05450 for a plasma supplemented with 0.0 ng/mL of rivaroxaban (Xarelto®);
- 3 sets of kinetic measurements on the STA-R® AUT05450 for a plasma supplemented with 0.0 ng/mL of apixaban (Eliquis®);
- 3 sets of kinetic measurements on the STA-R® AUT05450 for a plasma supplemented with 0.0 ng/mL of edoxaban (Lixiana®/Savaysa®);
- Triple run measurements carried out for each level of supplement;
- Universal methodology.

Automated learning model: A support-vector machine (One Class SVM) was trained with the data set described above (plasma not supplemented with inhibitors of factor Xa) in a semi-supervised manner. The optimisation of the hyperparameters was carried out using "leave-one-out cross-validation". The hyperparameters for the model were:

Core function: Radial Basis Function
$\gamma \approx 3.77 \cdot 10^{-5}$
$v \approx 0.0131$ Identification of the Category of the Anti-Xa Anticoagulant Data Sets Learning data

- 60 sets of kinetic measurements on the STA-R® AUT05450 for a plasma supplemented with 0.12, 0.225, 0.33, 0.43, 0.55, 0.66, 0.75, 0.9, 0.875, 0.995, 1.13, 1.24, 1.315, 1.44, 1.53, 1.63, 1.7, 1.88, 1.955 and 2.005 IU/mL of UFH calcium (Calciparine®);
- 60 sets of kinetic measurements on the STA-R® AUT06366 for a plasma supplemented with 0.11, 0.21, 0.32, 0.43, 0.545, 0.625, 0.635, 0.76, 0.87, 0.965, 1.14, 1.17, 1.295, 1.425, 1.52, 1.605, 1.695, 1.835, 1.84 and 1.99 IU/mL of UFH sodium (Heparin Choay®);
- 60 sets of kinetic measurements on the STA-R® AUT06366 for a plasma supplemented with 0.145, 0.245, 0.35, 0.44, 0.535, 0.64, 0.735, 0.85, 0.935, 1.07, 1.14, 1.24, 1.265, 1.44, 1.495, 1.55, 1.66, 1.745, 1.785 and 2.255 IU anti-Xa/mL of LMWH (Fragmine®);
- 60 sets of kinetic measurements on the STA-R® AUT06366 for a plasma supplemented with 0.105, 0.19, 0.3, 0.4, 0.485, 0.57, 0.685, 0.78, 0.865, 0.945, 1.035, 1.145, 1.23, 1.32, 1.42, 1.495, 1.58, 1.69, 1.755 and 1.805 IU anti-Xa/mL of LMWH (Lovenox®);
- 60 sets of kinetic measurements on the STA-R® AUT06366 for a plasma supplemented with 0.11, 0.2, 0.295, 0.395, 0.465, 0.535, 0.63, 0.795, 0.885, 0.955, 1.055, 1.21, 1.27, 1.37, 1.455, 1.515, 1.64, 1.81, 1.83 and 1.97 IU anti-Xa/mL of LMWH (Innohep®);
- 60 sets of kinetic measurements on the STA-R® AUT06399 for a plasma supplemented with 10, 20, 30, 38, 46, 64, 72, 82, 90, 101, 110, 115, 130, 140, 148, 152, 166, 164 and 192 ng/mL of rivaroxaban (Xarelto®);
- 60 sets of kinetic measurements on the STA-R® AUT06399 for a plasma supplemented with 10, 20, 32, 41, 46, 57, 65, 76, 79, 96, 105, 116, 125, 135, 138, 152, 161, 169, 180 and 186 ng/mL of apixaban (Eliquis®);
- 60 sets of kinetic measurements on the STA-R® AUT06399 for a plasma supplemented with 10, 21, 29, 39, 48, 60, 73, 81, 92, 107, 115, 129, 136, 129, 127, 149, 163, 181, 195 and 200 ng/mL of edoxaban (Lixiana®/Savaysa®);
- 60 sets of kinetic measurements on the STA-R® AUT00603 for a plasma supplemented with 10, 20, 35, 41, 49, 56, 66, 73, 84, 93, 105, 110, 116, 134, 143, 155, 160, 175, 181 and 198 ng/mL of rivaroxaban (Xarelto®);
- 60 sets of kinetic measurements on the STA-R® AUT00603 for a plasma supplemented with 10, 20, 20, 26, 36, 43, 53, 60, 70, 75, 93, 103, 110, 121, 135, 136, 152, 160, 175, 185 and 191 ng/mL of apixaban (Eliquis®);
- 60 sets of kinetic measurements on the STA-R® AUT00603 for a plasma supplemented with 10, 21, 27, 40, 49, 64, 73, 90, 99, 108, 122, 132, 144, 130, 136, 153, 169, 192, 194 and 216 ng/mL of edoxaban (Lixiana®/Savaysa®);
- 60 sets of kinetic measurements on the STA-R® AUT06366 for a plasma supplemented with 10, 20, 25, 34, 43, 50, 62, 74, 84, 93, 104, 108, 118, 133, 143, 159, 158, 176, 173 and 202 ng/mL of rivaroxaban (Xarelto®);
- 60 sets of kinetic measurements on the STA-R® AUT06366 for a plasma supplemented with 10, 20, 25, 34, 44, 50, 61, 70, 74, 94, 103, 110, 122, 135, 138, 147, 162, 173, 182 and 186 ng/mL of apixaban (Eliquis®);
- 60 sets of kinetic measurements on the STA-R® AUT06366 for a plasma supplemented with 10, 20, 28, 40, 49, 64, 74, 95, 103, 110, 122, 132, 143, 131, 132, 157, 171, 195, 191 and 201 ng/mL of edoxaban (Lixiana®/Savaysa®);
- Triple run measurements carried out for each level of supplement;
- Universal methodology.

Validation data

- 60 sets of kinetic measurements on the STA-R® AUT05016 for a plasma supplemented with 0.095, 0.205, 0.315, 0.44, 0.555, 0.655, 0.77, 0.84, 0.855, 0.98, 1.15, 1.275, 1.335, 1.43, 1.555, 1.6, 1.75, 1.845, 1.92 and 1.96 IU/mL of UFH calcium (Calciparine®);
- 60 sets of kinetic measurements on the STA-R® AUT00603 for a plasma supplemented with 0.115, 0.23, 0.32, 0.455, 0.535, 0.655, 0.66, 0.78, 0.865, 0.995, 1.175, 1.2, 1.355, 1.47, 1.555, 1.64, 1.735, 1.8, 1.88 and 2.025 IU/mL of UFH sodium (Heparin Choay®);

60 sets of kinetic measurements on the STA-R® AUT05016 for a plasma supplemented with 0.165, 0.255, 0.345, 0.445, 0.54, 0.63, 0.73, 0.82, 0.92, 1.045, 1.125, 1.16, 1.3, 1.355, 1.475, 1.57, 1.685, 1.75, 1.835 and 2.16 IU anti-Xa/mL of LMWH (Fragmine®);

60 sets of kinetic measurements on the STA-R® AUT00603 for a plasma supplemented with 0.1, 0.195, 0.31, 0.4, 0.515, 0.625, 0.71, 0.83, 0.925, 1.015, 1.085, 1.205, 1.28, 1.36, 1.49, 1.575, 1.65, 1.81, 1.85 and 1.965 IU anti-Xa/mL of LMWH (Lovenox®);

60 sets of kinetic measurements on the STA-R® AUT00603 for a plasma supplemented with 0.14, 0.22, 0.305, 0.42, 0.5, 0.56, 0.66, 0.83, 0.905, 0.995, 1.07, 1.25, 1.275, 1.365, 1.47, 1.615, 1.66, 1.805, 1.9 and 1.975 IU anti-Xa/mL of LMWH (Innohep®);

60 sets of kinetic measurements on the STA-R® AUT05450 for a plasma supplemented with 10, 20, 35, 41, 48, 59, 65, 77, 85, 95, 103, 113, 121, 134, 145, 160, 161, 169 and 202 ng/mL of rivaroxaban (Xarelto®);

60 sets of kinetic measurements on the STA-R® AUT05450 for a plasma supplemented with 10, 20, 27, 39, 41, 52, 61, 67, 76, 93, 96, 105, 123, 127, 140, 145, 155, 167, 184 and 182 ng/mL of apixaban (Eliquis®);

60 sets of kinetic measurements on the STA-R® AUT05450 for a plasma supplemented with 10, 21, 28, 41, 49, 62, 74, 92, 101, 112, 120, 132, 142, 129, 133, 155, 168, 188, 200 and 206 ng/mL of edoxaban (Lixiana®/Savaysa®);

Triple run measurements carried out for each level of supplement;

Universal methodology.

Automated Learning Model

A k-nearest neighbour model was trained with the data set described above. Its hyperparameters were:

k=5;

Metric: Euclidean distance.

Identification of Heparins

Data Sets

Learning data 60 sets of kinetic measurements on the STA-R® AUT05450 for a plasma supplemented with 0.12, 0.225, 0.33, 0.43, 0.55, 0.66, 0.75, 0.9, 0.875, 0.995, 1.13, 1.24, 1.315, 1.44, 1.53, 1.63, 1.7, 1.88, 1.955 and 2.005 IU/mL of UFH calcium (Calciparine®);

60 sets of kinetic measurements on the STA-R® AUT05016 for a plasma supplemented with 0.095, 0.205, 0.315, 0.44, 0.555, 0.655, 0.77, 0.84, 0.855, 0.98, 1.15, 1.275, 1.335, 1.43, 1.555, 1.6, 1.75, 1.845, 1.92 and 1.96 IU/mL of UFH calcium (Calciparine®);

60 sets of kinetic measurements on the STA-R® AUT06366 for a plasma supplemented with 0.11, 0.21, 0.32, 0.43, 0.545, 0.625, 0.635, 0.76, 0.87, 0.965, 1.14, 1.17, 1.295, 1.425, 1.52, 1.605, 1.695, 1.835, 1.84 and 1.99 IU/mL of UFH sodium (Heparin Choay®);

60 sets of kinetic measurements on the STA-R® AUT00603 for a plasma supplemented with 0.115, 0.23, 0.32, 0.455, 0.535, 0.655, 0.66, 0.78, 0.865, 0.995, 1.175, 1.2, 1.355, 1.47, 1.555, 1.64, 1.735, 1.8, 1.88 and 2.025 IU/mL of UFH sodium (Heparin Choay®);

60 sets of kinetic measurements on the STA-R® AUT06366 for a plasma supplemented with 0.145, 0.245, 0.35, 0.44, 0.535, 0.64, 0.735, 0.85, 0.935, 1.07, 1.14, 1.24, 1.265, 1.44, 1.495, 1.55, 1.66, 1.745, 1.785 and 2.255 IU anti-Xa/mL of LMWH (Fragmine®);

60 sets of kinetic measurements on the STA-R® AUT05016 for a plasma supplemented with 0.165, 0.255, 0.345, 0.445, 0.54, 0.63, 0.73, 0.82, 0.92, 1.045, 1.125, 1.16, 1.3, 1.355, 1.475, 1.57, 1.685, 1.75, 1.835 and 2.16 IU anti-Xa/mL of LMWH (Fragmine®); 60 sets of kinetic measurements on the STA-R® AUT06366 for a plasma supplemented with 0.105, 0.19, 0.3, 0.4, 0.485, 0.57, 0.685, 0.78, 0.865, 0.945, 1.035, 1.145, 1.23, 1.32, 1.42, 1.495, 1.58, 1.69, 1.755 and 1.805 IU anti-Xa/mL of LMWH (Lovenox®);

60 sets of kinetic measurements on the STA-R® AUT00603 for a plasma supplemented with 0.1, 0.195, 0.31, 0.4, 0.515, 0.625, 0.71, 0.83, 0.925, 1.015, 1.085, 1.205, 1.28, 1.36, 1.49, 1.575, 1.65, 1.81, 1.85 and 1.965 IU anti-Xa/mL of LMWH (Lovenox®);

60 sets of kinetic measurements on the STA-R® AUT06366 for a plasma supplemented with 0.11, 0.2, 0.295, 0.395, 0.465, 0.535, 0.63, 0.795, 0.885, 0.955, 1.055, 1.21, 1.27, 1.37, 1.455, 1.515, 1.64, 1.81, 1.83 and 1.97 IU anti-Xa/mL of LMWH (Innohep®);

60 sets of kinetic measurements on the STA-R® AUT00603 for a plasma supplemented with 0.14, 0.22, 0.305, 0.42, 0.5, 0.56, 0.66, 0.83, 0.905, 0.995, 1.07, 1.25, 1.275, 1.365, 1.47, 1.615, 1.66, 1.805, 1.9 and 1.975 IU anti-Xa/mL of LMWH (Innohep®);

Triple run measurements carried out for each level of supplement;

Universal methodology.

Validation data 24 sets of kinetic measurements on the STA-R® AUT06399 for a plasma supplemented with 0.25, 0.5, 0.75, 1.0, 1.25, 1.5, 1.75 and 2.0 IU/mL of UFH calcium (Calciparine®);

24 sets of kinetic measurements on the STA-R® AUT06399 for a plasma supplemented with 0.25, 0.5, 0.75, 1.0, 1.25, 1.5, 1.75 and 2.0 IU/mL of UFH sodium (Heparin Choay®);

24 sets of kinetic measurements on the STA-R® AUT06399 for a plasma supplemented with 0.25, 0.5, 0.75, 1.0, 1.25, 1.5, 1.75 and 2.0 IU anti-Xa/mL of LMWH (Fragmine®);

24 sets of kinetic measurements on the STA-R® AUT06399 for a plasma supplemented with 0.25, 0.5, 0.75, 1.0, 1.25, 1.5, 1.75 and 2.0 IU anti-Xa/mL of LMWH (Lovenox®);

24 sets of kinetic measurements on the STA-R® AUT06399 for a plasma supplemented with 0.25, 0.5, 0.75, 1.0, 1.25, 1.5, 1.75 and 2.0 IU anti-Xa/mL of LMWH (Innohep®);

Triple run measurements carried out for each level of supplement;

Universal methodology.

Automated Learning Model

A multilayer perceptron (neural network) was trained with the data set described above. Its hyperparameters were:

77 neurons in the input layer;
27 neurons in the hidden layer;
3 neurons in the output layer;
Activation function for each neuron of the various hidden layers: Rectified Linear Unit (or ReLU);
Activation function for each neuron of the output layer: softmax.

Assays of Unfractionated Heparins

Data Sets

Learning data
- 63 sets of kinetic measurements on the STA-R® AUT05450 for a plasma supplemented with 0.0, 0.12, 0.225, 0.33, 0.43, 0.55, 0.66, 0.75, 0.9, 0.875, 0.995, 1.13, 1.24, 1.315, 1.44, 1.53, 1.63, 1.7, 1.88, 1.955 and 2.005 IU/mL of UFH calcium (Calciparine®);
- 63 sets of kinetic measurements on the STA-R® AUT06366 for a plasma supplemented with 0.0, 0.11, 0.21, 0.32, 0.43, 0.545, 0.625, 0.635, 0.76, 0.87, 0.965, 1.14, 1.17, 1.295, 1.425, 1.52, 1.605, 1.695, 1.835, 1.84 and 1.99 IU/mL of UFH sodium (Heparin Choay®);
- Triple run measurements carried out for each level of supplement;
- Universal methodology.

Validation data
- 63 sets of kinetic measurements on the STA-R® AUT05016 for a plasma supplemented with 0.0, 0.095, 0.205, 0.315, 0.44, 0.555, 0.655, 0.77, 0.84, 0.855, 0.98, 1.15, 1.275, 1.335, 1.43, 1.555, 1.6, 1.75, 1.845, 1.92 and 1.96 IU/mL of UFH calcium (Calciparine®);
- 63 sets of kinetic measurements on the STA-R® AUT00603 for a plasma supplemented with 0.0, 0.115, 0.23, 0.32, 0.455, 0.535, 0.655, 0.66, 0.78, 0.865, 0.995, 1.175, 1.2, 1.355, 1.47, 1.555, 1.64, 1.735, 1.8, 1.88 and 2.025 IU/mL of UFH sodium (Heparin Choay®);
- Triple run measurements carried out for each level of supplement;
- Universal methodology.

Automated Learning Model

A multilayer perceptron (neural network) was trained with the data set described above. Its hyperparameters were:
77 neurons in the input layer;
27 neurons in the hidden layer;
1 neuron in the output layer;
Activation function for each neuron of the various hidden layers: Rectified Linear Unit (or ReLU).

Assays of Low Molecular Weight Heparins

Data Sets

Learning data
- 63 sets of kinetic measurements on the STA-R® AUT06366 for a plasma supplemented with 0.0, 0.145, 0.245, 0.35, 0.44, 0.535, 0.64, 0.735, 0.85, 0.935, 1.07, 1.14, 1.24, 1.265, 1.44, 1.495, 1.55, 1.66, 1.745, 1.785 and 2.255 IU anti-Xa/mL of LMWH (Fragmine®);
- 63 sets of kinetic measurements on the STA-R® AUT06366 for a plasma supplemented with 0.0, 0.105, 0.19, 0.3, 0.4, 0.485, 0.57, 0.685, 0.78, 0.865, 0.945, 1.035, 1.145, 1.23, 1.32, 1.42, 1.495, 1.58, 1.69, 1.755 and 1.805 IU anti-Xa/mL of LMWH (Lovenox®);
- 63 sets of kinetic measurements on the STA-R® AUT06366 for a plasma supplemented with 0.0, 0.11, 0.2, 0.295, 0.395, 0.465, 0.535, 0.63, 0.795, 0.885, 0.955, 1.055, 1.21, 1.27, 1.37, 1.455, 1.515, 1.64, 1.81, 1.83 and 1.97 IU anti-Xa/mL of LMWH (Innohep®);
- Triple run measurements carried out for each level of supplement;
- Universal methodology.

Validation data
- 63 sets of kinetic measurements on the STA-R® AUT05016 for a plasma supplemented with 0.0, 0.165, 0.255, 0.345, 0.445, 0.54, 0.63, 0.73, 0.82, 0.92, 1.045, 1.125, 1.16, 1.3, 1.355, 1.475, 1.57, 1.685, 1.75, 1.835 and 2.16 IU anti-Xa/mL of LMWH (Fragmine®);
- 63 sets of kinetic measurements on the STA-R® AUT00603 for a plasma supplemented with 0.0, 0.1, 0.195, 0.31, 0.4, 0.515, 0.625, 0.71, 0.83, 0.925, 1.015, 1.085, 1.205, 1.28, 1.36, 1.49, 1.575, 1.65, 1.81, 1.85 and 1.965 IU anti-Xa/mL of LMWH (Lovenox®);
- 63 sets of kinetic measurements on the STA-R® AUT00603 for a plasma supplemented with 0.0, 0.14, 0.22, 0.305, 0.42, 0.5, 0.56, 0.66, 0.83, 0.905, 0.995, 1.07, 1.25, 1.275, 1.365, 1.47, 1.615, 1.66, 1.805, 1.9 and 1.975 IU anti-Xa/mL of LMWH (Innohep®);
- Triple run measurements carried out for each level of supplement;
- Universal methodology.

Automated Learning Model

A multilayer perceptron (neural network) was trained with the data set described above. Its hyperparameters were:
77 neurons in the input layer;
27 neurons in the hidden layer;
1 neuron in the output layer;
Activation function for each neuron of the various hidden layers: Rectified Linear Unit (or ReLU).

Identification of Anti-Xa DOAC

Data Sets

Learning data
- 60 sets of kinetic measurements on the STA-R® AUT00460 for a plasma supplemented with 10, 20, 29, 37, 44, 54, 62, 89, 115, 143, 160, 192, 226, 252, 287, 319, 331, 361, 391 and 407 ng/mL of rivaroxaban (Xarelto®);
- 69 sets of kinetic measurements on the STA-R® AUT00460 for a plasma supplemented with 10, 20, 31, 42, 48, 72, 92, 116, 143, 163, 192, 217, 247, 276, 298, 321, 348, 370, 397, 416, 439, 459 and 473 ng/mL of apixaban (Eliquis®);
- 69 sets of kinetic measurements on the STA-R® AUT00460 for a plasma supplemented with 16, 21, 30, 39, 51, 76, 100, 128, 142, 155, 187, 215, 245, 269, 284, 322, 347, 359, 380, 393, 410, 426 and 436 ng/mL of edoxaban (Lixiana®/Savaysa®);
- Triple run measurements carried out for each level of supplement;
- Optimized DOAC methodology.

Validation data
- 60 sets of kinetic measurements on the STA-R® AUT00460 for a plasma supplemented with 10, 20, 29, 37, 44, 54, 62, 89, 115, 143, 160, 192, 226, 252, 287, 319, 331, 361, 391 and 407 ng/mL of rivaroxaban (Xarelto®);
- 69 sets of kinetic measurements on the STA-R® AUT00460 for a plasma supplemented with 10, 20, 31, 42, 48, 72, 92, 116, 143, 163, 192, 217, 247, 276, 298, 321, 348, 370, 397, 416, 439, 459 and 473 ng/mL of apixaban (Eliquis®);

69 sets of kinetic measurements on the STA-R® AUT00460 for a plasma supplemented with 16, 21, 30, 39, 51, 76, 100, 128, 142, 155, 187, 215, 245, 269, 284, 322, 347, 359, 380, 393, 410, 426 and 436 ng/mL of edoxaban (Lixiana®/Savaysa®);

Triple run measurements carried out for each level of supplement;

Optimized DOAC methodology.

Automated Learning Model

A multilayer perceptron (neural network) was trained with the data set described above. Its hyperparameters were:

42 neurons in the input layer;
29 neurons in the first hidden layer;
16 neurons in the second hidden layer;
3 neurons in the output layer;
Activation function for each neuron of the various hidden layers: Rectified Linear Unit (or ReLU);
Activation function for each neuron of the output layer: softmax.

Assay of Rivaroxaban

Data Sets

Learning data 63 sets of kinetic measurements on the STA-R® AUT00460 for a plasma supplemented with 0, 10, 20, 29, 37, 44, 54, 62, 89, 115, 143, 160, 192, 226, 252, 287, 319, 331, 361, 391 and 407 ng/mL of rivaroxaban (Xarelto®);

Triple run measurements carried out for each level of supplement;

Optimized DOAC methodology.

Validation data 63 sets of kinetic measurements on the STA-R® AUT00460 for a plasma supplemented with 0, 10, 20, 29, 37, 44, 54, 62, 89, 115, 143, 160, 192, 226, 252, 287, 319, 331, 361, 391 and 407 ng/mL of rivaroxaban (Xarelto®);

Triple run measurements carried out for each level of supplement;

Optimized DOAC methodology.

Automated Learning Model

A multilayer perceptron (neural network) was trained with the data set described above. Its hyperparameters were:

42 neurons in the input layer;
29 neurons in the first hidden layer;
16 neurons in the second hidden layer;
1 neuron in the output layer;
Activation function for each neuron of the various hidden layers: Rectified Linear Unit (or ReLU).

Assay of Apixaban

Data Sets

Learning data 72 sets of kinetic measurements on the STA-R® AUT00460 for a plasma supplemented with 0, 10, 20, 31, 42, 48, 72, 92, 116, 143, 163, 192, 217, 247, 276, 298, 321, 348, 370, 397, 416, 439, 459 and 473 ng/mL of apixaban (Eliquis®);

Triple run measurements carried out for each level of supplement;

Optimized DOAC methodology.

Validation data 72 sets of kinetic measurements on the STA-R® AUT00460 for a plasma supplemented with 0, 10, 20, 31, 42, 48, 72, 92, 116, 143, 163, 192, 217, 247, 276, 298, 321, 348, 370, 397, 416, 439, 459 and 473 ng/mL of apixaban (Eliquis®);

Triple run measurements carried out for each level of supplement;

Optimized DOAC methodology.

Automated Learning Model

A multilayer perceptron (neural network) was trained with the data set described above. Its hyperparameters were:

42 neurons in the input layer;
29 neurons in the first hidden layer;
16 neurons in the second hidden layer;
1 neuron in the output layer;
Activation function for each neuron of the various hidden layers: Rectified Linear Unit (or ReLU).

Assay of Edoxaban

Data Sets

Learning data 72 sets of kinetic measurements on the STA-R® AUT00460 for a plasma supplemented with 0, 16, 21, 30, 39, 51, 76, 100, 128, 142, 155, 187, 215, 245, 269, 284, 322, 347, 359, 380, 393, 410, 426 and 436 ng/mL of edoxaban (Lixiana®/Savaysa®);

Triple run measurements carried out for each level of supplement;

Optimized DOAC methodology.

Validation data 72 sets of kinetic measurements on the STA-R® AUT00460 for a plasma supplemented with 0, 16, 21, 30, 39, 51, 76, 100, 128, 142, 155, 187, 215, 245, 269, 284, 322, 347, 359, 380, 393, 410, 426 and 436 ng/mL of edoxaban (Lixiana®/Savaysa®);

Triple run measurements carried out for each level of supplement;

Optimized DOAC methodology.

Automated Learning Model

A multilayer perceptron (neural network) was trained with the data set described above. Its hyperparameters were:

42 neurons in the input layer;
29 neurons in the first hidden layer;
16 neurons in the second hidden layer;
1 neuron in the output layer;
Activation function for each neuron of the various hidden layers: Rectified Linear Unit (or ReLU).

2.3 Results

This section lists the results for the performances obtained by the various automated learning models of the particular cascade of FIG. 10 on the data measured on real samples using the experimental methodology described in section 2.2.1. Each sub-section details the data measured as well as the performances obtained. A single run measurement was sufficient to render the result: however, as this section demonstrates, a triple run measurement could improve the performances.

2.3.1 Detection of the Presence or the Absence of an Anti-Xa Anticoagulant This section provides the results obtained for the detection of the presence or the absence of an anti-Xa anticoagulant using the invention.

Test Data

Single run analysis: 298 sets of kinetic measurements on 298 actual samples (39 normal plasma samples, 259 plasma samples from patients taking anti-Xa anticoagulants);

Triple run analysis: 894 sets of kinetic measurements on 298 actual samples (39 normal plasma samples, 259 plasma samples from patients taking anti-Xa anticoagulants);

The instrument was the STA-R® AUT06399;

Universal methodology.

[Table 1]

TABLE 1

Presence or absence of an anti-Xa anticoagulant: confusion matrix. Single run analysis. The results produced an accuracy of 99.61% for the detection of the presence of an anti-Xa anticoagulant. The results produced an accuracy of 97.44% for the detection of the absence of an anti-Xa anticoagulant.

| | Predicted outcome | |
|---|---|---|
| Actual value | Presence of an anti-Xa | Absence of an anti-Xa |
| Presence of an anti-Xa | 257 | 2 |
| Absence of an anti-Xa | 1 | 38 |

[Table 2]

TABLE 2

Presence or absence of an anti-Xa anticoagulant: confusion matrix. Triple run analysis. The results produced an accuracy of 99.61% for the detection of the presence of an anti-Xa anticoagulant. The results produced an accuracy of 97.44% for the detection of the absence of an anti-Xa anticoagulant.

| | Predicted outcome | |
|---|---|---|
| Actual value | Presence of an anti-Xa | Absence of an anti-Xa |
| Presence of an anti-Xa | 257 | 2 |
| Absence of an anti-Xa | 1 | 38 |

Results

Tables 1 and 2 respectively provide the confusion matrices associated with the detection of the presence or the absence of an anti-Xa anticoagulant when the analysis was carried out on the test data set in a single run and when a triple run analysis was carried out. The results for the detection of the presence of an anti-Xa anticoagulant produced an accuracy of 99.61% when a single run analysis was carried out and an accuracy of 99.61% when a triple run analysis was carried out. The results for the detection of the absence of an anti-Xa anticoagulant produced an accuracy of 97.44% when a single run analysis was carried out and an accuracy of 97.44% when a triple run analysis was carried out.

2.3.2 Identification of the Category of the Anti-Xa Anticoagulant

This section provides the results obtained for the identification of the category of the anti-Xa anticoagulant using the particular embodiment of the invention described herein.

This section provides the results obtained for the identification of the category of the anti-Xa anticoagulant using the particular embodiment of the invention described herein.

Test Data

Single run analysis: 259 sets of kinetic measurements on 259 actual samples (91 plasma samples from patients taking heparins, 168 plasma samples from patients taking anti-Xa DOACs);

Triple run analysis: 777 sets of kinetic measurements on 259 actual samples (91 plasma samples from patients taking heparins, 168 plasma samples from patients taking anti-Xa DOACs);

The instrument was the STA-R® AUT06399;

Universal methodology.

[Table 3]

TABLE 3

Identification of the category of the anti-Xa anticoagulant: confusion matrix. Single run analysis. The results produced an accuracy of 98.07% for the identification of the category of the anti-Xa anticoagulant.

| | Predicted outcome | |
|---|---|---|
| Actual value | Heparin | DOAC |
| Heparin | 86 | 5 |
| DOAC | 0 | 168 |

[Table 4]

TABLE 4

Identification of the category of the anti-Xa anticoagulant: confusion matrix. Triple run analysis. The results produced an accuracy of 97.68% for the identification of the category of the anti-Xa anticoagulant.

| | Predicted outcome | |
|---|---|---|
| Actual value | Heparin | DOAC |
| Heparin | 86 | 5 |
| DOAC | 0 | 168 |

Results

Tables 3 and 4 respectively provide the confusion matrices associated with the identification of the category of the anti-Xa anticoagulant when a single run analysis was carried out and when the analysis was carried out on the test data set in a triple run. The results for the identification of the category of the anti-Xa anticoagulant produced an accuracy of 98.07% when a single run analysis was carried out and an accuracy of 97.68% when a triple run analysis was carried out.

2.3.3 Identification of Heparins

This section provides the results obtained for the identification of heparins using the particular embodiment of the invention described herein.

Test Data

Single run analysis: 91 sets of kinetic measurements on 91 actual samples (29 actual samples from patients taking UFH, 62 actual samples from patients taking LMWH);

Triple run analysis: 273 sets of kinetic measurements on 91 actual samples (29 actual samples from patients taking UFH, 62 actual samples from patients taking LMWH);

The instrument was the STA-R® AUT06399;

Universal methodology.

[Table 5]

TABLE 5

Identification of heparins: confusion matrix. Single run analysis. The results produced an accuracy of 92.31% for the identification of heparins.

| | Predicted outcome | |
|---|---|---|
| Actual value | UFH | LMWH |
| UFH | 25 | 4 |
| LMWH | 3 | 59 |

[Table 6]

TABLE 6

Identification of heparins: confusion matrix. Triple run analysis. The results produced an accuracy of 93.41% for the identification of heparins.

| Actual value | Predicted outcome | |
|---|---|---|
| | UFH | LMWH |
| UFH | 26 | 3 |
| LMWH | 3 | 59 |

Results

Tables 5 and 6 respectively provide the confusion matrices associated with the identification of heparins when a single run analysis was carried out and when the analysis was carried out on the test data set in a triple run. The results for the identification of heparins produced an accuracy of 92.31% when a single run analysis was carried out and an accuracy of 93.41% when a triple run analysis was carried out.

2.3.4 Assays of Unfractionated Heparins

This section provides the results of assays of the concentrations of UFH on samples from patients obtained using the particular embodiment of the invention described herein compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSI EP9-A2).

Test Data

Single run analysis: 24 sets of kinetic measurements on 24 actual samples from patients taking UFH;
Triple run analysis: 72 sets of kinetic measurements on 24 actual samples from patients taking UFH;
The instrument was the STA-R® AUT06399;
Universal methodology.

Results

Figure 11:
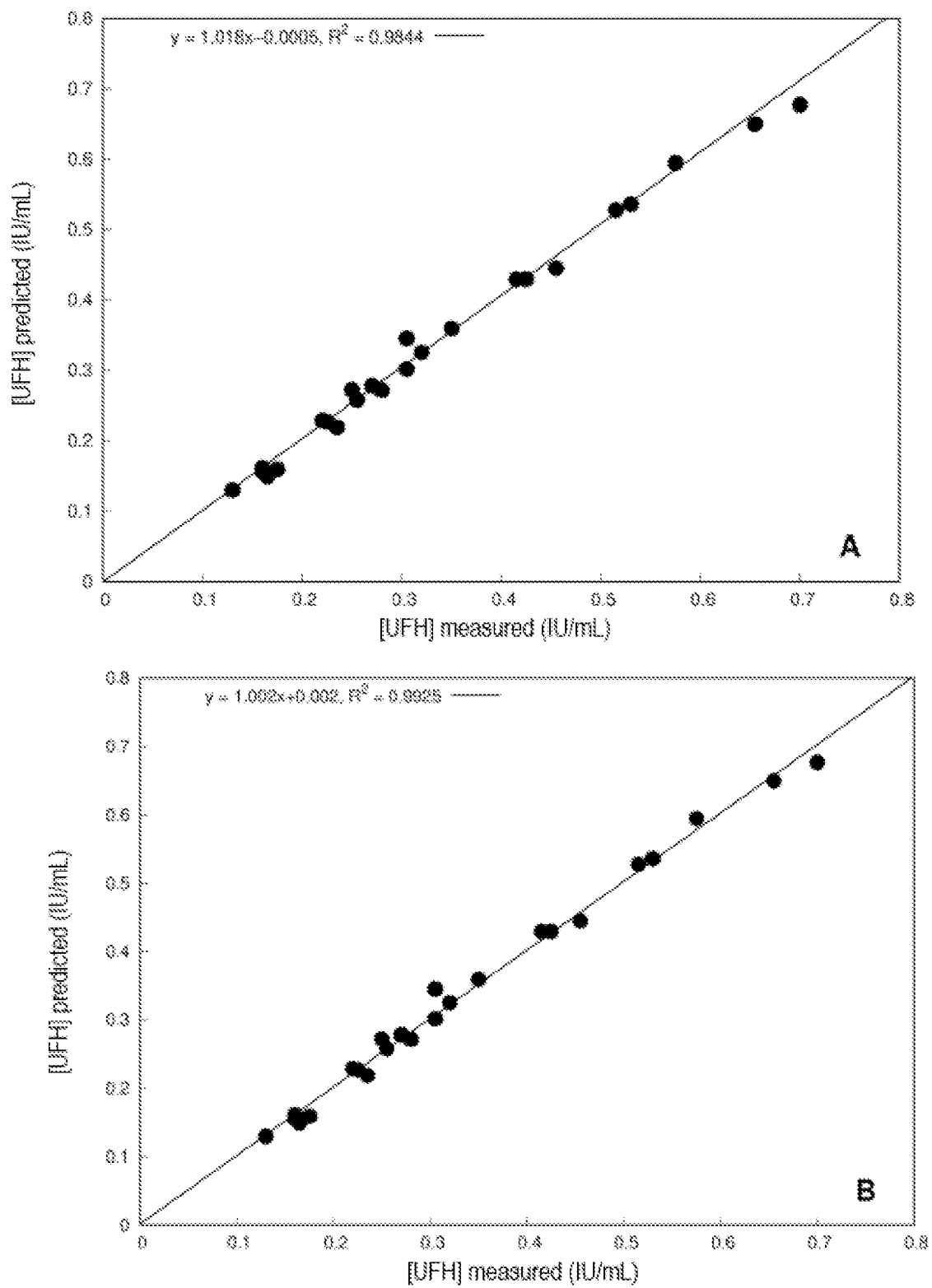
FIG. 11. Assay of UFHs. A. Single run analysis: the results of a comparison of the assays of the concentrations of UFH measured by using the approach described herein ([UFH] predicted) with the concentrations of UFH measured using the standard approach ([UFH] measured) on the test data set provided a straight line with the equation y=1.018x−0.0005 and a coefficient of determination R2=0.9844. B. Triple run analysis: the results of a comparison of the assays of the concentrations of UFH measured by using the approach described herein ([UFH] predicted) with the concentrations of UFH measured using the standard approach ([UFH] measured) on the test data set provided a straight line with the equation y=1.002x+0.002 and a coefficient of determination R2=0.9925.

FIG. 11 provides the results of a comparison of the assays of the concentrations of UFH measured by using the approach described herein with the concentrations of UFH measured using the standard approach on the test data set. These comparisons provided a straight line with the equation y=1.018x−0.0005 and a coefficient of determination R2=0.9844 when a single run analysis was carried out; they provided a straight line with the equation y=1.002x+0.002 and a coefficient of determination R2=0.9925 when a triple run analysis was carried out.

2.3.5 Assays of Low Molecular Weight Heparins

This section provides the results of assays of the concentrations of LMWHs on samples from patients obtained using the particular embodiment of the invention described herein compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSI EP9-A2).

Test Data

Single run analysis: 62 sets of kinetic measurements on 62 actual samples from patients taking LMWH;
Triple run analysis: 186 sets of kinetic measurements on 62 actual samples from patients taking LMWH;
The instrument was the STA-R® AUT06399;
Universal methodology.

Results

Figure 12:
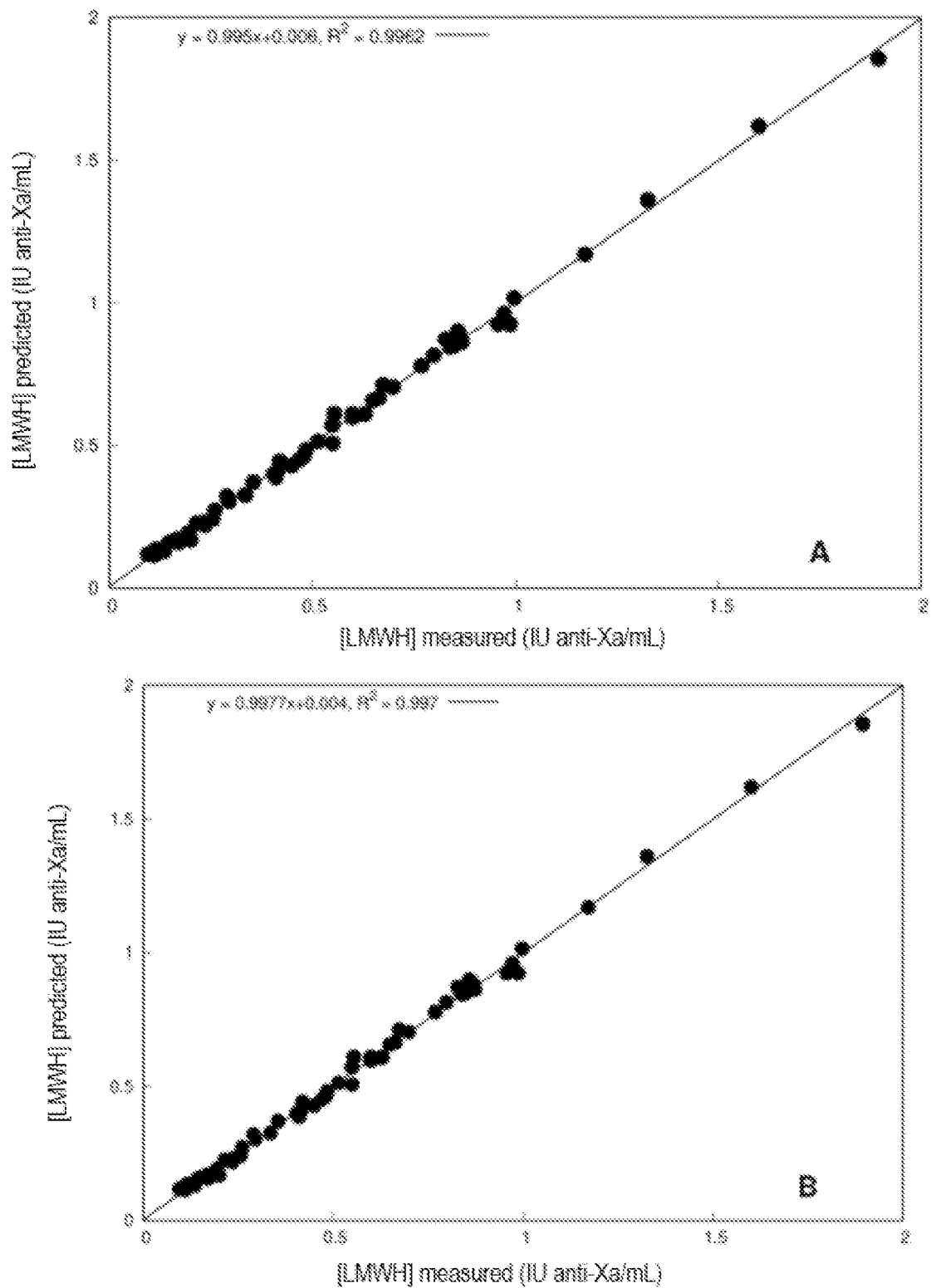
FIG. 12. Assay of HDPMs. A. Single run analysis: the results of a comparison of the assays of the concentrations of LMWH measured by using the approach described herein ([LMWH] predicted) with the concentrations of LMWH measured using the standard approach ([LMWH] measured) on the test data set provided a straight line with the equation y=0.995x+0.006 and a coefficient of determination R2=0.9962. B. Triple run analysis: the results of a comparison of the assays of the concentrations of LMWH measured by using the approach described herein ([LMWH] predicted) with the concentrations of LMWH measured using the standard approach ([LMWH] measured) on the test data set provided a straight line with the equation y=0.9977x+0.004 and a coefficient of determination R2=0.997.

FIG. 12 provides the results of a comparison of the assays of the concentrations of LMWH measured by using the approach described herein with the concentrations of LMWH measured using the standard approach on the test data set. These comparisons provided a straight line with the equation y=0.995x+0.006 and a coefficient of determination R2=0.9962 when a single run analysis was carried out; they provided a straight line with the equation y=0.9977x+0.004 and a coefficient of determination R2=0.997 when a triple run analysis was carried out.

2.3.6 Identification of Anti-Xa DOAC

This section provides the results obtained for the identification of anti-Xa DOACs using the particular embodiment of the invention described herein.

Test Data

Single run analysis: 168 sets of kinetic measurements on 168 actual samples (65 actual samples from patients taking rivaroxaban, 45 actual samples from patients taking apixaban, 58 actual samples from patients taking edoxaban);
Triple run analysis: 504 sets of kinetic measurements on 168 actual samples (65 actual samples from patients taking rivaroxaban, 45 actual samples from patients taking apixaban, 58 actual samples from patients taking edoxaban);
The instrument was the STA-R® AUT06399;
Optimized DOAC methodology.

Results

Tables 7 and 8 respectively provide the confusion matrices associated with the identification of anti-Xa DOACs when a single run analysis was carried out and when the analysis was carried out on the test data set in a triple run. The results for the identification of anti-Xa DOACs produced an accuracy of 91.67% when a single run analysis was carried out and an accuracy of 96.43% when a triple run analysis was carried out.

[Table 7]

TABLE 7

Identification of anti-Xa DOACs: confusion matrix. Single run analysis. The results produced an accuracy of 91.67% for the identification of anti-Xa DOACs.

| Actual value | Predicted outcome | | |
|---|---|---|---|
| | Rivaroxaban | Apixaban | Edoxaban |
| Rivaroxaban | 61 | 1 | 3 |
| Apixaban | 0 | 45 | 0 |
| Edoxaban | 10 | 0 | 48 |

[Table 8]

TABLE 8

Identification of anti-Xa DOACs: confusion matrix. Triple run analysis. The results produced an accuracy of 96.43% for the identification of anti-Xa DOACs.

| Actual value | Predicted outcome | | | |
|---|---|---|---|---|
| | −1 | Rivaroxaban | Apixaban | Edoxaban |
| Rivaroxaban | 1 | 64 | 0 | 0 |
| Apixaban | 0 | 0 | 45 | 0 |
| Edoxaban | 0 | 5 | 0 | 53 |

2.3.7 Assay of Rivaroxaban

This section provides the results of assays of the concentrations of rivaroxaban on samples from patients obtained using the particular embodiment of the invention described herein compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSI EP9-A2).

Test Data
- Single run analysis: 62 sets of kinetic measurements on 62 actual samples from patients taking rivaroxaban;
- Triple run analysis: 186 sets of kinetic measurements on 62 actual samples from patients taking rivaroxaban;
- The instrument was the STA-R® AUT06399;
- Optimized DOAC methodology.

Results

Figure 13:
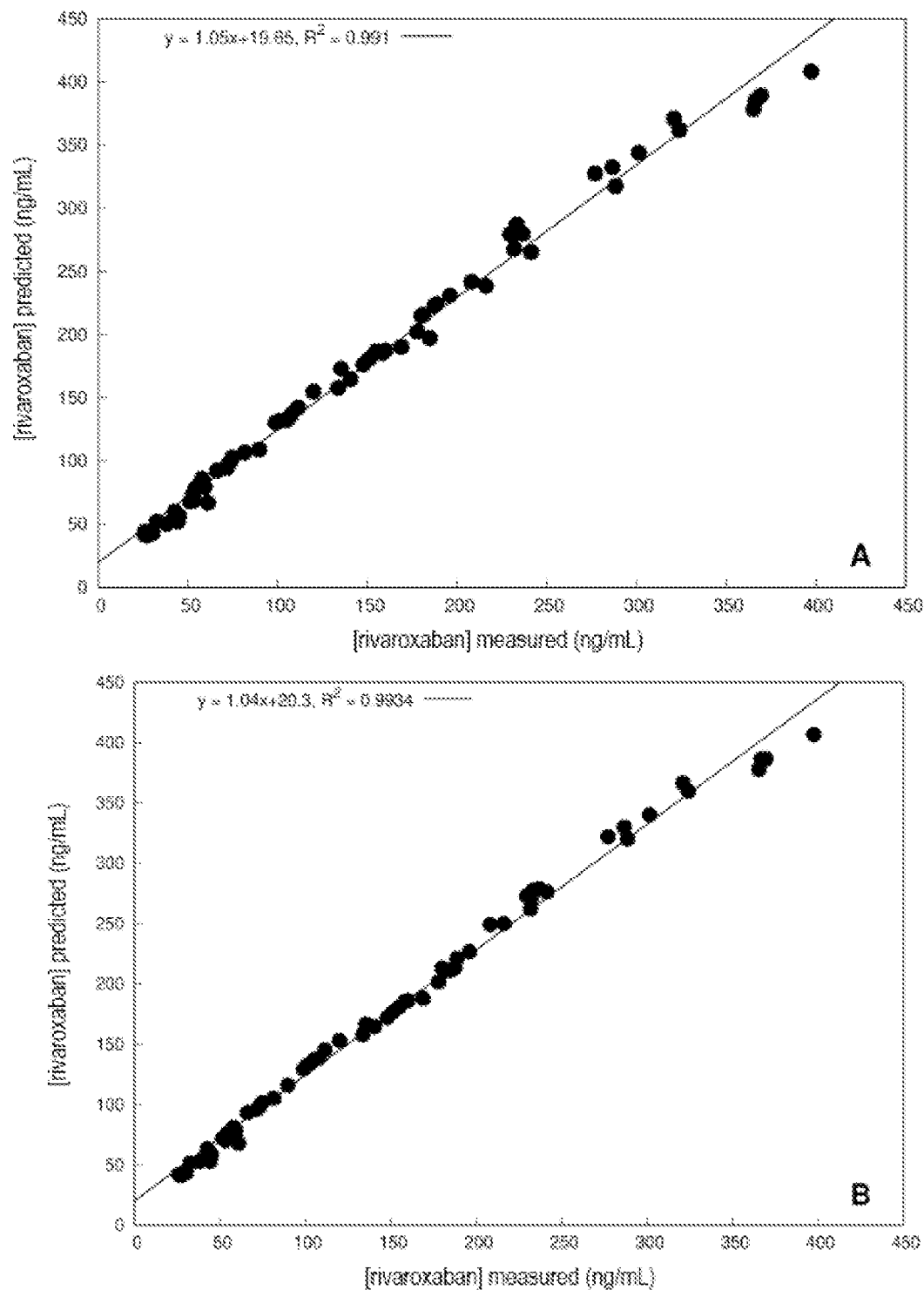
FIG. 13. Assay of rivaroxaban. A. Single run analysis: the results of a comparison of the assays of the concentrations of rivaroxaban measured by using the approach described herein ([rivaroxaban] predicted) with the concentrations of rivaroxaban measured using the standard approach ([rivaroxaban] measured) on the test data set provided a straight line with the equation y=1.05x+19.65 and a coefficient of determination R2=0.991. B. Triple run analysis: the results of a comparison of the assays of the concentrations of rivaroxaban measured by using the approach described herein ([rivaroxaban] predicted) with the concentrations of rivaroxaban measured using the standard approach ([rivaroxaban] measured) on the test data set provided a straight line with the equation y=1.04x+20.3 and a coefficient of determination R2=0.9934.

FIG. 13 provides the results of a comparison of the assays of the concentrations of rivaroxaban measured using the approach of the particular embodiment of the invention described herein with the concentrations of rivaroxaban measured using the standard approach on the test data set. These comparisons provided a straight line with the equation $y=1.05x+19.65$ and a coefficient of determination $R2=0.991$ when a single run analysis was carried out; they provided a straight line with the equation $y=1.04x+20.3$ and a coefficient of determination $R2=0.9934$ when a triple run analysis was carried out.

2.3.8 Assay of Apixaban

This section provides the results of assays of the concentrations of apixaban on samples from patients obtained using the particular embodiment of the invention described herein compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSI EP9-A2).

Test Data
- Single run analysis: 45 sets of kinetic measurements on 45 actual samples from patients taking apixaban;
- Triple run analysis: 135 sets of kinetic measurements on 45 actual samples from patients taking apixaban;
- The instrument was the STA-R® AUT06399;
- Optimized DOAC methodology.

Results

Figure 14:
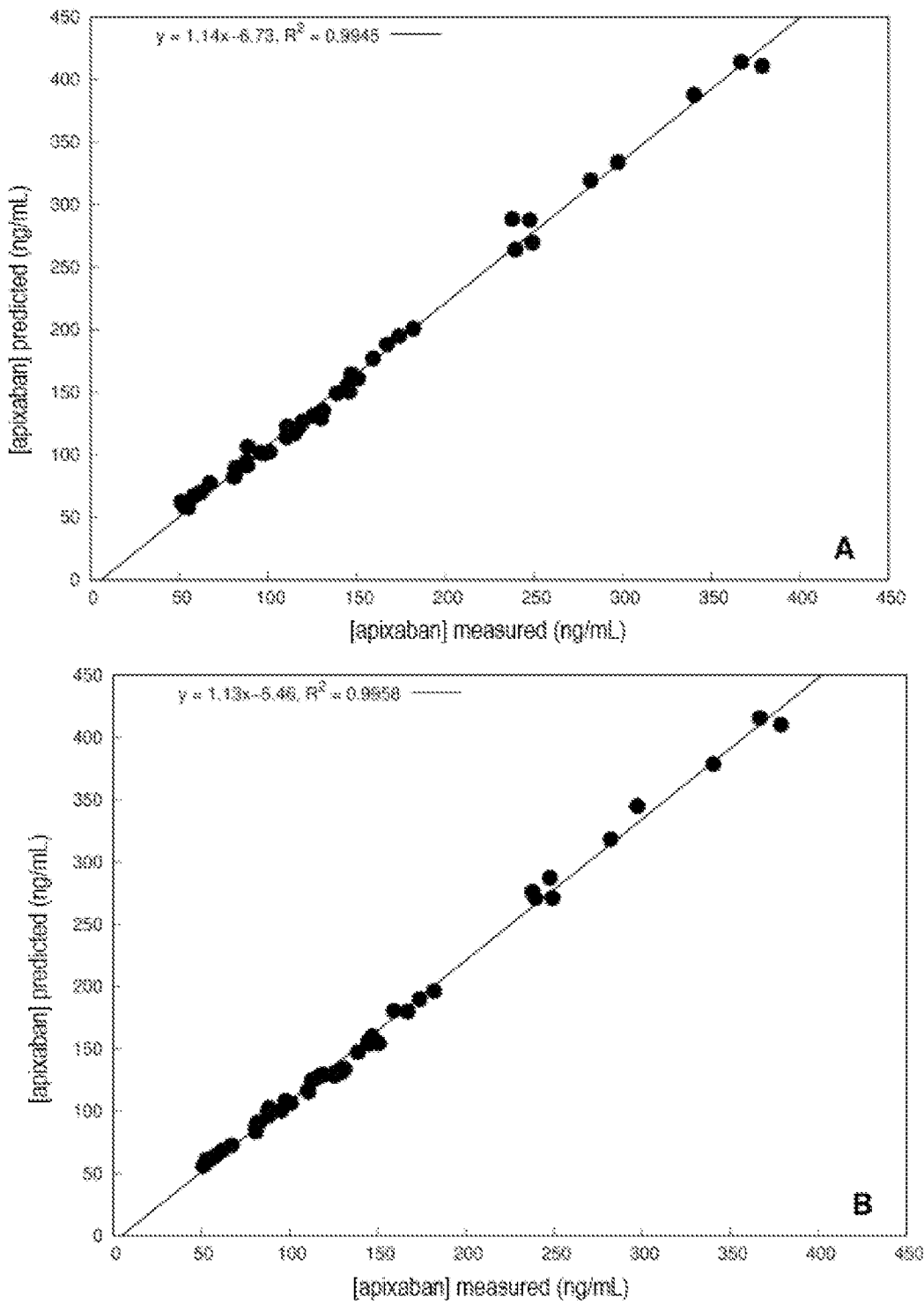
FIG. 14. Assay of apixaban. A. Single run analysis: the results of a comparison of the assays of the concentrations of apixaban measured by using the approach described herein ([apixaban] predicted) with the concentrations of apixaban measured using the standard approach ([apixaban]

FIG. 14 provides the results of a comparison of the assays of the concentrations of apixaban measured using the approach of the particular embodiment of the invention described herein with the concentrations of apixaban measured using the standard approach on the test data set. These comparisons provided a straight line with the equation $y=1.14x-6.73$ and a coefficient of determination $R2=0.9945$ when a single run analysis was carried out; they provided a straight line with the equation $y=1.13x-5.46$ and a coefficient of determination $R2=0.9958$ when a triple run analysis was carried out.

2.3.9 Assay of Edoxaban

This section provides the results of assays of the concentrations of edoxaban on samples from patients obtained using the particular embodiment of the invention described herein compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSI EP9-A2).

Test Data
- Single run analysis: 56 sets of kinetic measurements on 56 actual samples from patients taking edoxaban;
- Triple run analysis: 168 sets of kinetic measurements on 56 actual samples from patients taking edoxaban;
- The instrument was the STA-R® AUT06399;
- Optimized DOAC methodology.

Results

FIG. 15 provides the results of a comparison of the assays of the concentrations of edoxaban measured using the approach of the particular embodiment of the invention described herein with the concentrations of edoxaban measured using the standard approach on the test data set. These comparisons provided a straight line with the equation $y=0.905x+12.35$ and a coefficient of determination $R2=0.9853$ when a single run analysis was carried out; they provided a straight line with the equation $y=0.93x+8.18$ and a coefficient of determination $R2=0.9881$ when a triple run analysis was carried out.

3. Second Post-Processing Study of the Detection, Identification and Quantification of Synthetic Inhibitors of Factor Xa FIG. 6 details the cascade (followed in the context of this second study) of automated learning models which analyses and interprets the kinetics obtained by the experimental measurement with the aim of rendering the expected biological result.

The cascade was composed of twelve automated learning models; these twelve models took as the input the kinetic measurements obtained by the experimental measurement and provided a result at the output:
- The first model was a classification model: by virtue of the appearance of the kinetics input into it, it determined whether, yes or no, the analysed sample contained a synthetic inhibitor of factor Xa;
- The second model was also a classification model: knowing that the analysed sample contained a synthetic inhibitor of factor Xa and by virtue of the appearance of the kinetics input into it, it recognised the category of the synthetic inhibitor anti-Xa: heparin or DOAC;
- If the inhibitor was a heparin, and by virtue of the appearance of the kinetics input into it, a classification model identified whether it was a UFH or a LMWH;
- If the inhibitor was a UFH, and by virtue of the appearance of the kinetics input into it, a regression model calculated the concentration of UFH;
- If the inhibitor is a LMWH, and by virtue of the appearance of the kinetics input into it, a regression model calculates the concentration of LMWH;
- If the inhibitor was a DOAC, an experimental follow-up measurement was carried out using the optimized DOAC methodology and a new kinetic measurement was made then presented to the input of a classification model which identified whether the inhibitor was rivaroxaban, apixaban or edoxaban:
  - If the inhibitor was rivaroxaban, and by virtue of the appearance of the kinetics (measured by the optimized DOAC methodology) input into it, a regression model calculated the concentration of rivaroxaban. If this concentration was less than 200 ng/mL, a second regression model recalculated the concentration of rivaroxaban, this time inputting the kinetics measured by the universal methodology: this latter can render a more accurate result for low concentrations of rivaroxaban. If not, the result was rendered directly. (This embodiment corresponded to the methodology described as the "improved methodology based on the universal methodology" in the present description).

If the inhibitor was apixaban, and by virtue of the appearance of the kinetics (measured by the optimized DOAC methodology) input into it, a regression model calculated the concentration of apixaban. If this concentration was less than 200 ng/mL, a second regression model recalculated the concentration of apixaban, this time inputting the kinetics measured by the universal methodology: this latter can render a more accurate result for low concentrations of apixaban. If not, the result was rendered directly. (This embodiment corresponded to the methodology described as the "improved methodology based on the universal methodology" in the present description).

If the inhibitor was edoxaban, and by virtue of the appearance of the kinetics (measured by the optimized DOAC methodology) input into it, a regression model calculated the concentration of edoxaban.

If this concentration was less than 200 ng/mL, a second regression model recalculated the concentration of edoxaban, this time inputting the kinetics measured by the universal methodology: this latter can render a more accurate result for low concentrations of edoxaban. If not, the result was rendered directly. (This embodiment corresponded to the methodology described as the "improved methodology based on the universal methodology" in the present description).

The following sections respectively list, for each of these automated learning models, the data learning and validation sets which have been used to train them, as well as the associated algorithms.

It should be noted that for each data set, the concentrations of synthetic inhibitors of factor Xa (UFH, LMWH, rivaroxaban, apixaban and edoxaban) were measured on the automated STA-R® instrument using the STA®—Liquid Anti-Xa commercial kit, as well as the associated commercial calibrants and methodologies.

3.1 Detection of the Presence or the Absence of an Anti-Xa Anticoagulant 3.1.1 Data Sets Samples without anticoagulant were produced for different tests. These concerned a plasma matrix diluted in the same proportions as the samples which were spiked on the day of the test:

3 sets of kinetic measurements on 24.10.2017 on the STA-R® AUT00603 (soft version 3.04.07)+3 sets of kinetic measurements on 24.10.2017 on the STA-R® AUT06366 (soft version 3.04.07).
  a normal plasma pool sample, batch 03.2017 supplemented with 0.00 IU/mL of UFH sodium (Heparin Choay®), prepared extemporaneously and tested simultaneously on the two instruments.
  STA®—Liquid Anti-Xa batch 251187.
3 sets of kinetic measurements on 18.07.2017 on the STA-R® AUT06399 (soft version 3.04.07)
  a normal plasma pool sample, batch 03.2017 supplemented with a theoretical concentration of 0.00 IU/mL of UFH sodium (Heparin Choay®), prepared extemporaneously.
  STA®—Liquid Anti-Xa batch 251187.
3 sets of kinetic measurements on 23.10.2019 on the STA-R® AUT05016 (soft version 3.04.07)+3 sets of kinetic measurements on 23.10.2019 on the STA-R® AUT05450 (soft version 3.04.07)
  a normal plasma pool sample, batch 03.2017 supplemented with 0.00 IU/mL of UFH calcium (Calciparine®), prepared extemporaneously and tested simultaneously on the two instruments.
  STA®—Liquid Anti-Xa batch 251187.
3 sets of kinetic measurements on 17.07.2017 on the STA-R® AUT06399 (soft version 3.04.07)
  a normal plasma pool sample, batch 03.2017 supplemented with a theoretical concentration of 0.00 IU/mL of UFH calcium (Calciparine®), prepared extemporaneously.
  STA®—Liquid Anti-Xa batch 251187.
3 sets of kinetic measurements on 19.10.2017 on the STA-R® AUT06366 (soft version 3.04.07)+3 sets of kinetic measurements on 19.10.2017 on the STA-R® AUT05016 (soft version 3.04.07)
  a kinetic measurements measured on, batch 03.2017 supplemented with 0.00 IU/mL of LMWH dalteparin sodium (Fragmine®), prepared extemporaneously and tested simultaneously on the two instruments.
  STA®—Liquid Anti-Xa batch 251187.
3 sets of kinetic measurements on 17.07.2017 on the STA-R® AUT06399 (soft version 3.04.07)
  a normal plasma pool sample, batch 03.2017 supplemented with a theoretical concentration of 0.00 IU/mL of LMWH dalteparin sodium (Fragmine®), prepared extemporaneously.
  STA®—Liquid Anti-Xa batch 251187.
3 sets of kinetic measurements on 26.10.2017 on the STA-R® AUT06366 (soft version 3.04.07)+3 sets of kinetic measurements on 26.10.2017 on the STA-R® AUT00603 (soft version 3.04.07)
  a normal plasma pool sample, batch 03.2017 supplemented with 0.00 IU/mL of LMWH enoxaparin sodium (Lovenox®), prepared extemporaneously and tested simultaneously on the two instruments.
  STA®—Liquid Anti-Xa batch 251187.
3 sets of kinetic measurements on 19.07.2017 on the STA-R® AUT06399 (soft version 3.04.07)
  a normal plasma pool sample, batch 03.2017 supplemented with a theoretical concentration of 0.00 IU/mL of LMWH enoxaparin sodium (Lovenox®), prepared extemporaneously.
  STA®—Liquid Anti-Xa batch 251187.
3 sets of kinetic measurements on 25.10.2017 on the STA-R® AUT06366 (soft version 3.04.07)+3 sets of kinetic measurements on 25.10.2017 on the STA-R® AUT00603 (soft version 3.04.07)
  a normal plasma pool sample, batch 03.2017 supplemented with 0.00 IU/mL of LMWH tinzaparin sodium (InnoHep®), prepared extemporaneously and tested simultaneously on the two instruments.
  STA®—Liquid Anti-Xa batch 251187.
3 sets of kinetic measurements on 18.07.2017 on the STA-R® AUT06399 (soft version 3.04.07)
  a normal plasma pool sample, batch 03.2017 supplemented with a theoretical concentration of 0.00 IU/mL of LMWH tinzaparin sodium (InnoHep®), prepared extemporaneously.
  STA®—Liquid Anti-Xa batch 251187.
3 sets of kinetic measurements on 18.07.2017 on the STA-R® AUT06399 (soft version 3.04.07)

a normal plasma pool sample, batch 03.2017 supplemented with a theoretical concentration of 0.00 IU/mL of Fondaparinux (Arixtra®), prepared extemporaneously.

STA®—Liquid Anti-Xa batch 251187.

3 sets of kinetic measurements on 10.10.2017 on the STA-R® AUT00603 (soft version 3.04.07)+3 sets of kinetic measurements on 17.10.2017 on the STA-R® AUT05450 (soft version 3.04.07)+3 sets of kinetic measurements on 17.10.2017 on the STA-R® AUT06366 (soft version 3.04.07)+3 sets of kinetic measurements on 10.10.2017 on the STA-R® AUT06399 (soft version 3.04.07)

a normal plasma pool sample, batch 03.2017 supplemented with 0 ng/mL of Xarelto® (rivaroxaban), prepared and stored at −80° C.

STA®—Liquid Anti-Xa batch 251738.

3 sets of kinetic measurements on 05.02.2018 on the STA-R AUT06399 (soft version 3.04.07)

a normal plasma pool sample, batch 03.2017 supplemented with 0 ng/mL of Xarelto® (rivaroxaban), prepared and stored at −80° C.

STA®—Liquid Anti-Xa batch 251187.

3 sets of kinetic measurements on 17.10.2017 on the STA-R® AUT00603 (soft version 3.04.07)+3 sets of kinetic measurements on 17.10.2017 on the STA-R® AUT05450 (soft version 3.04.07)+3 sets of kinetic measurements on 21.09.2017 on the STA-R® AUT06366 (soft version 3.04.07)+3 sets of kinetic measurements on 20.09.2017 on the STA-R® AUT06399 (soft version 3.04.07)

a normal plasma pool sample, batch 03.2017 supplemented with 0 ng/mL of Lixiana® (edoxaban), prepared and stored at −80° C.

STA®—Liquid Anti-Xa batch 251738.

3 sets of kinetic measurements on 05.02.2018 on the STA-R AUT06399 (soft version 3.04.07)

a normal plasma pool sample, batch 03.2017 supplemented with 0 ng/mL of Lixiana® (edoxaban), prepared and stored at −80° C.

STA®—Liquid Anti-Xa batch 251187.

3 sets of kinetic measurements on 16.10.2017 on the STA-R® AUT00603 (soft version 3.04.07)+3 sets of kinetic measurements on 05.10.2017 on the STA-R® AUT06360 (soft version 3.04.07)+3 sets of kinetic measurements on 16.10.2017 on the STA-R® AUT06366 (soft version 3.04.07)+3 sets of kinetic measurements on 05.10.2017 on the STA-R® AUT06399 (soft version 3.04.07)

a normal plasma pool sample, batch 03.2017 supplemented with 0 ng/mL of Eliquis® (apixaban), prepared and stored at −80° C.

STA®—Liquid Anti-Xa batch 251738.

3 sets of kinetic measurements on 05.02.2018 on the STA-R AUT06399 (soft version 3.04.07)

a normal plasma pool sample, batch 03.2017 supplemented with 0 ng/mL of Eliquis® (apixaban), prepared and stored at −80° C.

STA®—Liquid Anti-Xa batch 251187.

Concerning the UFH sodium (Heparin Choay®), the generated data were:

60 sets of kinetic measurements on 24.10.2017 on the STA-R® AUT00603 (soft version 3.04.07)

normal plasma pool, batch 03.2017 supplemented with 0.12, 0.23, 0.32, 0.46, 0.54, 0.66, 0.66, 0.78, 0.86, 1.00, 1.18, 1.20, 1.36, 1.47, 1.56, 1.64, 1.74, 1.80, 1.88 and 2.03 IU/mL;

each sample level was tested with n=3;

the samples were prepared extemporaneously and tested simultaneously on the two instruments.

60 sets of kinetic measurements on 24.10.2017 on the STA-R® AUT06366 (soft version 3.04.07)

normal plasma pool, batch 03.2017 supplemented with 0.11, 0.21, 0.32, 0.43, 0.55, 0.63, 0.64, 0.76, 0.87, 0.97, 1.14, 1.17, 1.30, 1.43, 1.52, 1.61, 1.70, 1.84, 1.84 and 1.99 IU/mL;

each sample level was tested with n=3;

the samples were prepared extemporaneously and tested simultaneously on the two instruments.

Concerning UFH calcium (Calciparine®), the generated data were:

60 sets of kinetic measurements on 23.10.2019 on the STA-R® AUT05016 (soft version 3.04.07)

normal plasma pool, batch 03.2017 supplemented with 0.10, 0.21, 0.32, 0.44, 0.56, 0.66, 0.77, 0.84, 0.86, 0.98, 1.15, 1.28, 1.34, 1.43, 1.56, 1.60, 1.75, 1.85, 1.92 and 1.96 IU/mL;

each sample level was tested with n=3;

the samples were prepared extemporaneously and tested simultaneously on the two instruments.

60 sets of kinetic measurements on 23.10.2019 on the STA-R® AUT05450 (soft version 3.04.07)

normal plasma pool, batch 03.2017 supplemented with 0.12, 0.23, 0.33, 0.43, 0.55, 0.66, 0.75, 0.90, 0.88, 1.00, 1.13, 1.24, 1.32, 1.44, 1.53, 1.63, 1.70, 1.88, 1.96 and 2.01 IU/mL;

each sample level was tested with n=3;

the samples were prepared extemporaneously and tested simultaneously on the two instruments.

Concerning the LMWH dalteparin sodium (Fragmine®), the generated data were:

60 sets of kinetic measurements on 19.10.2017 on the STA-R® AUT06366 (soft version 3.04.07)

normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

60 sets of kinetic measurements on 19.10.2017 on the STA-R® AUT05016 (soft version 3.04.07)

normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

Concerning the LMWH enoxaparin sodium (Lovenox®), the generated data were:

60 sets of kinetic measurements on 26.10.2017 on the STA-R® AUT06366 (soft version 3.04.07)

normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;

each sample level was tested with n=3;

the samples were prepared extemporaneously and tested simultaneously on the two instruments.

60 sets of kinetic measurements on 26.10.2017 on the STA-R® AUT00603 (soft version 3.04.07)

normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;
each sample level was tested with n=3;
the samples were prepared extemporaneously and tested simultaneously on the two instruments.

Concerning the LMWH tinzaparin sodium (InnoHep®), the generated data were:
60 sets of kinetic measurements on 25.10.2017 on the STA-R® AUT06366 (soft version 3.04.07)
normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
each sample level was tested with n=3;
the samples were prepared extemporaneously and tested simultaneously on the two instruments.
60 sets of kinetic measurements on 25.10.2017 on the STA-R® AUT00603 (soft version 3.04.07)
normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
each sample level was tested with n=3;
the samples were prepared extemporaneously and tested simultaneously on the two instruments.

Batch number for STA®—Liquid Anti-Xa: 251187, batch used for the generating the kinetics using universal methodology and for the commercial assay of the heparin supplement.

Concerning Xarelto® (rivaroxaban), the generated data were:
60 sets of kinetic measurements on 10.10.2017 on the STA-R® AUT00603 (soft version 3.04.07)
normal plasma pool, batch 03.2017 supplemented with 10, 20, 35, 41, 49, 56, 66, 74, 84, 93, 105, 110, 116, 134, 143, 155, 160, 175, 181 and 198 ng/mL;
each sample level was tested with n=3;
the samples had been prepared and stored at −80° C.
60 sets of kinetic measurements on 17.10.2017 on the STA-R® AUT05450 (soft version 3.04.07)
normal plasma pool, batch 03.2017 supplemented with 10, 20, 35, 41, 48, 59, 65, 77, 85, 95, 103, 113, 121, 134, 145, 160, 161, 172, 169, 202 ng/mL;
each sample level was tested with n=3;
the samples had been prepared and stored at −80° C.
60 sets of kinetic measurements on 17.10.2017 on the STA-R® AUT06366 (soft version 3.04.07)
normal plasma pool, batch 03.2017 supplemented with 10, 20, 25, 34, 43, 50, 62, 74, 84, 93, 104, 109, 118, 133, 143, 159, 158, 176, 173 and 203 ng/mL;
each sample level was tested with n=3;
the samples had been prepared and stored at −80° C.
60 sets of kinetic measurements on 10.10.2017 on the STA-R® AUT06399 (soft version 3.04.07)
normal plasma pool, batch 03.2017 supplemented with 10, 20, 30, 38, 46, 57, 64, 72, 82, 90, 101, 110, 115, 130, 140, 148, 152, 166, 164 and 192 ng/mL;
each sample level was tested with n=3;
the samples had been prepared and stored at −80° C.

Concerning Eliquis® (apixaban), the generated data were:
60 sets of kinetic measurements on 16.10.2017 on the STA-R® AUT00603 (soft version 3.04.07)
normal plasma pool, batch 03.2017 supplemented with 10, 20, 27, 39, 41, 52, 61, 67, 76, 93, 96, 105, 123, 127, 140, 145, 155, 167, 184 and 182 ng/mL;
each sample level was tested with n=3;
the samples had been prepared and stored at −80° C.
60 sets of kinetic measurements on 05.10.2017 on the STA-R® AUT06360 (soft version 3.04.07)
normal plasma pool, batch 03.2017 supplemented with 10, 20, 26, 36, 43, 53, 60, 70, 75, 93, 103, 109, 121, 135, 136, 153, 160, 175, 185 and 192 ng/mL;
each sample level was tested with n=3;
the samples had been prepared and stored at −80° C.
60 sets of kinetic measurements on 16.10.2017 on the STA-R® AUT06366 (soft version 3.04.07)
normal plasma pool, batch 03.2017 supplemented with 10, 20, 26, 34, 44, 50, 61, 70, 74, 94, 103, 109, 122, 135, 138, 147, 162, 173, 182 and 186 ng/mL;
each sample level was tested with n=3.
the samples had been prepared and stored at −80° C.
60 sets of kinetic measurements on 05.10.2017 on the STA-R® AUT06399 (soft version 3.04.07)
normal plasma pool, batch 03.2017 supplemented with 10, 20, 33, 41, 46, 57, 65, 76, 79, 96, 105, 116, 125, 135, 138, 153, 161, 169, 180 and 186 ng/mL;
each sample level was tested with n=3.
the samples had been prepared and stored at −80° C.

Concerning Lixiana® (edoxaban), the generated data were:
60 sets of kinetic measurements on 17.10.2017 on the STA-R® AUT00603 (soft version 3.04.07)
normal plasma pool, batch 03.2017 supplemented with 10, 20, 28, 40, 49, 64, 74, 95, 103, 109, 122, 132, 144, 131, 132, 157, 171, 195, 191 and 201 ng/mL;
each sample level was tested with n=3;
the samples had been prepared and stored at −80° C.
60 sets of kinetic measurements on 17.10.2017 on the STA-R® AUT05450 (soft version 3.04.07)
normal plasma pool, batch 03.2017 supplemented with 10, 21, 28, 41, 49, 62, 74, 92, 102, 112, 120, 133, 142, 129, 133, 155, 168, 188, 200 and 206 ng/mL;
each sample level was tested with n=3;
the samples had been prepared and stored at −80° C.
60 sets of kinetic measurements on 21.09.2017 on the STA-R® AUT06366 (soft version 3.04.07)
normal plasma pool, batch 03.2017 supplemented with 10, 21, 27, 40, 49, 64, 73, 90, 99, 108, 122, 132, 144, 130, 136, 153, 169, 192, 194 and 216 ng/mL;
each sample level was tested with n=3;
the samples had been prepared and stored at −80° C.
60 sets of kinetic measurements on 20.09.2017 on the STA-R® AUT06399 (soft version 3.04.07)
normal plasma pool, batch 03.2017 supplemented with 10, 21, 29, 39, 48, 60, 73, 81, 92, 107, 115, 129, 136, 129, 127, 149, 163, 181, 195 and 199 ng/mL;
each sample level was tested with n=3;
the samples had been prepared and stored at −80° C.

Batch number for STA®—Liquid Anti-Xa: 251738, batch used for the generating the kinetics using universal methodology and for the commercial assay of the DOAC loadings.

3.1.2 Automated Learning Model

Organisation of Data

The data relating to the samples without an anticoagulant molecule were mixed and split into two data sets denoted ABSENCE-0 and ABSENCE-1 herein.

The automated learning model was trained by a cross-validation divided into two sub-sets, as follows:
Sub-set 1:
Learning data:
ABSENCE-0,
UFH sodium data (Heparin Choay®) generated on the STA-R® AUT06366, UFH calcium data (Calciparine®) generated on the STA-R® AUT05450,
LMWH dalteparin sodium data (Fragmine®) generated on the STA-R® AUT06366,
LMWH enoxaparin sodium data (Lovenox®) generated on the STA-R® AUT06366,
LMWH tinzaparin sodium data (InnoHep®) generated on the STA-R® AUT06366,
rivaroxaban data (Xarelto®) generated on the STA-R® AUT06366,
rivaroxaban data (Xarelto®) generated on the STA-R® AUT05450,
edoxaban data (Lixiana®) generated on the STA-R® AUT06366,
edoxaban data (Lixiana®) generated on the STA-R® AUT05450,
apixaban data (Eliquis®) generated on the STA-R® AUT06366,
apixaban data (Eliquis®) generated on the STA-R® AUT06360.
Validation data:
ABSENCE-1,
UFH sodium data (Heparin Choay®) generated on the STA-R® AUT00603,
UFH calcium data (Calciparine®) generated on the STA-R® AUT05016,
LMWH dalteparin sodium data (Fragmine®) generated on the STA-R® AUT05016,
LMWH enoxaparin sodium data (Lovenox®) generated on the STA-R® AUT00603,
LMWH tinzaparin sodium data (InnoHep®) generated on the STA-R® AUT00603,
rivaroxaban data (Xarelto®) generated on the STA-R® AUT00603,
rivaroxaban data (Xarelto®) generated on the STA-R® AUT06399,
edoxaban data (Lixiana®) generated on the STA-R® AUT00603,
edoxaban data (Lixiana®) generated on the STA-R® AUT06399,
apixaban data (Eliquis®) generated on the STA-R® AUT00603,
apixaban data (Eliquis®) generated on the STA-R® AUT06399.
Sub-set 2:
Learning data:
ABSENCE-1,
UFH sodium data (Heparin Choay®) generated on the STA-R® AUT00603,
UFH calcium data (Calciparine®) generated on the STA-R® AUT05016,
LMWH dalteparin sodium data (Fragmine®) generated on the STA-R® AUT05016,
LMWH enoxaparin sodium data (Lovenox®) generated on the STA-R® AUT00603,
LMWH tinzaparin sodium data (InnoHep®) generated on the STA-R® AUT00603,
rivaroxaban data (Xarelto®) generated on the STA-R® AUT00603,
rivaroxaban data (Xarelto®) generated on the STA-R® AUT06399,
edoxaban data (Lixiana®) generated on the STA-R® AUT00603,
edoxaban data (Lixiana®) generated on the STA-R® AUT06399,
apixaban data (Eliquis®) generated on the STA-R® AUT00603,
apixaban data (Eliquis®) generated on the STA-R® AUT06399.
Validation data:
ABSENCE-0,
UFH sodium data (Heparin Choay®) generated on the STA-R® AUT06366,
UFH calcium data (Calciparine®) generated on the STA-R® AUT05450,
LMWH dalteparin sodium data (Fragmine®) generated on the STA-R® AUT06366,
LMWH enoxaparin sodium data (Lovenox®) generated on the STA-R® AUT06366,
LMWH tinzaparin sodium data (InnoHep®) generated on the STA-R® AUT06366,
rivaroxaban data (Xarelto®) generated on the STA-R® AUT06366,
rivaroxaban data (Xarelto®) generated on the STA-R® AUT05450,
edoxaban data (Lixiana®) generated on the STA-R® AUT06366,
edoxaban data (Lixiana®) generated on the STA-R® AUT05450,
apixaban data (Eliquis®) generated on the STA-R® AUT06366,
apixaban data (Eliquis®) generated on the STA-R® AUT06360.

Final learning was carried out on the entirety of the data.

Description of the Automated Learning Model

A multilayer perceptron (neural network) was trained in accordance with the strategy described in the preceding section. It was defined by the following parameters and hyperparameters:

Preprocessing of data: normalization between 0 and 1
Automated learning model: Multilayer perceptrons
Hyperparameters:
  Input layer
    77 neurons
    Activation functions: Identity
  Hidden layer
    40 neurons
    Activation functions: ReLU
  Output layer
    2 neurons
    Activation function: Softmax
Initialization of weight and bias matrix: Xavier Glorot
Digital method for optimization of weights and biases: L-BFGS
Regularization method: L2, alpha=0.00001
Learning strategy: seed search
Cost function: cross-entropy 3.2 Identification of the Category of the Anti-Xa Anticoagulant 3.2.1 Data Sets Concerning UFH sodium (Heparin Choay®), the generated data were:
60 sets of kinetic measurements on 24.10.2017 on the STA-R® AUT00603 (soft version 3.04.07)
  normal plasma pool, batch 03.2017 supplemented with 0.12, 0.23, 0.32, 0.46, 0.54, 0.66, 0.66, 0.78, 0.86, 1.00, 1.18, 1.20, 1.36, 1.47, 1.56, 1.64, 1.74, 1.80, 1.88 and 2.03 IU/mL;
  each sample level was tested with n=3;
  the samples were prepared extemporaneously and tested simultaneously on the two instruments.
60 sets of kinetic measurements on 24.10.2017 on the STA-R® AUT06366 (soft version 3.04.07)

normal plasma pool, batch 03.2017 supplemented with 0.11, 0.21, 0.32, 0.43, 0.55, 0.63, 0.64, 0.76, 0.87, 0.97, 1.14, 1.17, 1.30, 1.43, 1.52, 1.61, 1.70, 1.84, 1.84 and 1.99 IU/mL;

each sample level was tested with n=3;

the samples were prepared extemporaneously and tested simultaneously on the two instruments.

Concerning UFH calcium (Calciparine®), the generated data were:

60 sets of kinetic measurements on 23.10.2019 on the STA-R® AUT05016 (soft version 3.04.07)

normal plasma pool, batch 03.2017 supplemented with 0.10, 0.21, 0.32, 0.44, 0.56, 0.66, 0.77, 0.84, 0.86, 0.98, 1.15, 1.28, 1.34, 1.43, 1.56, 1.60, 1.75, 1.85, 1.92 and 1.96 IU/mL;

each sample level was tested with n=3;

the samples were prepared extemporaneously and tested simultaneously on the two instruments.

60 sets of kinetic measurements on 23.10.2019 on the STA-R® AUT05450 (soft version 3.04.07)

normal plasma pool, batch 03.2017 supplemented with 0.12, 0.23, 0.33, 0.43, 0.55, 0.66, 0.75, 0.90, 0.88, 1.00, 1.13, 1.24, 1.32, 1.44, 1.53, 1.63, 1.70, 1.88, 1.96 and 2.01 IU/mL;

each sample level was tested with n=3;

the samples were prepared extemporaneously and tested simultaneously on the two instruments.

Concerning the LMWH dalteparin sodium (Fragmine®), the generated data were:

60 sets of kinetic measurements on 19.10.2017 on the STA-R® AUT06366 (soft version 3.04.07)

normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

60 sets of kinetic measurements on 19.10.2017 on the STA-R® AUT05016 (soft version 3.04.07)

normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

Concerning the LMWH enoxaparin sodium (Lovenox®), the generated data were:

60 sets of kinetic measurements on 26.10.2017 on the STA-R® AUT06366 (soft version 3.04.07)

normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;

each sample level was tested with n=3;

the samples were prepared extemporaneously and tested simultaneously on the two instruments.

60 sets of kinetic measurements on 26.10.2017 on the STA-R® AUT00603 (soft version 3.04.07)

normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;

each sample level was tested with n=3;

the samples were prepared extemporaneously and tested simultaneously on the two instruments.

Concerning the LMWH tinzaparin sodium (InnoHep®), the generated data were:

60 sets of kinetic measurements on 25.10.2017 on the STA-R® AUT06366 (soft version 3.04.07)

normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;

each sample level was tested with n=3;

the samples were prepared extemporaneously and tested simultaneously on the two instruments.

60 sets of kinetic measurements on 25.10.2017 on the STA-R® AUT00603 (soft version 3.04.07)

normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;

each sample level was tested with n=3;

the samples were prepared extemporaneously and tested simultaneously on the two instruments.

Batch number for STA®—Liquid Anti-Xa: 251187, batch used for the generating the kinetics using universal methodology and for the commercial assay of the heparin supplement.

Concerning Xarelto® (rivaroxaban), the generated data were:

60 sets of kinetic measurements on 10.10.2017 on the STA-R® AUT00603 (soft version 3.04.07)

normal plasma pool, batch 03.2017 supplemented with 10, 20, 35, 41, 49, 56, 66, 74, 84, 93, 105, 110, 116, 134, 143, 155, 160, 175, 181 and 198 ng/mL;

each sample level was tested with n=3;

the samples had been prepared and stored at −80° C.

60 sets of kinetic measurements on 17.10.2017 on the STA-R® AUT05450 (soft version 3.04.07)

normal plasma pool, batch 03.2017 supplemented with 10, 20, 35, 41, 48, 59, 65, 77, 85, 95, 103, 113, 121, 134, 145, 160, 161, 172, 169, 202 ng/mL;

each sample level was tested with n=3;

the samples had been prepared and stored at −80° C.

60 sets of kinetic measurements on 17.10.2017 on the STA-R® AUT06366 (soft version 3.04.07)

normal plasma pool, batch 03.2017 supplemented with 10, 20, 25, 34, 43, 50, 62, 74, 84, 93, 104, 109, 118, 133, 143, 159, 158, 176, 173 and 203 ng/mL;

each sample level was tested with n=3;

the samples had been prepared and stored at −80° C.

60 sets of kinetic measurements on 10.10.2017 on the STA-R® AUT06399 (soft version 3.04.07)

normal plasma pool, batch 03.2017 supplemented with 10, 20, 30, 38, 46, 57, 64, 72, 82, 90, 101, 110, 115, 130, 140, 148, 152, 166, 164 and 192 ng/mL;

each sample level was tested with n=3;

the samples had been prepared and stored at −80° C.

Concerning Eliquis® (apixaban), the generated data were:

60 sets of kinetic measurements on 16.10.2017 on the STA-R® AUT00603 (soft version 3.04.07)

normal plasma pool, batch 03.2017 supplemented with 10, 20, 27, 39, 41, 52, 61, 67, 76, 93, 96, 105, 123, 127, 140, 145, 155, 167, 184 and 182 ng/mL;

each sample level was tested with n=3;

the samples had been prepared and stored at −80° C.

60 sets of kinetic measurements on 05.10.2017 on the STA-R® AUT06360 (soft version 3.04.07)

normal plasma pool, batch 03.2017 supplemented with 10, 20, 26, 36, 43, 53, 60, 70, 75, 93, 103, 109, 121, 135, 136, 153, 160, 175, 185 and 192 ng/mL;

each sample level was tested with n=3;
the samples had been prepared and stored at −80° C.
60 sets of kinetic measurements on 16.10.2017 on the STA-R® AUT06366 (soft version 3.04.07)
normal plasma pool, batch 03.2017 supplemented with 10, 20, 26, 34, 44, 50, 61, 70, 74, 94, 103, 109, 122, 135, 138, 147, 162, 173, 182 and 186 ng/mL;
each sample level was tested with n=3.
the samples had been prepared and stored at −80° C.
60 sets of kinetic measurements on 05.10.2017 on the STA-R® AUT06399 (soft version 3.04.07)
normal plasma pool, batch 03.2017 supplemented with 10, 20, 33, 41, 46, 57, 65, 76, 79, 96, 105, 116, 125, 135, 138, 153, 161, 169, 180 and 186 ng/mL;
each sample level was tested with n=3.
the samples had been prepared and stored at −80° C.

Concerning Lixiana® (edoxaban), the generated data were:
60 sets of kinetic measurements on 17.10.2017 on the STA-R® AUT00603 (soft version 3.04.07)
normal plasma pool, batch 03.2017 supplemented with 10, 20, 28, 40, 49, 64, 74, 95, 103, 109, 122, 132, 144, 131, 132, 157, 171, 195, 191 and 201 ng/mL;
each sample level was tested with n=3;
the samples had been prepared and stored at −80° C.
60 sets of kinetic measurements on 17.10.2017 on the STA-R® AUT05450 (soft version 3.04.07)
normal plasma pool, batch 03.2017 supplemented with 10, 21, 28, 41, 49, 62, 74, 92, 102, 112, 120, 133, 142, 129, 133, 155, 168, 188, 200 and 206 ng/mL;
each sample level was tested with n=3;
the samples had been prepared and stored at −80° C.
60 sets of kinetic measurements on 21.09.2017 on the STA-R® AUT06366 (soft version 3.04.07)
normal plasma pool, batch 03.2017 supplemented with 10, 21, 27, 40, 49, 64, 73, 90, 99, 108, 122, 132, 144, 130, 136, 153, 169, 192, 194 and 216 ng/mL;
each sample level was tested with n=3;
the samples had been prepared and stored at −80° C.
60 sets of kinetic measurements on 20.09.2017 on the STA-R® AUT06399 (soft version 3.04.07)
normal plasma pool, batch 03.2017 supplemented with 10, 21, 29, 39, 48, 60, 73, 81, 92, 107, 115, 129, 136, 129, 127, 149, 163, 181, 195 and 199 ng/mL;
each sample level was tested with n=3;
the samples had been prepared and stored at −80° C.

Batch number for STA®—Liquid Anti-Xa: 251738, batch used for the generating the kinetics using universal methodology and for the commercial assay of the DOAC loadings.

3.2.2 Automated Learning Model
Organisation of Data
The automated learning model was trained by a cross-validation divided into two sub-sets, as follows:
Sub-set 1:
  Learning data:
    UFH sodium data (Heparin Choay®) generated on the STA-R® AUT06366,
    UFH calcium data (Calciparine®) generated on the STA-R® AUT05450,
    LMWH dalteparin sodium data (Fragmine®) generated on the STA-R® AUT06366,
    LMWH enoxaparin sodium data (Lovenox®) generated on the STA-R® AUT06366,
    LMWH tinzaparin sodium data (InnoHep®) generated on the STA-R® AUT06366,
    rivaroxaban data (Xarelto®) generated on the STA-R® AUT06366,
    rivaroxaban data (Xarelto®) generated on the STA-R® AUT05450,
    edoxaban data (Lixiana®) generated on the STA-R® AUT06366,
    edoxaban data (Lixiana®) generated on the STA-R® AUT05450,
    apixaban data (Eliquis®) generated on the STA-R® AUT06366,
    apixaban data (Eliquis®) generated on the STA-R® AUT06360.
  Validation data:
    UFH sodium data (Heparin Choay®) generated on the STA-R® AUT00603,
    UFH calcium data (Calciparine®) generated on the STA-R® AUT05016,
    LMWH dalteparin sodium data (Fragmine®) generated on the STA-R® AUT05016,
    LMWH enoxaparin sodium data (Lovenox®) generated on the STA-R® AUT00603,
    LMWH tinzaparin sodium data (InnoHep®) generated on the STA-R® AUT00603,
    rivaroxaban data (Xarelto®) generated on the STA-R® AUT00603,
    rivaroxaban data (Xarelto®) generated on the STA-R® AUT06399,
    edoxaban data (Lixiana®) generated on the STA-R® AUT00603,
    edoxaban data (Lixiana®) generated on the STA-R® AUT06399,
    apixaban data (Eliquis®) generated on the STA-R® AUT00603,
    apixaban data (Eliquis®) generated on the STA-R® AUT06399.
Sub-set 2:
  Learning data:
    UFH sodium data (Heparin Choay®) generated on the STA-R® AUT00603,
    UFH calcium data (Calciparine®) generated on the STA-R® AUT05016,
    LMWH dalteparin sodium data (Fragmine®) generated on the STA-R® AUT05016,
    LMWH enoxaparin sodium data (Lovenox®) generated on the STA-R® AUT00603,
    LMWH tinzaparin sodium data (InnoHep®) generated on the STA-R® AUT00603,
    rivaroxaban data (Xarelto®) generated on the STA-R® AUT00603,
    rivaroxaban data (Xarelto®) generated on the STA-R® AUT06399,
    edoxaban data (Lixiana®) generated on the STA-R® AUT00603,
    edoxaban data (Lixiana®) generated on the STA-R® AUT06399,
    apixaban data (Eliquis®) generated on the STA-R® AUT00603,
    apixaban data (Eliquis®) generated on the STA-R® AUT06399.
  Validation data:
    UFH sodium data (Heparin Choay®) generated on the STA-R® AUT06366,
    UFH calcium data (Calciparine®) generated on the STA-R® AUT05450,
    LMWH dalteparin sodium data (Fragmine®) generated on the STA-R® AUT06366, LMWH enoxaparin sodium data (Lovenox®) generated on the STA-R® AUT06366,
LMWH tinzaparin sodium data (InnoHep®) generated on the STA-R® AUT06366,
rivaroxaban data (Xarelto®) generated on the STA-R® AUT06366,
rivaroxaban data (Xarelto®) generated on the STA-R® AUT05450,
edoxaban data (Lixiana®) generated on the STA-R® AUT06366,
edoxaban data (Lixiana®) generated on the STA-R® AUT05450,
apixaban data (Eliquis®) generated on the STA-R® AUT06366,
apixaban data (Eliquis®) generated on the STA-R® AUT06360.

Final learning was carried out on the entirety of the data.

Description of the Automated Learning Model

A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
  Input layer
    77 neurons
    Activation functions: Identity
  Hidden layer
    18 neurons
    Activation functions: ReLU
  Output layer
    2 neurons
    Activation function: Softmax
Initialization of weight and bias matrix: Xavier Glorot
Digital method for optimization of weights and biases: L-BFGS
Regularization method: L2, alpha=0.001
Learning strategy: seed search
Cost function: cross-entropy 3.3 Identification of Heparins 3.3.1 Data Sets Concerning UFH sodium (Heparin Choay®), the generated data were:
60 sets of kinetic measurements on 24.10.2017 on the STA-R® AUT00603 (soft version 3.04.07)
  normal plasma pool, batch 03.2017 supplemented with 0.12, 0.23, 0.32, 0.46, 0.54, 0.66, 0.66, 0.78, 0.86, 1.00, 1.18, 1.20, 1.36, 1.47, 1.56, 1.64, 1.74, 1.80, 1.88 and 2.03 IU/mL;
  each sample level was tested with n=3;
  the samples were prepared extemporaneously and tested simultaneously on the two instruments.
60 sets of kinetic measurements on 24.10.2017 on the STA-R® AUT06366 (soft version 3.04.07)
  normal plasma pool, batch 03.2017 supplemented with 0.11, 0.21, 0.32, 0.43, 0.55, 0.63, 0.64, 0.76, 0.87, 0.97, 1.14, 1.17, 1.30, 1.43, 1.52, 1.61, 1.70, 1.84, 1.84 and 1.99 IU/mL;
  each sample level was tested with n=3;
  the samples were prepared extemporaneously and tested simultaneously on the two instruments.
24 sets of kinetic measurements on 18.07.2017 on the STA-R® AUT06399 (soft version 3.04.07)
  normal plasma pool, batch 03.2017 supplemented with a theoretical concentration of 0.25, 0.50, 0.75, 1.00, 1.25, 1.50, 1.75 and 2.00 IU/mL;
  each sample level was tested with n=3;
  the samples were prepared extemporaneously.

Concerning the UFH calcium (Calciparine®), the generated data were:
60 sets of kinetic measurements on 23.10.2019 on the STA-R® AUT05016 (soft version 3.04.07)
  normal plasma pool, batch 03.2017 supplemented with 0.10, 0.21, 0.32, 0.44, 0.56, 0.66, 0.77, 0.84, 0.86, 0.98, 1.15, 1.28, 1.34, 1.43, 1.56, 1.60, 1.75, 1.85, 1.92 and 1.96 IU/mL;
  each sample level was tested with n=3;
  the samples were prepared extemporaneously and tested simultaneously on the two instruments.
60 sets of kinetic measurements on 23.10.2019 on the STA-R® AUT05450 (soft version 3.04.07)
  normal plasma pool, batch 03.2017 supplemented with 0.12, 0.23, 0.33, 0.43, 0.55, 0.66, 0.75, 0.90, 0.88, 1.00, 1.13, 1.24, 1.32, 1.44, 1.53, 1.63, 1.70, 1.88, 1.96 and 2.01 IU/mL;
  each sample level was tested with n=3;
  the samples were prepared extemporaneously and tested simultaneously on the two instruments.
24 sets of kinetic measurements on 17.07.2017 on the STA-R® AUT06399 (soft version 3.04.07)
  normal plasma pool, batch 03.2017 supplemented with a theoretical concentration of 0.25, 0.50, 0.75, 1.00, 1.25, 1.50, 1.75 and 2.00 IU/mL;
  each sample level was tested with n=3;
  the samples were prepared extemporaneously.

Concerning the LMWH dalteparin sodium (Fragmine®), the generated data were:
60 sets of kinetic measurements on 19.10.2017 on the STA-R® AUT06366 (soft version 3.04.07)
  normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;
  each sample level was tested with n=3;
  the samples were prepared extemporaneously and tested simultaneously on the two instruments.
60 sets of kinetic measurements on 19.10.2017 on the STA-R® AUT05016 (soft version 3.04.07)
  normal plasma pool, batch 03.2017 supplemented with 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;
  each sample level was tested with n=3;
  the samples were prepared extemporaneously and tested simultaneously on the two instruments.
24 sets of kinetic measurements on 17.07.2017 on the STA-R® AUT06399 (soft version 3.04.07)
  normal plasma pool, batch 03.2017 supplemented with a theoretical concentration of 0.25, 0.50, 0.75, 1.00, 1.25, 1.50, 1.75 and 2.00 IU/mL;
  each sample level was tested with n=3;
  the samples were prepared extemporaneously.

Concerning the LMWH enoxaparin sodium (Lovenox®), the generated data were:
60 sets of kinetic measurements on 26.10.2017 on the STA-R® AUT06366 (soft version 3.04.07)
  normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;
  each sample level was tested with n=3;
  the samples were prepared extemporaneously and tested simultaneously on the two instruments.

60 sets of kinetic measurements on 26.10.2017 on the STA-R® AUT00603 (soft version 3.04.07)
  normal plasma pool, batch 03.2017 supplemented with 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;
  each sample level was tested with n=3;
  the samples were prepared extemporaneously and tested simultaneously on the two instruments.
24 sets of kinetic measurements on 19.07.2017 on the STA-R® AUT06399 (soft version 3.04.07)
  normal plasma pool, batch 03.2017 supplemented with a theoretical concentration of 0.25, 0.50, 0.75, 1.00, 1.25, 1.50, 1.75 and 2.00 IU/mL;
  each sample level was tested with n=3;
  the samples were prepared extemporaneously.

Concerning the LMWH tinzaparin sodium (InnoHep®), the generated data were:
60 sets of kinetic measurements on 25.10.2017 on the STA-R® AUT06366 (soft version 3.04.07)
  normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
  each sample level was tested with n=3;
  the samples were prepared extemporaneously and tested simultaneously on the two instruments.
60 sets of kinetic measurements on 25.10.2017 on the STA-R® AUT00603 (soft version 3.04.07)
  normal plasma pool, batch 03.2017 supplemented with 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
  each sample level was tested with n=3;
  the samples were prepared extemporaneously and tested simultaneously on the two instruments.
24 sets of kinetic measurements on 18.07.2017 on the STA-R® AUT06399 (soft version 3.04.07)
  normal plasma pool, batch 03.2017 supplemented with a theoretical concentration of 0.25, 0.50, 0.75, 1.00, 1.25, 1.50, 1.75 and 2.00 IU/mL;
  each sample level was tested with n=3;
  the samples were prepared extemporaneously.

Batch number for STA®—Liquid Anti-Xa: 251187, batch used for the generating the kinetics using universal methodology and for the commercial assay of the heparin supplement (when applicable).

3.3.2 Automated Learning Model

Organisation of Data

The automated learning model was trained by a cross-validation organised as follows:
Learning data:
  UFH sodium data (Heparin Choay®) generated on the STA-R® AUT06366,
  UFH sodium data (Heparin Choay®) generated on the STA-R® AUT00603,
  UFH calcium data (Calciparine®) generated on the STA-R® AUT05450,
  UFH calcium data (Calciparine®) generated on the STA-R® AUT05016,
  LMWH dalteparin sodium data (Fragmine®) generated on the STA-R® AUT 06366,
  LMWH dalteparin sodium data (Fragmine®) generated on the STA-R® AUT 05016,
  LMWH enoxaparin sodium data (Lovenox®) generated on the STA-R® AUT 06366,
  LMWH enoxaparin sodium data (Lovenox®) generated on the STA-R® AUT 00603,
  LMWH tinzaparin sodium data (InnoHep®) generated on the STA-R® AUT 06366,
  LMWH tinzaparin sodium data (InnoHep®) generated on the STA-R® AUT 00603.
Validation data:
  UFH sodium data (Heparin Choay®) generated on the STA-R® AUT06399,
  UFH calcium data (Calciparine®) generated on the STA-R® AUT06399,
  LMWH dalteparin sodium data (Fragmine®) generated on the STA-R® AUT 06399,
  LMWH enoxaparin sodium data (Lovenox®) generated on the STA-R® AUT 06399,
  LMWH tinzaparin sodium data (InnoHep®) generated on the STA-R® AUT 06399.

Description of the Automated Learning Model

A multilayer perceptron (neural network) was trained in accordance with the strategy described in the preceding section. It was defined by the following parameters and hyperparameters:
  Preprocessing of data: normalization between 0 and 1
  Automated learning model: Multilayer perceptrons
  Hyperparameters:
    Input layer
      77 neurons
      Activation functions: Identity
    Hidden layer
      40 neurons
      Activation functions: ReLU
    Output layer
      2 neurons
      Activation function: Softmax
  Initialization of weight and bias matrix: Xavier Glorot
  Digital method for optimization of weights and biases: L-BFGS
  Regularization method: L2, alpha=0.9
  Learning strategy: seed search
  Cost function: cross-entropy 3.4 Assays of Unfractionated Heparins 3.4.1 Data Sets Concerning UFH sodium (Heparin Choay®), the generated data were:
63 sets of kinetic measurements on 24.10.2017 on the STA-R® AUT06366 (soft version 3.04.07)
  normal plasma pool, batch 03.2017 supplemented with 0.00, 0.12, 0.23, 0.32, 0.46, 0.54, 0.66, 0.66, 0.78, 0.86, 1.00, 1.18, 1.20, 1.36, 1.47, 1.56, 1.64, 1.74, 1.80, 1.88 and 2.03 IU/mL;
  each sample level was tested with n=3;
  the samples were prepared extemporaneously and tested simultaneously on the two instruments.
63 sets of kinetic measurements on 24.10.2017 on the STA-R® AUT06366 (soft version 3.04.07)
  normal plasma pool, batch 03.2017 supplemented with 0.00, 0.11, 0.21, 0.32, 0.43, 0.55, 0.63, 0.64, 0.76, 0.87, 0.97, 1.14, 1.17, 1.30, 1.43, 1.52, 1.61, 1.70, 1.84, 1.84 and 1.99 IU/mL;
  each sample level was tested with n=3;
  the samples were prepared extemporaneously and tested simultaneously on the two instruments.

Concerning UFH calcium (Calciparine®), the generated data were:
63 sets of kinetic measurements on 23.10.2019 on the STA-R® AUT05016 (soft version 3.04.07)

normal plasma pool, batch 03.2017 supplemented with 0.00, 0.10, 0.21, 0.32, 0.44, 0.56, 0.66, 0.77, 0.84, 0.86, 0.98, 1.15, 1.28, 1.34, 1.43, 1.56, 1.60, 1.75, 1.85, 1.92 and 1.96 IU/mL;

each sample level was tested with n=3;

the samples were prepared extemporaneously and tested simultaneously on the two instruments.

63 sets of kinetic measurements on 23.10.2019 on the STA-R® AUT05450 (soft version 3.04.07)

normal plasma pool, batch 03.2017 supplemented with 0.00, 0.12, 0.23, 0.33, 0.43, 0.55, 0.66, 0.75, 0.90, 0.88, 1.00, 1.13, 1.24, 1.32, 1.44, 1.53, 1.63, 1.70, 1.88, 1.96 and 2.01 IU/mL;

each sample level was tested with n=3;

the samples were prepared extemporaneously and tested simultaneously on the two instruments.

Batch number for STA®—Liquid Anti-Xa: 251187, batch used for the generating the kinetics using universal methodology and for the commercial assay of the heparin supplement.

3.4.2 Automated Learning Model

Organisation of Data

The automated learning model was trained by a cross-validation divided into four sub-sets, as follows:

Sub-set 1:
  Learning data:
    UFH sodium data (Heparin Choay®) generated on the STA-R® AUT06366,
    UFH calcium data (Calciparine®) generated on the STA-R® AUT05450.
  Validation data:
    UFH sodium data (Heparin Choay®) generated on the STA-R® AUT00603,
    UFH calcium data (Calciparine®) generated on the STA-R® AUT05016.

Sub-set 2:
  Learning data:
    UFH sodium data (Heparin Choay®) generated on the STA-R® AUT06366,
    UFH calcium data (Calciparine®) generated on the STA-R® AUT05016.
  Validation data:
    UFH sodium data (Heparin Choay®) generated on the STA-R® AUT00603,
    UFH calcium data (Calciparine®) generated on the STA-R® AUT05450.

Sub-set 3:
  Learning data:
    UFH sodium data (Heparin Choay®) generated on the STA-R® AUT00603,
    UFH calcium data (Calciparine®) generated on the STA-R® AUT05450.
  Validation data:
    UFH sodium data (Heparin Choay®) generated on the STA-R® AUT06366,
    UFH calcium data (Calciparine®) generated on the STA-R® AUT05016.

Sub-set 4:
  Learning data:
    UFH sodium data (Heparin Choay®) generated on the STA-R® AUT00603,
    UFH calcium data (Calciparine®) generated on the STA-R® AUT05016.
  Validation data:
    UFH sodium data (Heparin Choay®) generated on the STA-R® AUT06366,
    UFH calcium data (Calciparine®) generated on the STA-R® AUT05450.

Final learning was carried out on the entirety of the data.

Description of the Automated Learning Model

A multilayer perceptron (neural network) was trained in accordance with the strategy described in the preceding section. It was defined by the following parameters and hyperparameters:

Preprocessing of data: normalization between 0 and 1
Automated learning model: Multilayer perceptrons
Hyperparameters:
  Input layer
    77 neurons
    Activation functions: Identity
  Hidden layer
    40 neurons
    Activation functions: ReLU
  Output layer
    1 neuron
    Activation function: Identity
Initialization of weight and bias matrix: Xavier Glorot
Digital method for optimization of weights and biases: L-BFGS
Regularization method: L2, alpha=0.01
Learning strategy: seed search
Cost function: mean quadratic error 3.5 Assays of Low Molecular Weight Heparins 3.5.1 Data Sets Concerning the LMWH dalteparin sodium (Fragmine®), the generated data were:

63 sets of kinetic measurements on 19.10.2017 on the STA-R® AUT06366 (soft version 3.04.07)

normal plasma pool, batch 03.2017 supplemented with 0.00, 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

63 sets of kinetic measurements on 19.10.2017 on the STA-R® AUT05016 (soft version 3.04.07)

normal plasma pool, batch 03.2017 supplemented with 0.00, 0.15, 0.25, 0.35, 0.44, 0.54, 0.64, 0.74, 0.85, 0.94, 1.07, 1.14, 1.24, 1.27, 1.44, 1.50, 1.55, 1.66, 1.75, 1.79, 2.26 IU Anti-Xa/mL;

each sample level was tested with n=3;

the samples were prepared extemporaneously and tested simultaneously on the two instruments.

Concerning the LMWH enoxaparin sodium (Lovenox®), the generated data were:

63 sets of kinetic measurements on 26.10.2017 on the STA-R® AUT06366 (soft version 3.04.07)

normal plasma pool, batch 03.2017 supplemented with 0.00, 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;

each sample level was tested with n=3;

the samples were prepared extemporaneously and tested simultaneously on the two instruments.

63 sets of kinetic measurements on 26.10.2017 on the STA-R® AUT00603 (soft version 3.04.07)

normal plasma pool, batch 03.2017 supplemented with 0.00, 0.10, 0.20, 0.31, 0.40, 0.52, 0.63, 0.71, 0.83, 0.93, 1.02, 1.09, 1.21, 1.28, 1.36, 1.49, 1.58, 1.65, 1.81, 1.85, 1.97 IU Anti-Xa/mL;

each sample level was tested with n=3;

the samples were prepared extemporaneously and tested simultaneously on the two instruments.

Concerning the LMWH tinzaparin sodium (InnoHep®), the generated data were:
- 63 sets of kinetic measurements on 25.10.2017 on the STA-R® AUT06366 (soft version 3.04.07)
  - normal plasma pool, batch 03.2017 supplemented with 0.00, 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
  - each sample level was tested with n=3;
  - the samples were prepared extemporaneously and tested simultaneously on the two instruments.
- 63 sets of kinetic measurements on 25.10.2017 on the STA-R® AUT00603 (soft version 3.04.07)
  - normal plasma pool, batch 03.2017 supplemented with 0.00, 0.11, 0.20, 0.30, 0.40, 0.46, 0.54, 0.63, 0.80, 0.89, 0.96, 1.06, 1.21, 1.27, 1.37, 1.46, 1.52, 1.64, 1.81, 1.83, 1.97 IU Anti-Xa/mL;
  - each sample level was tested with n=3;
  - the samples were prepared extemporaneously and tested simultaneously on the two instruments.

Batch number for STA®—Liquid Anti-Xa: 251187, batch used for the generating the kinetics using universal methodology and for the commercial assay of the heparin supplement.

3.5.2 Automated Learning Model

Organisation of Data

The automated learning model was trained by a cross-validation divided into two sub-sets, as follows:

Sub-set 1:
  Learning data:
    LMWH dalteparin sodium data (Fragmine®) generated on the STA-R® AUT05016,
    LMWH enoxaparin sodium data (Lovenox®) generated on the STA-R® AUT00603,
    LMWH tinzaparin sodium data (InnoHep®) generated on the STA-R® AUT00603.
  Validation data:
    LMWH dalteparin sodium data (Fragmine®) generated on the STA-R® AUT06366,
    LMWH enoxaparin sodium data (Lovenox®) generated on the STA-R® AUT06366,
    LMWH tinzaparin sodium data (InnoHep®) generated on the STA-R® AUT06366.

Sub-set 2:
  Learning data:
    LMWH dalteparin sodium data (Fragmine®) generated on the STA-R® AUT06366,
    LMWH enoxaparin sodium data (Lovenox®) generated on the STA-R® AUT06366,
    LMWH tinzaparin sodium data (InnoHep®) generated on the STA-R® AUT06366.
  Validation data:
    LMWH dalteparin sodium data (Fragmine®) generated on the STA-R® AUT05016
    LMWH enoxaparin sodium data (Lovenox®) generated on the STA-R® AUT00603,
    LMWH tinzaparin sodium data (InnoHep®) generated on the STA-R® AUT00603.

Final learning was carried out on the entirety of the data.

Description of the Automated Learning Model

A multilayer perceptron (neural network) was trained in accordance with the strategy described in the preceding section. It was defined by the following parameters and hyperparameters:

Preprocessing of data: normalization between 0 and 1
Automated learning model: Multilayer perceptrons
Hyperparameters:
  Input layer
    77 neurons
    Activation functions: Identity
  Hidden layer
    40 neurons
    Activation functions: ReLU
  Output layer
    1 neuron
    Activation function: Identity
Initialization of weight and bias matrix: Xavier Glorot
Digital method for optimization of weights and biases: L-BFGS
Regularization method: L2, alpha=0.1
Learning strategy: seed search
Cost function: mean quadratic error 3.6 Identification of Anti-Xa DOAC (Optimized DOAC Methodology)

3.6.1 Data Sets

The generated data relating to Xarelto® (rivaroxaban) were:
- 60 kinetic measurements measured in January 2016 on the STA-R® AUT00460
  - normal plasma pool supplemented with 10, 20, 29, 37, 44, 54, 62, 89, 115, 143, 160, 192, 226, 252, 287, 319, 331, 361, 391 and 407 ng/mL;
  - each sample level was tested with n=3;
  - the samples had been prepared and stored at −80° C.
- 60 kinetic measurements measured in June 2016 on the STA-R® AUT00722
  - normal plasma pool supplemented with 10, 20, 29, 37, 44, 54, 62, 89, 115, 143, 160, 192, 226, 252, 287, 319, 331, 361, 391 and 407 ng/mL;
  - each sample level was tested with n=3;
  - the samples had been prepared and stored at −80° C.

The generated data relating to Eliquis® (apixaban) were:
- 69 kinetic measurements measured in January 2016 on the STA-R® AUT00460
  - normal plasma pool supplemented with 10, 20, 31, 42, 48, 72, 92, 116, 143, 163, 192, 217, 247, 276, 298, 321, 348, 370, 397, 416, 439, 459 and 473 ng/mL;
  - each sample level was tested with n=3;
  - the samples had been prepared and stored at −80° C.
- 69 kinetic measurements measured in June 2016 on the STA-R® AUT00722
  - normal plasma pool supplemented with 10, 20, 31, 42, 48, 72, 92, 116, 143, 163, 192, 217, 247, 276, 298, 321, 348, 370, 397, 416, 439, 459 and 473 ng/mL;
  - each sample level was tested with n=3;
  - the samples had been prepared and stored at −80° C.

The generated data relative to Lixiana® (edoxaban) were:
- 69 kinetic measurements measured in January 2016 on the STA-R® AUT00460
  - normal plasma pool supplemented with 16, 21, 30, 39, 51, 76, 100, 128, 142, 155, 187, 215, 245, 269, 284, 322, 347, 359, 380, 393, 410, 426 and 436 ng/mL;
  - each sample level was tested with n=3;
  - the samples had been prepared and stored at −80° C.
- 69 kinetic measurements measured in June 2016 on the STA-R® AUT00722
  - normal plasma pool supplemented with 16, 21, 30, 39, 51, 76, 100, 128, 142, 155, 187, 215, 245, 269, 284, 322, 347, 359, 380, 393, 410, 426 and 436 ng/mL;
  - each sample level was tested with n=3;
  - the samples had been prepared and stored at −80° C.

3.6.2 Automated Learning Model

Organisation of Data

The automated learning model was trained by a cross-validation organised as follows:

Learning data:
- rivaroxaban data (Xarelto®) generated on the STA-R® AUT00460,
- apixaban data (Eliquis®) generated on the STA-R® AUT00460,
- edoxaban data (Lixiana®) generated on the STA-R® AUT00460.

Validation data:
- rivaroxaban data (Xarelto®) generated on the STA-R® AUT00722,
- apixaban data (Eliquis®) generated on the STA-R® AUT00722,
- edoxaban data (Lixiana®) generated on the STA-R® AUT00722.

Description of the Automated Learning Model

A multilayer perceptron (neural network) was trained in accordance with the strategy described in the preceding section. It was defined by the following parameters and hyperparameters:

Preprocessing of data: normalization between 0 and 1
Automated learning model: Multilayer perceptrons
Hyperparameters:
- Input layer
  - 42 neurons
  - Activation functions: Identity
- Hidden layer
  - 29 neurons
  - Activation functions: ReLU
- Hidden layer
  - 16 neurons
  - Activation functions: ReLU
- Output layer
  - 3 neurons
  - Activation function: Softmax Initialization of weight and bias matrix: Xavier Glorot
Digital method for optimization of weights and biases: L-BFGS
Regularization method: L2, alpha=0.01
Learning strategy: seed search
Cost function: cross-entropy

3.7 Assay of Rivaroxaban (Optimized DOAC Methodology)

3.7.1 Data Sets

The generated data relative to Xarelto® (rivaroxaban) were:
- 63 kinetic measurements measured in January 2016 on the STA-R® AUT00460
  - normal plasma pool supplemented with 0, 10, 20, 29, 37, 44, 54, 62, 89, 115, 143, 160, 192, 226, 252, 287, 319, 331, 361, 391 and 407 ng/mL;
  - each sample level was tested with n=3;
  - the samples had been prepared and stored at −80° C.
- 63 kinetic measurements measured in June 2016 on the STA-R® AUT00722
  - normal plasma pool supplemented with 0, 10, 20, 29, 37, 44, 54, 62, 89, 115, 143, 160, 192, 226, 252, 287, 319, 331, 361, 391 and 407 ng/mL;
  - each sample level was tested with n=3;
  - the samples had been prepared and stored at −80° C.

3.7.2 Automated Learning Model

Organisation of Data

The automated learning model was trained by a cross-validation organised as follows:
- Learning data: rivaroxaban data (Xarelto®) generated on the STA-R® AUT00460.
- Validation data: rivaroxaban data (Xarelto®) generated on the STA-R® AUT00722.

Description of the Automated Learning Model

A multilayer perceptron (neural network) was trained in accordance with the strategy described in the preceding section. It was defined by the following parameters and hyperparameters:

Preprocessing of data: normalization between 0 and 1
Automated learning model: Multilayer perceptrons
Hyperparameters:
- Input layer
  - 42 neurons
  - Activation functions: Identity
- Hidden layer
  - 29 neurons
  - Activation functions: ReLU
- Hidden layer
  - 16 neurons
  - Activation functions: ReLU
- Output layer
  - 1 neuron
  - Activation function: Identity Initialization of weight and bias matrix: Xavier Glorot
Digital method for optimization of weights and biases: L-BFGS
Regularization method: L2, alpha=0.01
Learning strategy: seed search
Cost function: mean quadratic error

3.8 Rivaroxaban Assays (Universal Methodology or "Improved Methodology Based on the Universal Methodology")

3.8.1 Data Sets

The data relating to Xarelto® (rivaroxaban) were generated during two distinct studies.

Concerning the first study, the generated data were:
- 63 sets of kinetic measurements on 10.10.2017 on the STA-R® AUT00603 (soft version 3.04.07)
  - normal plasma pool, batch 03.2017 supplemented with 0, 10, 20, 35, 41, 49, 56, 66, 74, 84, 93, 105, 110, 116, 134, 143, 155, 160, 175, 181 and 198 ng/mL;
  - each sample level was tested with n=3;
  - the samples had been prepared and stored at −80° C.
- 63 sets of kinetic measurements on 17.10.2017 on the STA-R® AUT05450 (soft version 3.04.07)
  - normal plasma pool, batch 03.2017 supplemented with 0, 10, 20, 35, 41, 48, 59, 65, 77, 85, 95, 103, 113, 121, 134, 145, 160, 161, 172, 169, 202 ng/mL;
  - each sample level was tested with n=3;
  - the samples had been prepared and stored at −80° C.
- 63 sets of kinetic measurements on 17.10.2017 on the STA-R® AUT06366 (soft version 3.04.07)
  - normal plasma pool, batch 03.2017 supplemented with 0, 10, 20, 25, 34, 43, 50, 62, 74, 84, 93, 104, 109, 118, 133, 143, 159, 158, 176, 173 and 203 ng/mL;
  - each sample level was tested with n=3;
  - the samples had been prepared and stored at −80° C.
- 63 sets of kinetic measurements on 10.10.2017 on the STA-R® AUT06399 (soft version 3.04.07)
  - normal plasma pool, batch 03.2017 supplemented with 0, 10, 20, 30, 38, 46, 57, 64, 72, 82, 90, 101, 110, 115, 130, 140, 148, 152, 166, 164 and 192 ng/mL;

each sample level was tested with n=3;

the samples had been prepared and stored at −80° C.

For this first study, the STA®—Liquid Anti-Xa batch 251738 was used to generate the kinetics using universal methodology and for the commercial assay of the supplement of rivaroxaban.

Concerning the second study, the generated data were:

63 sets of kinetic measurements on 14.05.2019 on the STA-R® AUT05676 (soft version 3.04.07)

normal plasma pool, batch 19059RD (code 22824) supplemented with 0, 11, 21, 28, 42, 50, 58, 68, 77, 93, 102, 113, 121, 129, 141, 153, 160, 174, 184, 201 and 204 ng/mL;

each sample level was tested with n=3;

the samples had been prepared and stored at −80° C., then tested simultaneously on the three instruments.

63 sets of kinetic measurements on 14.05.2019 on the STA-R® AUT05980 (soft version 3.04.07)

normal plasma pool, batch 19059RD (code 22824) supplemented with 0, 15, 23, 32, 47, 52, 61, 74, 77, 92, 108, 112, 120, 129, 139, 151, 164, 174, 184, 191 and 206 ng/mL;

each sample level was tested with n=3;

the samples had been prepared and stored at −80° C., then tested simultaneously on the three instruments.

63 sets of kinetic measurements on 14.05.2019 on the STA-R® AUT06366 (soft version 3.04.07)

normal plasma pool, batch 19059RD (code 22824) supplemented with 0, 13, 22, 29, 44, 51, 60, 72, 79, 96, 104, 118, 122, 132, 143, 155, 161, 175, 186, 198 and 201 ng/mL;

each sample level was tested with n=3;

the samples had been prepared and stored at −80° C., then tested simultaneously on the three instruments.

For this second study, the STA®—Liquid Anti-Xa batch 253225 was used to generate the kinetics using universal methodology and for the commercial assay of the supplement of rivaroxaban.

3.8.2 Automated Learning Model

Organisation of Data

The automated learning model was trained by a cross-validation divided into seven sub-sets, as follows:

Sub-set 1:
  Learning data:
    rivaroxaban data (Xarelto®) generated on the STA-R® AUT00603,
    rivaroxaban data (Xarelto®) generated on the STA-R® AUT05450,
    rivaroxaban data (Xarelto®) generated on the STA-R® AUT05676,
    rivaroxaban data (Xarelto®) generated on the STA-R® AUT05980,
    rivaroxaban data (Xarelto®) generated on the STA-R® AUT06366,
    rivaroxaban data (Xarelto®) generated on the STA-R® AUT06366 (bis).
  Validation data: rivaroxaban data (Xarelto®) generated on the STA-R® AUT06399.

Sub-set 2:
  Learning data:
    rivaroxaban data (Xarelto®) generated on the STA-R® AUT00603,
    rivaroxaban data (Xarelto®) generated on the STA-R® AUT05450,
    rivaroxaban data (Xarelto®) generated on the STA-R® AUT05676,
    rivaroxaban data (Xarelto®) generated on the STA-R® AUT05980,
    rivaroxaban data (Xarelto®) generated on the STA-R® AUT06366 (bis),
    rivaroxaban data (Xarelto®) generated on the STA-R® AUT06399.
  Validation data: rivaroxaban data (Xarelto®) generated on the STA-R® AUT06366.

Sub-set 3:
  Learning data:
    rivaroxaban data (Xarelto®) generated on the STA-R® AUT00603,
    rivaroxaban data (Xarelto®) generated on the STA-R® AUT05450,
    rivaroxaban data (Xarelto®) generated on the STA-R® AUT05676,
    rivaroxaban data (Xarelto®) generated on the STA-R® AUT05980,
    rivaroxaban data (Xarelto®) generated on the STA-R® AUT06366,
    rivaroxaban data (Xarelto®) generated on the STA-R® AUT06399.
  Validation data: rivaroxaban data (Xarelto®) generated on the STA-R® AUT06366 (bis).

Sub-set 4:
  Learning data:
    rivaroxaban data (Xarelto®) generated on the STA-R® AUT00603,
    rivaroxaban data (Xarelto®) generated on the STA-R® AUT05450,
    rivaroxaban data (Xarelto®) generated on the STA-R® AUT05676,
    rivaroxaban data (Xarelto®) generated on the STA-R® AUT06366,
    rivaroxaban data (Xarelto®) generated on the STA-R® AUT06366 (bis),
    rivaroxaban data (Xarelto®) generated on the STA-R® AUT06399.
  Validation data: rivaroxaban data (Xarelto®) generated on the STA-R® AUT05980.

Sub-set 5:
  Learning data:
    rivaroxaban data (Xarelto®) generated on the STA-R® AUT00603,
    rivaroxaban data (Xarelto®) generated on the STA-R® AUT05450,
    rivaroxaban data (Xarelto®) generated on the STA-R® AUT05980,
    rivaroxaban data (Xarelto®) generated on the STA-R® AUT06366,
    rivaroxaban data (Xarelto®) generated on the STA-R® AUT06366 (bis),
    rivaroxaban data (Xarelto®) generated on the STA-R® AUT06399.
  Validation data: rivaroxaban data (Xarelto®) generated on the STA-R® AUT05676.

Sub-set 6:
  Learning data:
    rivaroxaban data (Xarelto®) generated on the STA-R® AUT00603,
    rivaroxaban data (Xarelto®) generated on the STA-R® AUT05676,
    rivaroxaban data (Xarelto®) generated on the STA-R® AUT05980,
    rivaroxaban data (Xarelto®) generated on the STA-R® AUT06366, rivaroxaban data (Xarelto®) generated on the STA-R® AUT06366 (bis),
rivaroxaban data (Xarelto®) generated on the STA-R® AUT06399.
Validation data: rivaroxaban data (Xarelto®) generated on the STA-R® AUT05450.

Sub-set 7:
Learning data:
rivaroxaban data (Xarelto®) generated on the STA-R® AUT05450,
rivaroxaban data (Xarelto®) generated on the STA-R® AUT05676,
rivaroxaban data (Xarelto®) generated on the STA-R® AUT05980,
rivaroxaban data (Xarelto®) generated on the STA-R® AUT06366,
rivaroxaban data (Xarelto®) generated on the STA-R® AUT06366 (bis),
rivaroxaban data (Xarelto®) generated on the STA-R® AUT06399.
Validation data: rivaroxaban data (Xarelto®) generated on the STA-R® AUT00603.

Final learning was carried out on the entirety of the data.

Description of the Automated Learning Model

A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
Input layer
77 neurons
Activation functions: Identity
Hidden layer
40 neurons
Activation functions: ReLU
Output layer
1 neuron
Activation function: Identity
Initialization of weight and bias matrix: Xavier Glorot
Digital method for optimization of weights and biases: L-BFGS
Regularization method: L2, alpha=0.001
Learning strategy: seed search
Cost function: mean quadratic error 3.9 Assay of Apixaban (Optimized DOAC Methodology)

3.9.1 Data Sets

The generated data relating to Eliquis® (apixaban) were:
72 kinetic measurements measured in January 2016 on the STA-R® AUT00460
normal plasma pool supplemented with 0, 10, 20, 31, 42, 48, 72, 92, 116, 143, 163, 192, 217, 247, 276, 298, 321, 348, 370, 397, 416, 439, 459 and 473 ng/mL;
each sample level was tested with n=3;
the samples had been prepared and stored at −80° C.
72 kinetic measurements measured in June 2016 on the STA-R® AUT00722
normal plasma pool supplemented with 0, 10, 20, 31, 42, 48, 72, 92, 116, 143, 163, 192, 217, 247, 276, 298, 321, 348, 370, 397, 416, 439, 459 and 473 ng/mL;
each sample level was tested with n=3;
the samples had been prepared and stored at −80° C.

3.9.2 Automated Learning Model

Organisation of Data

The automated learning model was trained by a cross-validation organised as follows:
Learning data: apixaban data (Eliquis®) generated on the STA-R® AUT00460.
Validation data: apixaban data (Eliquis®) generated on the STA-R® AUT00722.

Description of the Automated Learning Model

A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
Input layer
42 neurons
Activation functions: Identity
Hidden layer
29 neurons
Activation functions: ReLU
Hidden layer
16 neurons
Activation functions: ReLU
Output layer
1 neuron
Activation function: Identity
Initialization of weight and bias matrix: Xavier Glorot
Digital method for optimization of weights and biases: L-BFGS
Regularization method: L2, alpha=0.01
Learning strategy: seed search
Cost function: mean quadratic error 3.10 Apixaban Assays (Universal Methodology or "Improved Methodology Based on the Universal Methodology")

3.10.1 Data Sets

The data relating to Eliquis® (apixaban) were generated during two distinct studies.
Concerning the first study, the generated data were:
63 sets of kinetic measurements on 16.10.2017 on the STA-R® AUT00603 (soft version 3.04.07)
normal plasma pool, batch 03.2017 supplemented with 0, 10, 20, 27, 39, 41, 52, 61, 67, 76, 93, 96, 105, 123, 127, 140, 145, 155, 167, 184 and 182 ng/mL;
each sample level was tested with n=3;
the samples had been prepared and stored at −80° C.
63 sets of kinetic measurements on 05.10.2017 on the STA-R® AUT06360 (soft version 3.04.07)
normal plasma pool, batch 03.2017 supplemented with 0, 10, 20, 26, 36, 43, 53, 60, 70, 75, 93, 103, 109, 121, 135, 136, 153, 160, 175, 185 and 192 ng/mL;
each sample level was tested with n=3;
the samples had been prepared and stored at −80° C.
63 sets of kinetic measurements on 16.10.2017 on the STA-R® AUT06366 (soft version 3.04.07)
normal plasma pool, batch 03.2017 supplemented with 0, 10, 20, 26, 34, 44, 50, 61, 70, 74, 94, 103, 109, 122, 135, 138, 147, 162, 173, 182 and 186 ng/mL;
each sample level was tested with n=3.
the samples had been prepared and stored at −80° C.
63 sets of kinetic measurements on 05.10.2017 on the STA-R® AUT06399 (soft version 3.04.07)
normal plasma pool, batch 03.2017 supplemented with 0, 10, 20, 33, 41, 46, 57, 65, 76, 79, 96, 105, 116, 125, 135, 138, 153, 161, 169, 180 and 186 ng/mL;

each sample level was tested with n=3.

the samples had been prepared and stored at −80° C.

For this first study, the STA®—Liquid Anti-Xa batch 251738 was used to generate the kinetics using universal methodology and for the commercial assay of the supplement of apixaban.

Concerning the second study, the generated data were:

63 sets of kinetic measurements on 07.05.2019 on the STA-R® AUT05676 (soft version 3.04.07)
  normal plasma pool, batch 19059RD (code 22824) supplemented with 0, 11, 16, 32, 39, 52, 62, 70, 84, 95, 104, 118, 123, 132, 142, 156, 167, 174, 183, 190 and 198 ng/mL;
  each sample level was tested with n=3;
  the samples had been prepared and stored at −80° C., then tested simultaneously on the three instruments.

63 sets of kinetic measurements on 07.05.2019 on the STA-R® AUT05980 (soft version 3.04.07)
  normal plasma pool, batch 19059RD (code 22824) supplemented with 0, 16, 23, 37, 48, 60, 73, 80, 96, 102, 111, 125, 136, 146, 155, 166, 186, 191, 193, 205 and 211 ng/mL;
  each sample level was tested with n=3;
  the samples had been prepared and stored at −80° C., then tested simultaneously on the three instruments.

63 sets of kinetic measurements on 07.05.2019 on the STA-R® AUT06366 (soft version 3.04.07)
  normal plasma pool, batch 19059RD (code 22824) supplemented with 0, 9, 16, 29, 36, 50, 61, 67, 81, 94, 102, 115, 123, 126, 144, 156, 159, 175, 183, 191 and 192 ng/mL;
  each sample level was tested with n=3;
  the samples had been prepared and stored at −80° C., then tested simultaneously on the three instruments.

For this second study, the STA®—Liquid Anti-Xa batch 253225 was used to generate the kinetics using universal methodology and for the commercial assay of the supplement of apixaban.

3.10.2 Automated Learning Model

Organisation of Data

The automated learning model was trained by a cross-validation divided into seven sub-sets, as follows:

Sub-set 1:
  Learning data:
    apixaban data (Eliquis®) generated on the STA-R® AUT00603,
    apixaban data (Eliquis®) generated on the STA-R® AUT05676,
    apixaban data (Eliquis®) generated on the STA-R® AUT05980,
    apixaban data (Eliquis®) generated on the STA-R® AUT06360,
    apixaban data (Eliquis®) generated on the STA-R® AUT06366,
    apixaban data (Eliquis®) generated on the STA-R® AUT06366 (bis).
  Validation data: apixaban data (Eliquis®) generated on the STA-R® AUT06399.

Sub-set 2:
  Learning data:
    apixaban data (Eliquis®) generated on the STA-R® AUT00603,
    apixaban data (Eliquis®) generated on the STA-R® AUT05676,
    apixaban data (Eliquis®) generated on the STA-R® AUT05980,
    apixaban data (Eliquis®) generated on the STA-R® AUT06360,
    apixaban data (Eliquis®) generated on the STA-R® AUT06366 (bis),
    apixaban data (Eliquis®) generated on the STA-R® AUT06399.
  Validation data: apixaban data (Eliquis®) generated on the STA-R® AUT06366.

Sub-set 3:
  Learning data:
    apixaban data (Eliquis®) generated on the STA-R® AUT00603,
    apixaban data (Eliquis®) generated on the STA-R® AUT05676,
    apixaban data (Eliquis®) generated on the STA-R® AUT05980,
    apixaban data (Eliquis®) generated on the STA-R® AUT06360,
    apixaban data (Eliquis®) generated on the STA-R® AUT06366,
    apixaban data (Eliquis®) generated on the STA-R® AUT06399.
  Validation data: apixaban data (Eliquis®) generated on the STA-R® AUT06366 (bis).

Sub-set 4:
  Learning data:
    apixaban data (Eliquis®) generated on the STA-R® AUT00603,
    apixaban data (Eliquis®) generated on the STA-R® AUT05676,
    apixaban data (Eliquis®) generated on the STA-R® AUT05980,
    apixaban data (Eliquis®) generated on the STA-R® AUT06366,
    apixaban data (Eliquis®) generated on the STA-R® AUT06366 (bis),
    apixaban data (Eliquis®) generated on the STA-R® AUT06399.
  Validation data: apixaban data (Eliquis®) generated on the STA-R® AUT06360.

Sub-set 5:
  Learning data:
    apixaban data (Eliquis®) generated on the STA-R® AUT00603,
    apixaban data (Eliquis®) generated on the STA-R® AUT05676,
    apixaban data (Eliquis®) generated on the STA-R® AUT06360,
    apixaban data (Eliquis®) generated on the STA-R® AUT06366,
    apixaban data (Eliquis®) generated on the STA-R® AUT06366 (bis),
    apixaban data (Eliquis®) generated on the STA-R® AUT06399.
  Validation data: apixaban data (Eliquis®) generated on the STA-R® AUT05980.

Sub-set 6:
  Learning data:
    apixaban data (Eliquis®) generated on the STA-R® AUT00603,
    apixaban data (Eliquis®) generated on the STA-R® AUT05980,
    apixaban data (Eliquis®) generated on the STA-R® AUT06360,
    apixaban data (Eliquis®) generated on the STA-R® AUT06366, apixaban data (Eliquis®) generated on the STA-R® AUT06366 (bis),
apixaban data (Eliquis®) generated on the STA-R® AUT06399.
Validation data: apixaban data (Eliquis®) generated on the STA-R® AUT05676.

Sub-set 7:
Learning data:
apixaban data (Eliquis®) generated on the STA-R® AUT05676,
apixaban data (Eliquis®) generated on the STA-R® AUT05980,
apixaban data (Eliquis®) generated on the STA-R® AUT06360,
apixaban data (Eliquis®) generated on the STA-R® AUT06366,
apixaban data (Eliquis®) generated on the STA-R® AUT06366 (bis),
apixaban data (Eliquis®) generated on the STA-R® AUT06399.
Validation data: apixaban data (Eliquis®) generated on the STA-R® AUT00603.

Final learning was carried out on the entirety of the data.

Description of the Automated Learning Model

A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
  Input layer
    77 neurons
    Activation functions: Identity
  Hidden layer
    40 neurons
    Activation functions: ReLU
  Output layer
    1 neuron
    Activation function: Identity
Initialization of weight and bias matrix: Xavier Glorot
Digital method for optimization of weights and biases: L-BFGS
Regularization method: L2, alpha=0.001
Learning strategy: seed search
Cost function: mean quadratic error 3.11 Assay of Edoxaban (Optimized DOAC Methodology)

3.11.1 Data Sets

The generated data relative to Lixiana® (edoxaban) were:
72 kinetic measurements measured in January 2016 on the STA-R® AUT00460
  normal plasma pool supplemented with 0, 16, 21, 30, 39, 51, 76, 100, 128, 142, 155, 187, 215, 245, 269, 284, 322, 347, 359, 380, 393, 410, 426 and 436 ng/mL;
  each sample level was tested with n=3;
  the samples had been prepared and stored at −80° C.
72 kinetic measurements measured in June 2016 on the STA-R® AUT00722
  normal plasma pool supplemented with 0, 16, 21, 30, 39, 51, 76, 100, 128, 142, 155, 187, 215, 245, 269, 284, 322, 347, 359, 380, 393, 410, 426 and 436 ng/mL;
  each sample level was tested with n=3;
  the samples had been prepared and stored at −80° C.

3.11.2 Automated Learning Model

Organisation of Data

The automated learning model was trained by a cross-validation organised as follows:
Learning data: edoxaban data (Lixiana®) generated on the STA-R® AUT00460.
Validation data: edoxaban data (Lixiana®) generated on the STA-R® AUT00722.

Description of the Automated Learning Model

A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
  Input layer
    42 neurons
    Activation functions: Identity
  Hidden layer
    29 neurons
    Activation functions: ReLU
  Hidden layer
    16 neurons
    Activation functions: ReLU
  Output layer
    1 neuron
    Activation function: Identity
Initialization of weight and bias matrix: Xavier Glorot
Digital method for optimization of weights and biases: L-BFGS
Regularization method: L2, alpha=0.01
Learning strategy: seed search
Cost function: mean quadratic error 3.12 Edoxaban Assays (Universal Methodology or "Improved Methodology Based on the Universal Methodology")

3.12.1 Data Sets

The data relating to Lixiana® (edoxaban) were generated during two distinct studies.
Concerning the first study, the generated data were:
63 sets of kinetic measurements on 17.10.2017 on the STA-R® AUT00603 (soft version 3.04.07)
  normal plasma pool, batch 03.2017 supplemented with 0, 10, 20, 28, 40, 49, 64, 74, 95, 103, 109, 122, 132, 144, 131, 132, 157, 171, 195, 191 and 201 ng/mL;
  each sample level was tested with n=3;
  the samples had been prepared and stored at −80° C.
63 sets of kinetic measurements on 17.10.2017 on the STA-R® AUT05450 (soft version 3.04.07)
  normal plasma pool, batch 03.2017 supplemented with 0, 10, 21, 28, 41, 49, 62, 74, 92, 102, 112, 120, 133, 142, 129, 133, 155, 168, 188, 200 and 206 ng/mL;
  each sample level was tested with n=3;
  the samples had been prepared and stored at −80° C.
63 sets of kinetic measurements on 21.09.2017 on the STA-R® AUT06366 (soft version 3.04.07)
  normal plasma pool, batch 03.2017 supplemented with 0, 10, 21, 27, 40, 49, 64, 73, 90, 99, 108, 122, 132, 144, 130, 136, 153, 169, 192, 194 and 216 ng/mL;
  each sample level was tested with n=3;
  the samples had been prepared and stored at −80° C.
63 sets of kinetic measurements on 20.09.2017 on the STA-R® AUT06399 (soft version 3.04.07)
  normal plasma pool, batch 03.2017 supplemented with 0, 10, 21, 29, 39, 48, 60, 73, 81, 92, 107, 115, 129, 136, 129, 127, 149, 163, 181, 195 and 199 ng/mL;

each sample level was tested with n=3;
the samples had been prepared and stored at −80° C.

For this first study, the STA®—Liquid Anti-Xa batch 251738 was used to generate the kinetics using universal methodology and for the commercial assay of the supplement of edoxaban.

Concerning the second study, the generated data were:
63 sets of kinetic measurements on 06.05.2019 on the STA-R® AUT05676 (soft version 3.04.07)
  normal plasma pool, batch 19059RD (code 22824) supplemented with 0, 12, 19, 27, 36, 50, 59, 70, 81, 89, 100, 112, 119, 136, 145, 142, 163, 176, 186, 198 and 207 ng/mL;
  each sample level was tested with n=3;
  the samples had been prepared and stored at −80° C., then tested simultaneously on the three instruments.
63 sets of kinetic measurements on 06.05.2019 on the STA-R® AUT05980 (soft version 3.04.07)
  normal plasma pool, batch 19059RD (code 22824) supplemented with 0, 13, 20, 29, 37, 50, 61, 71, 83, 88, 95, 108, 115, 134, 141, 137, 161, 169, 176, 188 and 198 ng/mL;
  each sample level was tested with n=3;
  the samples had been prepared and stored at −80° C., then tested simultaneously on the three instruments.
63 sets of kinetic measurements on 06.05.2019 on the STA-R® AUT06366 (soft version 3.04.07)
  normal plasma pool, batch 19059RD (code 22824) supplemented with 0, 14, 20, 29, 35, 52, 58, 70, 77, 85, 97, 107, 114, 131, 140, 136, 165, 170, 177, 189 and 200 ng/mL;
  each sample level was tested with n=3;
  the samples had been prepared and stored at −80° C., then tested simultaneously on the three instruments.

For this second study, the STA®—Liquid Anti-Xa batch 253225 was used to generate the kinetics using universal methodology and for the commercial assay of the supplement of edoxaban.

3.12.2 Automated Learning Model

Organisation of Data

The automated learning model was trained by a cross-validation divided into seven sub-sets, as follows:

Sub-set 1:
  Learning data:
    edoxaban data (Lixiana®) generated on the STA-R® AUT00603,
    edoxaban data (Lixiana®) generated on the STA-R® AUT05450,
    edoxaban data (Lixiana®) generated on the STA-R® AUT05676,
    edoxaban data (Lixiana®) generated on the STA-R® AUT05980,
    edoxaban data (Lixiana®) generated on the STA-R® AUT06366,
    edoxaban data (Lixiana®) generated on the STA-R® AUT06366 (bis).
  Validation data: edoxaban data (Lixiana®) generated on the STA-R® AUT06399.
Sub-set 2:
  Learning data:
    edoxaban data (Lixiana®) generated on the STA-R® AUT00603,
    edoxaban data (Lixiana®) generated on the STA-R® AUT05450,
    edoxaban data (Lixiana®) generated on the STA-R® AUT05676,
    edoxaban data (Lixiana®) generated on the STA-R® AUT05980,
    edoxaban data (Lixiana®) generated on the STA-R® AUT06366,
    edoxaban data (Lixiana®) generated on the STA-R® AUT06399.
  Validation data: edoxaban data (Lixiana®) generated on the STA-R® AUT06366 (bis).
Sub-set 3:
  Learning data:
    edoxaban data (Lixiana®) generated on the STA-R® AUT00603,
    edoxaban data (Lixiana®) generated on the STA-R® AUT05450,
    edoxaban data (Lixiana®) generated on the STA-R® AUT05676,
    edoxaban data (Lixiana®) generated on the STA-R® AUT05980,
    edoxaban data (Lixiana®) generated on the STA-R® AUT06366 (bis),
    edoxaban data (Lixiana®) generated on the STA-R® AUT06399.
  Validation data: edoxaban data (Lixiana®) generated on the STA-R® AUT06366.
Sub-set 4:
  Learning data:
    edoxaban data (Lixiana®) generated on the STA-R® AUT00603,
    edoxaban data (Lixiana®) generated on the STA-R® AUT05450,
    edoxaban data (Lixiana®) generated on the STA-R® AUT05676,
    edoxaban data (Lixiana®) generated on the STA-R® AUT06366,
    edoxaban data (Lixiana®) generated on the STA-R® AUT06366 (bis),
    edoxaban data (Lixiana®) generated on the STA-R® AUT06399.
  Validation data: edoxaban data (Lixiana®) generated on the STA-R® AUT05980.
Sub-set 5:
  Learning data:
    edoxaban data (Lixiana®) generated on the STA-R® AUT00603,
    edoxaban data (Lixiana®) generated on the STA-R® AUT05450,
    edoxaban data (Lixiana®) generated on the STA-R® AUT05980,
    edoxaban data (Lixiana®) generated on the STA-R® AUT06366,
    edoxaban data (Lixiana®) generated on the STA-R® AUT06366 (bis),
    edoxaban data (Lixiana®) generated on the STA-R® AUT06399.
  Validation data: edoxaban data (Lixiana®) generated on the STA-R® AUT05676.
Sub-set 6:
  Learning data:
    edoxaban data (Lixiana®) generated on the STA-R® AUT00603,
    edoxaban data (Lixiana®) generated on the STA-R® AUT05676,
    edoxaban data (Lixiana®) generated on the STA-R® AUT05980,
    edoxaban data (Lixiana®) generated on the STA-R® AUT06366, edoxaban data (Lixiana®) generated on the STA-R® AUT06366 (bis),
edoxaban data (Lixiana®) generated on the STA-R® AUT06399.
Validation data: edoxaban data (Lixiana®) generated on the STA-R® AUT05450.
Sub-set 7:
Learning data:
edoxaban data (Lixiana®) generated on the STA-R® AUT05450,
edoxaban data (Lixiana®) generated on the STA-R® AUT05676,
edoxaban data (Lixiana®) generated on the STA-R® AUT05980,
edoxaban data (Lixiana®) generated on the STA-R® AUT06366,
edoxaban data (Lixiana®) generated on the STA-R® AUT06366 (bis),
edoxaban data (Lixiana®) generated on the STA-R® AUT06399.
Validation data: edoxaban data (Lixiana®) generated on the STA-R® AUT00603.
Final learning was carried out on the entirety of the data.
Description of the Automated Learning Model
A multilayer perceptron (neural network) was trained in accordance with the strategy described in the preceding section. It was defined by the following parameters and hyperparameters:
Preprocessing of data: normalization between 0 and 1
Automated learning model: Multilayer perceptrons
Hyperparameters:
Input layer
77 neurons
Activation functions: Identity
Hidden layer
40 neurons
Activation functions: ReLU
Output layer
1 neuron
Activation function: Identity
Initialization of weight and bias matrix: Xavier Glorot
Digital method for optimization of weights and biases: L-BFGS
Regularization method: L2, alpha=0.001
Learning strategy: seed search
Cost function: mean quadratic error 4 Results for the Second Study (Data from Section 3. Above)

In this section, we list the results of the performances obtained by the different automated learning models of the cascade of FIG. 6 on the data measured for real samples using the experimental methodology described herein. Each sub-section details the measured data as well as the performances obtained. A single run measurement was sufficient to render a result; however, as demonstrated in this section, a triple run measurement could improve the performances.

4.1 Detection of the Presence or the Absence of an Anti-Xa Anticoagulant

In this section, we provide the results obtained for the detection of the presence or the absence of an anti-Xa anticoagulant using the method described in section 3. above.

4.1.1 Test Data 39 samples identified as normal based on their results for TP, TCA and fibrinogen, 24 frozen samples from patients treated with unfractionated heparin (UFH), 62 frozen samples from patients treated with low molecular weight heparin (LMWH), 44 frozen samples from patients treated with Xarelto® (rivaroxaban), 37 frozen samples from patients treated with Eliquis® (apixaban) and 42 frozen samples from patients treated with Lixiana® (edoxaban) were tested.

The data had been generated on the STA-R® AUT06399 (soft version 3.04.07) with the STA®—Liquid Anti-Xa (batch 251187), where each sample was tested with n=3 with the universal methodology.

Finally, the single run analysis was carried out on 248 sets of kinetic measurements on 248 samples and the triple run analysis was carried out on 744 sets of kinetic measurements on 248 samples.

4.1.2 Results

Tables 9 and 10 respectively provide the confusion matrices associated with the detection of the presence or the absence of an anti-Xa anticoagulant when a single run analysis was carried out and when the analysis was carried out on the test data set in a triple run. The results for the detection of the presence of an anti-Xa anticoagulant produced an accuracy of 100% irrespective of whether the analysis was carried out as a single run or as a triple run. The results for the detection of the absence of an anti-Xa anticoagulant produced an accuracy of 97.44% irrespective of whether the analysis was carried out as a single run or as a triple run.

TABLE 9

Presence or absence of an anti-Xa anticoagulant: confusion matrix. Single run analysis. The results produced an accuracy of 100% for the detection of the presence of an anti-Xa anticoagulant. The results produced an accuracy of 97.44% for the detection of the absence of an anti-Xa anticoagulant.

| | Predicted outcome | |
| --- | --- | --- |
| Actual value | Presence of an anti-Xa | Absence of an anti-Xa |
| Presence of an anti-Xa | 209 | 0 |
| Absence of an anti-Xa | 1 | 38 |

TABLE 10

Presence or absence of an anti-Xa anticoagulant: confusion matrix. Triple run analysis. The results produced an accuracy of 100% for the detection of the presence of an anti-Xa anticoagulant. The results produced an accuracy of 97.44% for the detection of the absence of an anti-Xa anticoagulant.

| | Predicted outcome | |
| --- | --- | --- |
| Actual value | Presence of an anti-Xa | Absence of an anti-Xa |
| Presence of an anti-Xa | 209 | 0 |
| Absence of an anti-Xa | 1 | 38 |

4.2 Identification of the Category of the Anti-Xa Anticoagulant

In this section, we provide the results obtained for the identification of the category of the anti-Xa anticoagulant using the method described in the section 3. above.

4.2.1 Test Data 24 frozen samples from patients treated with unfractionated heparin (UFH), 62 frozen samples from patients treated with low molecular weight heparin (LMWH), 44 frozen samples from patients treated with Xarelto® (rivaroxaban), 37 frozen samples from patients treated with Eliquis® (apixaban) and 42 frozen samples from patients treated with Lixiana® (edoxaban) were tested.

The data had been generated on the STA-R® AUT06399 (soft version 3.04.07) with the STA®—Liquid Anti-Xa (batch 251187), where each sample was tested with n=3 with the universal methodology.

Finally, the single run analysis was carried out on 209 sets of kinetic measurements on 209 samples and the triple run analysis was carried out on 627 sets of kinetic measurements on 209 samples.

4.2.2 Results

Tables 11 and 12 respectively provide the confusion matrices associated with the identification of the category of the anti-Xa anticoagulant when a single run analysis was carried out and when the analysis was carried out on the test data set in a triple run. The results for the identification of the category of the anti-Xa anticoagulant produced an accuracy of 100% when a single run analysis was carried out and an accuracy of 100% when a triple run analysis was carried out.

TABLE 11

Identification of the category of the anti-Xa anticoagulant: confusion matrix. Single run analysis. The results produced an accuracy of 100% for the identification of the category of the anti-Xa anticoagulant.

| | Predicted outcome | |
|---|---|---|
| Actual value | Heparin | DOAC |
| Heparin | 86 | 0 |
| DOAC | 0 | 123 |

TABLE 12

Identification of the category of the anti-Xa anticoagulant: confusion matrix. Triple run analysis. The results produced an accuracy of 100% for the identification of the category of the anti-Xa anticoagulant.

| | Predicted outcome | |
|---|---|---|
| Actual value | Heparin | DOAC |
| Heparin | 86 | 0 |
| DOAC | 0 | 123 |

4.3 Identification of Heparins

In this section, we provide the results obtained for the identification of heparins using the method described in the section 3. above.

4.3.1 Test Data 24 frozen samples from patients treated with unfractionated heparin (UFH) and 62 frozen samples from patients treated with low molecular weight heparin (LMWH) were tested.

The data had been generated on the STA-R® AUT06399 (soft version 3.04.07) with the STA®—Liquid Anti-Xa (batch 251187), where each sample was tested with n=3 with the universal methodology.

Finally, the single run analysis was carried out on 86 sets of kinetic measurements on 86 samples and the triple run analysis was carried out on 258 sets of kinetic measurements on 86 samples.

4.3.2 Results

Tables 13 and 14 respectively provide the confusion matrices associated with the identification of heparins when a single run analysis was carried out and when the analysis was carried out on the test data set in a triple run. The results for the identification of heparins produced an accuracy of 91.86% when a single run analysis was carried out and an accuracy of 90.70% when a triple run analysis was carried out.

TABLE 13

Identification of heparins: confusion matrix. Single run analysis. The results produced an accuracy of 91.86% for the identification of heparins.

| | Predicted outcome | |
|---|---|---|
| Actual value | UFH | LMWH |
| UFH | 21 | 3 |
| LMWH | 4 | 58 |

TABLE 14

Identification of heparins: confusion matrix. Triple run analysis. The results produced an accuracy of 90.70% for the identification of heparins.

| | Predicted outcome | |
|---|---|---|
| Actual value | UFH | LMWH |
| UFH | 21 | 3 |
| LMWH | 5 | 57 |

4.4 Assays of Unfractionated Heparins

In this section, we provide the results of assays of the concentrations of UFH on samples from patients obtained using the method described in the section 3. above. compared with the concentrations measured using the standard approach (STA®—Liquid Anti-Xa commercial kit). The results were judged to be satisfactory when the slope of the linear regression was comprised between 0.9 and 1.1 and the coefficient of determination R2 was greater than or equal to 0.95 (criteria from CLSJ EP9-A2).

4.4.1 Test Data 24 frozen samples from patients treated with unfractionated heparin (UFH) were tested.

The data had been generated on the STA-R® AUT06399 (soft version 3.04.07) with the STA®—Liquid Anti-Xa (batch 251187) under the following conditions:

each sample was tested with n=3 with the universal methodology;

each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 24 sets of kinetic measurements on 24 samples and the triple run analysis was carried out on 72 sets of kinetic measurements on 24 samples.

4.4.2 Results

FIG. 17 provides the results of a comparison of the assays of the concentrations of UFH measured using the approach described in this document in the concentrations of UFH measured using the standard approach on the test data set. These comparisons provided a straight line with the equation y=1.04x−0.03 and a coefficient of determination $R^2$=0.9851 when a single run analysis was carried out; they provided a straight line with the equation $y=1.04x-0.03$ and a coefficient $R^2=0.9856$ when a triple run analysis was carried out.

4.5 Assays of Low Molecular Weight Heparins

In this section, we provide the results of assays of the concentrations of LMWH on samples from patients obtained using the invention described in this document compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.5.1 Test Data 62 frozen samples from patients treated with low molecular weight heparin (LMWH) were tested.

The data had been generated on the STA-R® AUT06399 (soft version 3.04.07) with the STA®—Liquid Anti-Xa (batch 251187) under the following conditions:
- each sample was tested with n=3 with the universal methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 62 sets of kinetic measurements on 62 samples and the triple run analysis was carried out on 186 sets of kinetic measurements on 62 samples.

4.5.2 Results

FIG. 18 provides the results of a comparison of the assays of the concentrations of LMWH measured using the approach described in this document in the concentrations of LMWH measured using the standard approach on the test data set. These comparisons provided a straight line with the equation $y=1.02x-0.02$ and a coefficient of determination $R^2=0.996$ when a single run analysis was carried out; they provided a straight line with the equation $y=1.027x-0.03$ and a coefficient of determination $R^2=0.9971$ when a triple run analysis was carried out.

4.6 Identification of Anti-Xa DOAC (Optimized DOAC Methodology)

In this section, we provide the results obtained for the identification of anti-Xa DOACs using the invention described in this document.

4.6.1 Test Data 62 frozen samples from patients treated with Xarelto® (rivaroxaban), 45 frozen samples from patients treated with Eliquis® (apixaban) and 56 frozen samples from patients treated with Lixiana® (edoxaban) were tested.

The data had been generated on the STA-R® AUT06399 (soft version 3.04.07) with the STA®—Liquid Anti-Xa (batch 251187), where each sample was tested with n=3 with the optimized DOAC methodology.

Finally, the single run analysis was carried out on 163 sets of kinetic measurements on 163 samples and the triple run analysis was carried out on 489 sets of kinetic measurements on 163 samples.

4.6.2 Results

Tables 15 and 16 respectively provide the confusion matrices associated with the identification of anti-Xa DOACs when a single run analysis was carried out and when the analysis was carried out on the test data set in a triple run. The results for the identification of anti-Xa DOACs produced an accuracy of 92.64% when a single run analysis was carried out and an accuracy of 97.55% when a triple run analysis was carried out.

TABLE 15

Identification of anti-Xa DOACs: confusion matrix. Single run analysis. The results produced an accuracy of 92.64% for the identification of anti-Xa DOACs.

| Actual value | Predicted outcome | | |
|---|---|---|---|
| | Rivaroxaban | Apixaban | Edoxaban |
| Rivaroxaban | 59 | 0 | 3 |
| Apixaban | 0 | 45 | 0 |
| Edoxaban | 9 | 0 | 47 |

TABLE 16

Identification of anti-Xa DOACs: confusion matrix. Triple run analysis. The results produced an accuracy of 97.55% for the identification of anti-Xa DOACs.

| Actual value | Predicted outcome | | |
|---|---|---|---|
| | Rivaroxaban | Apixaban | Edoxaban |
| Rivaroxaban | 62 | 0 | 0 |
| Apixaban | 0 | 45 | 0 |
| Edoxaban | 4 | 0 | 52 |

4.7 Assay of Rivaroxaban (Optimized DOAC Methodology)

In this section, we provide the results of assays of the concentrations of rivaroxaban on samples from patients obtained using the invention described in this document (optimized DOAC methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.7.1 Test Data 62 frozen samples from patients treated with Xarelto® (rivaroxaban) were tested.

The data had been generated on the STA-R® AUT06399 (soft version 3.04.07) with the STA®—Liquid Anti-Xa (batch 251187) under the following conditions:
- each sample was tested with n=3 with the optimized DOAC methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 62 sets of kinetic measurements on 62 samples and the triple run analysis was carried out on 186 sets of kinetic measurements on 62 samples.

4.7.2 Results

FIG. 19 provides the results of a comparison of the assays of the concentrations of rivaroxaban measured using the approach described in this document in the concentrations of rivaroxaban measured using the standard approach on the test data set. These comparisons provided a straight line with the equation $y=1.05x+19.65$ and a coefficient of determination $R^2=0.991$ when a single run analysis was carried out; they provided a straight line with the equation $y=1.04x+20.3$ and a coefficient of determination $R^2=0.9934$ when a triple run analysis was carried out.

4.8 Assay of Rivaroxaban (Universal Methodology or "Improved Methodology Based on the Universal Methodology")

In this section, we provide the results of assays of the concentrations of rivaroxaban on samples from patients obtained using the invention described in this document (universal methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.8.1 Test Data 44 frozen samples from patients treated with Xarelto® (rivaroxaban) were tested.

The data had been generated on the STA-R® AUT06399 (soft version 3.04.07) with the STA®—Liquid Anti-Xa (batch 251187) under the following conditions:
- each sample was tested with n=3 with the universal methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 44 sets of kinetic measurements on 44 samples and the triple run analysis was carried out on 132 sets of kinetic measurements on 44 samples.

4.8.2 Results

FIG. 20 provides the results of a comparison of the assays of the concentrations of rivaroxaban measured using the approach described in this document in the concentrations of rivaroxaban measured using the standard approach on the test data set. These comparisons provided a straight line with the equation y=1.04x+1.74 and a coefficient of determination $R^2$=0.985 when a single run analysis was carried out; they provided a straight line with the equation y=1.032x+1.99 and a coefficient $R^2$=0.989 when a triple run analysis was carried out.

4.9 Assay of Apixaban (Optimized DOAC Methodology)

In this section, we provide the results of assays of the concentrations of apixaban on samples from patients obtained using the invention described in this document (optimized DOAC methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.9.1 Test Data 45 frozen samples from patients treated with Eliquis® (apixaban) were tested.

The data had been generated on the STA-R® AUT06399 (soft version 3.04.07) with the STA®—Liquid Anti-Xa (batch 251187) under the following conditions:
- each sample was tested with n=3 with the optimized DOAC methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 45 sets of kinetic measurements on 45 samples and the triple run analysis was carried out on 135 sets of kinetic measurements on 45 samples.

4.9.2 Results

FIG. 21 provides the results of a comparison of the assays of the concentrations of apixaban measured using the approach described in this document in the concentrations of apixaban measured using the standard approach on the test data set. These comparisons provided a straight line with the equation y=1.14x−6.73 and a coefficient of determination $R^2$=0.9945 when a single run analysis was carried out; they provided a straight line with the equation y=1.13x−5.46 and a coefficient of determination $R^2$=0.9958 when a triple run analysis was carried out.

4.10 Assay of Apixaban (Universal Methodology or "Improved Methodology Based on the Universal Methodology")

In this section, we provide the results of assays of the concentrations of apixaban on samples from patients obtained using the invention described in this document (universal methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.10.1 Test Data 37 frozen samples from patients treated with Eliquis® (apixaban) were tested.

The data had been generated on the STA-R® AUT06399 (soft version 3.04.07) with the STA®—Liquid Anti-Xa (batch 251187) under the following conditions:
- each sample was tested with n=3 with the universal methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 37 sets of kinetic measurements on 37 samples and the triple run analysis was carried out on 111 sets of kinetic measurements on 37 samples.

4.10.2 Results

FIG. 22 provides the results of a comparison of the assays of the concentrations of apixaban measured using the approach described in this document in the concentrations of apixaban measured using the standard approach on the test data set. These comparisons provided a straight line with the equation y=1.041x−2.66 and a coefficient of determination $R^2$=0.9792 when a single run analysis was carried out; they provided a straight line with the equation y=1.041x−2.41 and a coefficient $R^2$=0.9877 when a triple run analysis was carried out.

4.11 Assay of Edoxaban (Optimized DOAC Methodology)

In this section, we provide the results of assays of the concentrations of edoxaban on samples from patients obtained using the invention described in this document (optimized DOAC methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.11.1 Test Data 56 frozen samples from patients treated with Lixiana® (edoxaban) were tested.

The data had been generated on the STA-R® AUT06399 (soft version 3.04.07) with the STA®—Liquid Anti-Xa (batch 251187) under the following conditions:
- each sample was tested with n=3 with the optimized DOAC methodology;
- each sample was tested with n=2 with the reference method with the STA®—Liquid Anti-Xa commercial methodology. The reference concentration used in the comparison of the methods was therefore a concentration which was verified after freezing the sample.

Finally, the single run analysis was carried out on 56 sets of kinetic measurements on 56 samples and the triple run analysis was carried out on 168 sets of kinetic measurements on 56 samples.

4.11.2 Results

FIG. 23 provides the results of a comparison of the assays of the concentrations of edoxaban measured using the approach described in this document in the concentrations of edoxaban measured using the standard approach on the test data set. These comparisons provided a straight line with the equation $y=0.905x+12.35$ and a coefficient of determination $R^2=0.9853$ when a single run analysis was carried out; they provided a straight line with the equation $y=0.93x+8.18$ and a coefficient of determination $R^2=0.9881$ when a triple run analysis was carried out.

4.12 Assay of Edoxaban (Universal Methodology or "Improved Methodology Based on the Universal Methodology")

In this section, we provide the results of assays of the concentrations of edoxaban on samples from patients obtained using the invention described in this document (universal methodology) compared with the concentrations measured using the standard approach (STA®—Liquid Anti-Xa commercial kit). The results were judged to be satisfactory when the slope of the linear regression was comprised between 0.9 and 1.1 and the coefficient of determination $R^2$ was greater than or equal to 0.95 (criteria from CLSI EP9-A2).

4.12.1 Test Data 42 frozen samples from patients treated with Lixiana® (edoxaban) were tested.

The data had been generated on the STA-R® AUT06399 (soft version 3.04.07) with the STA®—Liquid Anti-Xa (batch 251187) under the following conditions:
- each sample was tested with n=3 with the universal methodology;
- each sample was tested with n=2 with the reference method (STA®—Liquid Anti-Xa commercial methodology). The reference concentration used in the comparison of the methods was therefore a concentration which was verified after freezing the sample.

Finally, the single run analysis was carried out on 42 sets of kinetic measurements on 42 samples and the triple run analysis was carried out on 126 sets of kinetic measurements on 42 samples.

4.12.2 Results

FIG. 24 provides the results of a comparison of the assays of the concentrations of edoxaban measured using the approach described in this document in the concentrations of edoxaban measured using the standard approach on the test data set. These comparisons provided a straight line with the equation $y=0.9431x+4.51$ and a coefficient of determination $R^2=0.9968$ when a single run analysis was carried out; they provided a straight line with the equation $y=0.9442x+4.26$ and a coefficient $R^2=0.9962$ when a triple run analysis was carried out.

Inhibitors

1 Inhibitors of Factor Xa

Tables 17 and 18 respectively list the natural and synthetic inhibitors of factor Xa which are currently known.

[Table 17]

TABLE 17

| | Natural inhibitors of factor Xa | |
|---|---|---|
| | Direct | Indirect |
| Reversible | TFPI | Protein S |
| Irreversible | Antithrombin | |
| | Protease nexin 1 | |

[Table 18]

TABLE 18

| | Synthetic inhibitors of factor Xa | |
|---|---|---|
| | Direct | Indirect |
| Reversible | Rivaroxaban | |
| | Apixaban | |
| | Edoxaban | |
| | Betrixaban | |
| Irreversible | | UFH |
| | | LMWH |
| | | Pentasaccharides |
| | | Danaparoid sodium (Orgaran) |

II Inhibitors of Factor IIa

Tables 19 and 20 respectively list the natural and synthetic inhibitors of factor IIa which are currently known.

[Table 19]

TABLE 19

| | Natural inhibitors of factor IIa | |
|---|---|---|
| | Direct | Indirect |
| Reversible | | |
| Irreversible | Antithrombin | |
| | Heparin cofactor II | |
| | Protease nexin 1 | |
| | α2-macroglobulin | |

[Table 20]

TABLE 20

| | Synthetic inhibitors of factor IIa | |
|---|---|---|
| | Direct | Indirect |
| Reversible | Dabigatran | |
| | Melagatran | |
| | Argatroban | |
| | Bivalirudin | |
| Irreversible | Hirudin | UFH |
| | Lepirudin | LMWH |
| | Desirudin | |
| | Antithrombin (Aclotine ®) | |

REFERENCES

Géron, A. (2017). Hands-On Machine Learning with Scikit-Learn and TensorFlow: Concepts, Tools, and Techniques to Build Intelligent Systems. O'Reilly.

Segel, I. H. (1993). Enzyme kinetics. Behavior and analysis of rapid equilibrium and steady-state enzyme systems. Wiley Classics Library.

Bonaccorso, G. (2017). Machine Learning Algorithms: A reference guide to popular algorithms for data science and machine learning. Packt Publishing Limited.

The invention claimed is:

1. An in vitro method for detecting, in a blood sample previously drawn from a subject, the presence of an inhibitor of a blood coagulation enzyme, wherein, prior to performing the method, the presence of any said inhibitor in the subject is unknown, the blood coagulation enzyme being selected, independently, from factor Xa (FXa) and factor IIa (FIIa), the method comprising the following steps:
   a) carrying out a competitive enzymatic assay on a blood sample previously drawn from a subject in order to provide, as a result, one or more competitive kinetic measurement(s), either having regard to an inhibitor of factor Xa, or to an inhibitor of factor IIa, then
   b) inputting, by a processor, the kinetic measurement(s) obtained in step a) to a classification decision model A obtained from a trained automated supervised learning model, the supervised learning model being selected from: support-vector machines, neural networks and k-nearest neighbour models, then
   c) determining, by the processor using the classification decision model A:
      (i) the absence of an inhibitor when the use of the model by the processor excludes the presence of an inhibitor, or
      (ii) the presence of an inhibitor when the use of the model by the processor confirms the presence of an inhibitor; and
   (d) generating, by the processor, an output indicating, as determined in step c), the presence or absence of an inhibitor in the blood sample.

2. An in vitro method for identifying, in a blood sample, an inhibitor of a blood coagulation enzyme selected, independently, from factor Xa (FXa) and factor IIa (FIIa), the method comprising the following steps:
   1) carrying out the steps of the method as claimed in claim 1, then 2) inputting, by the processor, the kinetic measurement(s) obtained in the step of
   a) of claim 1, or step 1) above, and the result obtained at the end of step c) (ii) of claim 1, to a classification decision model B obtained from a trained automated supervised learning model, the supervised learning model being selected from: support-vector machines, neural networks and k-nearest neighbour models, and assigning, by the processor using model B the category of the inhibitor to one of the following categories: irreversible indirect inhibitor, or reversible direct inhibitor, and outputting, by the processor, the category of the inhibitor determined by the model B.

3. The method as claimed in claim 2, comprising an additional step of characterization of the inhibitor the presence of which has been detected in step c) (ii), as follows: inputting the kinetic measurement(s) obtained in step of a) of claim 1 or step 1) of claim 2, and the determined output datum, to a classification decision model C obtained from a trained automated supervised learning model, the supervised learning model being selected from: support-vector machines, neural networks and k-nearest neighbour models, and outputting by the processor using model C, the characterization of the inhibitor in question, the inhibitor in question being identified from among:
   a) in the case where the category of the inhibitor in question is that of the heparins: unfractionated heparins (UFH) or low molecular weight heparins (LMWH), or
   b) in the case where the category of the inhibitor in question is that of the DOACs: rivaroxaban, apixaban, edoxaban or dabigatran,
   and outputting, by the processor, the characterization of the inhibitor determined by the model C.

4. The method as claimed in claim 3, comprising an additional step of quantitative assay of the characterized inhibitor, in which the kinetic measurement(s) obtained in step a) of claim 1 or step 1) of claim 2, and the characterization datum obtained in accordance with claim 3 identifying the inhibitor present in the analysed blood sample are fed to a trained regression model D, the model D being selected from: support-vector machines, neural networks and k-nearest neighbour models, said regression model D having been trained on a data set obtained under measurement conditions identical to those of step a) of claim 1 or step 1) of claim 2, and enabling the processor to determine and provide as an output a concentration of the inhibitor identified in the analysed sample.

5. The method as claimed in claim 4, in which:
   I) the decision model or the decision models employed is configured for reaching, when tested on test data, a precision in the accuracy of the result rendered, which is greater than or equal to 70%, or 75%, or 80%, or 85%, or 90%, or 95%, applied to the total of the various models used and/or to each model used, and/or
   II) the regression model used, if appropriate, is configured for obtaining, when tested on the test data, an output result characterized by a linear regression slope comprised between 0.9 and 1.1, and a coefficient of determination R2 of greater than or equal to 0.70, or 0.80, or 0.90, or 0.95 (in accordance with the CLSI EP9-A2 criteria).

6. The method as claimed in claim 2, applied to the investigation of the presence of the factor Xa inhibitor that has been detected in step c) (ii) of claim 1, comprising the following additional characterization step:
   I). if the category of inhibitor has been assigned to the heparins category in step 2) of claim 2, then:
      i) inputting, by the processor, the determined output datum, concerning the category of inhibitor the presence of which has been detected, and the competitive kinetic measurement(s) in respect of the factor Xa inhibitor obtained in step a) of claim 1 or step 1) of claim 2 to a trained classification decision model C, the model C being selected from: support-vector machines, neural networks and k-nearest neighbour models, and
      ii) outputting, by the processor using model C, the characterization of inhibitor in question, the inhibitor in question being identified among: unfractionated heparins (UFH) or low molecular weight heparins (LMWH), or alternatively,
   II. if the category of inhibitor has been assigned to the category of reversible direct inhibitors (DOACs) in step 2) of claim 2, then:
      i) carrying out a further competitive enzymatic assay on the blood sample obtained from the subject or another blood sample obtained from the same subject, to provide, as a result, one or more further competitive kinetics measurement(s) with respect to the factor Xa inhibitor, with a dilution factor for the sample and/or a measurement period adapted to a competition situation involving the presence of DOAC inhibiting the factor Xa, then ii) inputting, by the processor, said determined output datum concerning the category of inhibitor the presence of which has been detected and the kinetic measurement(s) obtained in the preceding step i) to a trained classification decision model C selected from: support-vector machines, neural networks and k-nearest neighbour models, and iii) outputting, by the processor using model C, the characterization of the inhibitor in question, the inhibitor in question being identified from among: rivaroxaban, apixaban, or edoxaban.

7. The method as claimed in claim 6, comprising an additional step of quantitative assay of the inhibitor identified at the end of steps I) or II) of claim 6, in which, respectively:

I) if the inhibitor identified in step I) of claim 6 is a UFH or a LMWH, then: inputting, by the processor, the kinetic measurement(s) obtained in step a) of claim 1 or step 1) of claim 2 and the output datum determined in step I) ii) of claim 6 identifying the inhibitor present in the analysed blood sample to a trained regression model D selected from support-vector machines, neural networks and k-nearest neighbour models, said model D having been trained on a data set obtained under measurement conditions identical to those of step a) of claim 1 or step 1) of claim 2, said regression model D enabling the concentration of inhibitor identified in the analysed sample to be provided as an output by the processor, and, or II) if the identified inhibitor in step II) of claim 6 is rivaroxaban, apixaban, or edoxaban, then: inputting by the processor the kinetic measurement(s) obtained in step II) i) of claim 6 and the characterization datum, to a trained regression model D selected from: support-vector machines, neural networks and k-nearest neighbour models, said model D having been trained on a data set obtained under measurement conditions identical to those of step II) i) of claim 6, said regression model D enabling the processor to provide the concentration of inhibitor identified in the analysed sample as an output.

8. The method as claimed in point II) of claim 7 in which if the concentration of inhibitor identified in the analysed sample, determined by the trained model D, is less than or equal to 200 ng/mL, then inputting by the processor the kinetic measurement(s) obtained in step a) of claim 1 into a trained regression model D2 selected from: support-vector machines, neural networks and k-nearest neighbour models, said model D2 having been trained on a data set obtained under measurement conditions identical to those of step a) of claim 1, said regression model D2 enabling the processor to recalculate the concentration of inhibitor identified in the analysed sample and provide it as an output.

9. The method as claimed claim 1, in which the inhibitor in question is:

I) the inhibitor of factor Xa (FXa) selected from: unfractionated heparins (UFH), low molecular weight heparins (LMWH), rivaroxaban, and apixaban, edoxaban, or II) the inhibitor of factor IIa (FIIa) selected from: unfractionated heparins (UFH), low molecular weight heparins (LMWH), and dabigatran.

10. The method as claimed in claim 1, in which the in vitro measurement of the competition kinetics by competitive enzymatic assay on the blood sample obtained from a subject comprises the following steps:

a) providing the blood sample, diluted or not diluted, then b) adding to the blood sample a substrate which is specific to either factor Xa or factor IIa, depending on the inhibitor in question, c) incubating, with elevating the temperature of the mixture obtained at b. to a temperature between 35° C. and 39° C., d) adding factor Xa or factor IIa to the reaction mixture obtained from c., depending on the substrate added in step b), in a manner such as to initiate the competition between an inhibition reaction and the provoked enzymatic reaction, e) measurement using an instrument, over time, of the quantity of product resulting from the transformation of the substrate due to the action of the analysed enzyme thereon (factor Xa or factor IIa), if appropriate via the measurement of a marker associated with the substrate liberated during said enzymatic reaction, and recording the kinetics obtained.

11. The method as claimed in claim 10, in which the competitive enzymatic assay is specific for factor Xa, and where:

a) in step a) of claim 10 the blood sample is a sample of plasma diluted to 1/2 in Owren Koller buffer b) in step b) of claim 10 the substrate is the reagent MAPA-Gly-Arg-pNA, c) in step c) of claim 10 the incubation period is 240 seconds, at 37° C., d) the factor Xa added to the mixture in step d) of claim 9 is bovine factor Xa, e) the measurement of the liberation of paranitroaniline (pNA) in step e) of claim 9 is carried out by colorimetry at 405 nm every two seconds for 156 seconds, on an appropriate spectrophotometer instrument, or, alternatively:

a) in step a) of claim 10 the blood sample is a sample of plasma diluted to 1/8th in Owren Koller buffer, b) in step b) of claim 10 the substrate is the reagent MAPA-Gly-Arg-pNA, c) in step c) of claim the incubation period is 240 seconds, at 37° C., d) the factor Xa added to the mixture in step d) of claim 10 is bovine factor Xa, e) the measurement of a liberation of paranitroaniline (pNA) in step e) of claim 10 is carried out by colorimetry at 405 nm every two seconds for 86 seconds, on an appropriate spectrophotometer instrument.

12. The method as claimed in claim 10, in which the competitive enzymatic assay is carried out on a miniaturised device, in a reaction volume of between 1 and 20 µL.

13. The method as claimed in claim 1, in which the blood sample is a sample of plasma.

14. The method as claimed in claim 1, in which the inputting to the automated supervised learning model of the kinetic measurement which has been obtained experimentally consists in providing pairs of values constituted by each value measured for each discrete measurement point in the course of a measurement period.

* * * * *